US012737918B2

(12) United States Patent
Lane et al.

(10) Patent No.: US 12,737,918 B2
(45) Date of Patent: Sep. 15, 2026

(54) METHOD OF CROP IMAGE PROCESSING TO DETERMINE REAL-WORLD COORDINATES

(71) Applicant: Garford Farm Machinery Ltd, Peterborough (GB)

(72) Inventors: Tom Lane, Peterborough (GB); Robert Silvester, Peterborough (GB); Nigel Trevarthen, Peterborough (GB)

(73) Assignee: Garford Farm Machinery Ltd, Peterborough (GB)

(*) Notice: Subject to any disclaimer, the term of this patent is extended or adjusted under 35 U.S.C. 154(b) by 200 days.

(21) Appl. No.: 18/684,979

(22) PCT Filed: Aug. 19, 2022

(86) PCT No.: PCT/GB2022/052153
§ 371 (c)(1),
(2) Date: Feb. 20, 2024

(87) PCT Pub. No.: WO2023/021303
PCT Pub. Date: Feb. 23, 2023

(65) Prior Publication Data
US 2024/0378750 A1 Nov. 14, 2024

(30) Foreign Application Priority Data
Aug. 20, 2021 (GB) ...................................... 2111983

(51) Int. Cl.
*G06T 7/73* (2017.01)
*G06T 7/50* (2017.01)
(Continued)

(52) U.S. Cl.
CPC .................. *G06T 7/74* (2017.01); *G06T 7/50* (2017.01); *G06T 7/529* (2017.01); *G06T 7/55* (2017.01);
(Continued)

(58) Field of Classification Search
CPC ... G06T 7/74; G06T 7/55; G06T 2207/10024; G06T 2207/10028; G06T 2207/10048;
(Continued)

(56) References Cited

U.S. PATENT DOCUMENTS

2021/0082135 A1 3/2021 Xu

FOREIGN PATENT DOCUMENTS

KR 102151750 B1 9/2020
WO 2013134480 A1 9/2013

OTHER PUBLICATIONS

Wu et al., "Robotic Weed Control Using Automated Weed and Crop Classification," Journal of Field Robotics, 37(2), 2020, pp. 1-25. (Year: 2020).*

(Continued)

*Primary Examiner* — Emily C Terrell
*Assistant Examiner* — Daniella M. DiGuglielmo
(74) *Attorney, Agent, or Firm* — NK Patent Law

(57) ABSTRACT

An image processing method is disclosed. The method comprises receiving an image of a crop, the image comprising an array of elements which includes depth information. The image is a multiple-channel image comprising at least a colour channel and a depth channel providing per-element depth information. The method comprises providing the image to a trained convolutional neural network to generate a response map comprising an image comprising intensity values having respective peaks corresponding to the stem of a plant in the crop. The method comprises obtaining, from the response map, coordinates corresponding to the respective peaks. The method comprises converting the coordinates in image coordinates into stem locations in real-world dimensions using the provided depth information.

18 Claims, 61 Drawing Sheets

(51) Int. Cl.

*G06T 7/529* (2017.01)
*G06T 7/55* (2017.01)
*G06T 17/05* (2011.01)
*G06V 10/82* (2022.01)
*G06V 20/58* (2022.01)
*G06V 20/60* (2022.01)

(52) U.S. Cl.

CPC .............. *G06V 10/82* (2022.01); *G06V 20/60* (2022.01); *G06T 17/05* (2013.01); *G06T 2207/10024* (2013.01); *G06T 2207/10028* (2013.01); *G06T 2207/10048* (2013.01); *G06T 2207/20081* (2013.01); *G06T 2207/20084* (2013.01); *G06T 2207/30188* (2013.01); *G06T 2207/30241* (2013.01); *G06T 2207/30244* (2013.01); *G06T 2207/30252* (2013.01); *G06V 20/58* (2022.01)

(58) Field of Classification Search

CPC . G06T 2207/20084; G06T 2207/30188; G06T 2207/30241; G06T 2207/30244; G06T 2207/30252; G06T 7/529; G06T 7/50; G06T 17/05; G06T 2207/20081; G06V 10/82; G06V 20/58; G06V 20/60

See application file for complete search history.

(56) References Cited

OTHER PUBLICATIONS

Lottes et al., "Joint Stem Detection and Crop-Weed Classification for Plant-specific Treatment in Precision Farming," arXiv, 2018, pp. 1-6. (Year: 2018).*

English et al., "Learning Crop Models for Vision-Based Guidance of Agricultural Robots," 2015 IEEE/RSJ International Conference on Intelligent Robots and Systems (IROS), Hamburg Germany, Sep. 28-Oct. 2, 2015, pp. 1158-1163. (Year: 2015).*

Weiss et al., "Plant detections and mapping for agricultural robots using a 3D Lidar sensor," Robotics and Autonomous Systems, 59(5), 2011, pp. 265-273. (Year: 2011).*

Gai et al., "Plant Localization and Discrimination using 2D+3D Computer Vision for Robotic Intra-row Weed Control," 2016 ASABE Annual International Meeting, Orlando, Florida, Jul. 17-20, 2016, pp. 1-15. (Year: 2016).*

English A. et al.: "Vision based guidance for robot navigation in agriculture", 2014 IEEE International Conference on Robotics and Automation (ICRA), Hong Kong, China, May 31-Jun. 7, 2014, pp. 1693-1698.

English A. et al.: "Learning crop models for vision-based guidance of agricultural robots", 2015 IEEE/RSJ International Conference on Intelligent Robots and Systems (IROS), Hamburg, Germany, Sep. 28-Oct. 2, 2015, pp. 1158-1163.

Asad, Muhammad Hamza et al.: "Weed Density Estimation Using Semantic Segmentation", Jan. 27, 2020 (Jan. 27, 2020), Arxiv.org, Cornell University Library, 201 Olin Library Cornell University Ithaca, NY 14853, pp. 162-171, XP047534567.

Lottes P. et al.: "Joint Stem Detection and Crop-Weed Classification for Plant-Specific Treatment in Precision Farming", 2018 IEEE/RSJ International Conference on Intelligent Robots and Systems (IROS), Madrid, Spain, Oct. 1-5, 2018, pp. 8233-8238.

Lottes P. et al.: "Fully Convolutional Networks with Sequential Information for Robust Crop and Weed Detection in Precision Farming", Arxiv.org, Cornell University Library, 201 Olin Library Cornell University Ithaca, NY 14853, Jun. 9, 2018 (Jun. 9, 2018), XP080888818.

Sa, I. et al.: "weedNet: Dense Semantic Weed Classification Using Multispectral Images and MAV for Smart Farming", IEEE Robotics and Automation Letters, IEEE, vol. 3, No. 1, 2018, pp. 588-595, XP011674527.

Hague T. et al.: "Automated Crop and Weed Monitoring in Widely Spaced Cereals", Precision Agriculture, vol. 7, pp. 21-32 (2006).

Wu, X. et al.: "Robotic weed control using automated weed and crop classification", Journal of Field Robotics, [Online] vol. 37, No. 2, Mar. 2020 (Mar. 2020), pp. 322-340, XP055830470, US, ISSN: 1556-4959, DOI: 10.1002/rob.21938, Retrieved from the Internet: URL:http://www.ipb.uni-bonn.de/pdfs/wu2020jfr.pdf> [retrieved on Jun. 8, 2020].

UKIPO, Combined Search and Examination Report for corresponding GB Patent Application No. GB2111983.9, dated Jan. 18, 2022, 7 pages.

ISA/EP, International Search Report and Written Opinion for corresponding PCT Patent Application No. PCT/GB2022/052153, mailed Jan. 5, 2023, 20 pages.

IPEA/EP, International Preliminary Report on Patentability for corresponding PCT Patent Application No. PCT/GB2022/052153, dated Nov. 13, 2023, 20 pages.

* cited by examiner

Augmented Image 24

127

129

129 128 129

129

Network output — 121

Extract stem coordinates — S42.1

Stem coordinates in image coordinates — 131

Mapping texture — 81

Depth image — 16

Map to meter coordinates — S42.2

Plant position/ Stem coord in meters wrt camera origin — 132

Annotation

Binary image

Colour image (before re-rendering)

Textured mesh image ("re-rendered image")

Depth image – inter-row (un-normalised)

Depth image – inter-row (normalised)

Depth image – inter-row (corrected)

RGB image 501

NDI image 502

RGB image 501

NDI image 502

METHOD OF CROP IMAGE PROCESSING TO DETERMINE REAL-WORLD COORDINATES

CROSS REFERENCE TO RELATED APPLICATIONS

This application is a U.S. National Stage Application of International Patent Application No. PCT/GB2022/052153, filed on Aug. 19, 2022, which claims priority to United Kingdom Patent Application No. 2111983.9, filed on Aug. 20, 2021, the entire contents of all of which are incorporated by reference herein.

FIELD

The present invention relates to image processing.

BACKGROUND

Computer vision and image recognition are being increasingly used in agriculture and horticulture, for example, to help manage crop production and automate farming.

T. Hague, N. D. Tillett and H. Wheeler: "Automated Crop and Weed Monitoring in Widely Spaced Cereals", Precision Agriculture, volume 7, pp. 21-32 (2006) describes an approach for automatic assessment of crop and weed area in images of widely-spaced (0.25 m) cereal crops, captured from a tractor-mounted camera.

WO 2013/134480 A1 describes a method of real-time plant selection and removal from a plant field. The method includes capturing an image of a section of the plant field, segmenting the image into regions indicative of individual plants within the section, selecting the optimal plants for retention from the image based on the image and previously thinned plant field sections, and sending instructions to the plant removal mechanism for removal of the plants corresponding to the unselected regions of the image before the machine passes the unselected regions.

A. English, P. Ross, D. Ball and P. Corke: "Vision based guidance for robot navigation in agriculture", 2014 IEEE International Conference on Robotics and Automation (ICRA), Hong Kong, China, pp. 1693-1698 (2014) describes a method of vision-based texture tracking to guide autonomous vehicles in agricultural fields. The method works by extracting and tracking the direction and lateral offset of the dominant parallel texture in a simulated overhead view of the scene and hence abstracts away crop-specific details such as colour, spacing and periodicity.

A. English, P. Ross, D. Ball, B. Upcroft and P. Corke: "Learning crop models for vision-based guidance of agricultural robots", 2015 IEEE/RSJ International Conference on Intelligent Robots and Systems (IROS), Hamburg, Germany, 2015, pp. 1158-1163 describes a vision-based method of guiding autonomous vehicles within crop rows in agricultural fields. The location of the crop rows is estimated with an SVM regression algorithm using colour, texture and 3D structure descriptors from a forward-facing stereo camera pair.

P. Lottes, J. Behley, N. Chebrolu, A. Milioto and C. Stachniss: "Joint Stem Detection and Crop-Weed Classification for Plant-Specific Treatment in Precision Farming", 2018 IEEE/RSJ International Conference on Intelligent Robots and Systems (IROS), Madrid, Spain, 2018, pp. 8233-8238 describes an approach which outputs the stem location for weeds, which allows for mechanical treatments, and the covered area of the weed for selective spraying. The approach uses an end-to-end trainable fully-convolutional network that simultaneously estimates stem positions as well as the covered area of crops and weeds. It jointly learns the class-wise stem detection and the pixel-wise semantic segmentation.

SUMMARY

According to a first aspect of the present invention there is provided a method comprising receiving an image of a crop, the image comprising an array of elements which includes depth information, wherein the image is a multiple-channel image comprising at least a colour channel and a depth channel providing per-element depth information, providing the image to a trained convolutional neural network to generate a response map comprising an image comprising intensity values having respective peaks corresponding to the stem of a plant in the crop, obtaining, from the response map, coordinates corresponding to the respective peaks, and converting the coordinates in image coordinates into stem locations in real-world dimensions using the provided depth information.

Thus, segmentation is neither used, nor required and coordinates, for example, point- or line-like coordinates, can be extracted directly from the response map. Furthermore, labelling (or "annotation) of images used to train the network can be easier because features can be labelled directly.

The peak(s) may correspond to point(s) which are part(s) of plant(s) in the crop, such as stem, leaf tip, or meristem. The peak(s) may correspond to lines(s) which are crop rows.

The method may comprise adding and/or displaying at least some of the peaks for the detected coordinates on the received image.

Processing the image to obtain the processed image may include per-pixel processing. The per-pixel processing may include standardization and/or normalization.

The method may be performed by at least one processing unit. The at least one processing unit may include at least one central processing unit and/or at least one graphics processing unit. The method is preferably performed by a graphics processing unit.

The method may further comprise receiving a mapping array for mapping depth information to a corresponding element. Thus, the mapping array provides the per-element depth information.

The mapping array may take the form of a texture. Using a texture can have the advantage of allowing sampling of the texture using normalised coordinates thereby permitting linear interpolation and so facilitating handling of size handling. Textures can also be accessed quickly.

The method may further comprise receiving the depth information from a depth sensing image sensor. The depth sensing image sensor may be a stereo depth sensing image sensor. The multiple-channel image further may include an infrared channel. The multiple-channel image may further include an optical flow image.

The intensity values may have Gaussian distributions in the vicinity of each detected location.

The trained convolutional neural network may comprise a series of at least two encoder-decoder modules (each encoder-decoder module comprising an encoder and a decoder). The trained convolutional neural network may be a multi-stage pyramid network.

The method may comprise extracting coordinates in image coordinates from the response map.

The method may further comprise converting the coordinates in image coordinates into camera coordinates in real-world dimensions. If the position of the ground plane is also known, then this can allow an imaging system to be automatically calibrated without, for example, needing to know image sensor height and image sensor angle of orientation. Thus, it is possible to calibrate the size of viewing area and crop dimensions (such as height of crop), automatically.

The method may further comprise amalgamating the camera coordinates corresponding to the same plant from more than one frame into an amalgamated coordinate. Amalgamating the coordinates may comprise projecting the coordinates onto a gridmap. Amalgamating the coordinates may comprise data association between different frames. Data association between different frames may include matching coordinates and updating matched coordinates. Matching may comprise using a descriptor or determination of distance between coordinates. Updating may comprise using an extended Kalman filter. The method may further comprise converting the coordinates in image coordinates into locations in real-world dimensions.

The method may further comprise calculating a trajectory in dependence on the detected stem coordinate and transmitting a control message to a control system in dependence on the trajectory. The control message may include the trajectory. The trajectory may comprise at least two set-points. The control system may comprise a system for controlling at least one motor and/or at least one actuator. The control message may be transmitted via a communications network. The communications network may be a TCP/IP or UDP/IP network. The communications network may be a serial network.

The response map image may or may not be displayed.

According to a second aspect of the present invention there is provided a computer program which, when executed by at least one processor, performs the method of any of the first aspect.

According to a third aspect of the present invention there is provided a computer product comprising computer-readable medium (which may be non-transitory) storing a computer program which, when executed by at least one processor, performs the method of any of the first aspect.

According to a fourth aspect of the present invention there is provided a computer system comprising at least one processor and memory, wherein the at least one processor is configured to perform the method of any of the first aspect.

The at least one process may perform the method in real-time. The at least one processor may include at least one graphics processor. The at least one processor may include at least one tensor processor. The at least one processor may include at least one floating-point processor. The at least one processor may include at least one central processor.

According to a fifth aspect of the present invention there is provided a system comprising a multiple-image sensor system for obtaining images and the computer system of the fourth aspect. The multiple-image sensor system is arranged to provide the images to the computer system and the computer system is configured to process the images.

The system may further comprise a control system. The control system may comprise a system for controlling at least one motor and/or at least one actuator. The control message may be transmitted via a communications network. The communications network may be a TCP/IP or UDP/IP network. The communications network may be a serial network According to a sixth aspect of the present invention there is provided a vehicle, such as a tractor, comprising the system of the fifth aspect. The vehicle may comprise an implement mounted to the vehicle. The implement may be a weed-control implement.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

System Overview

Figure 1:
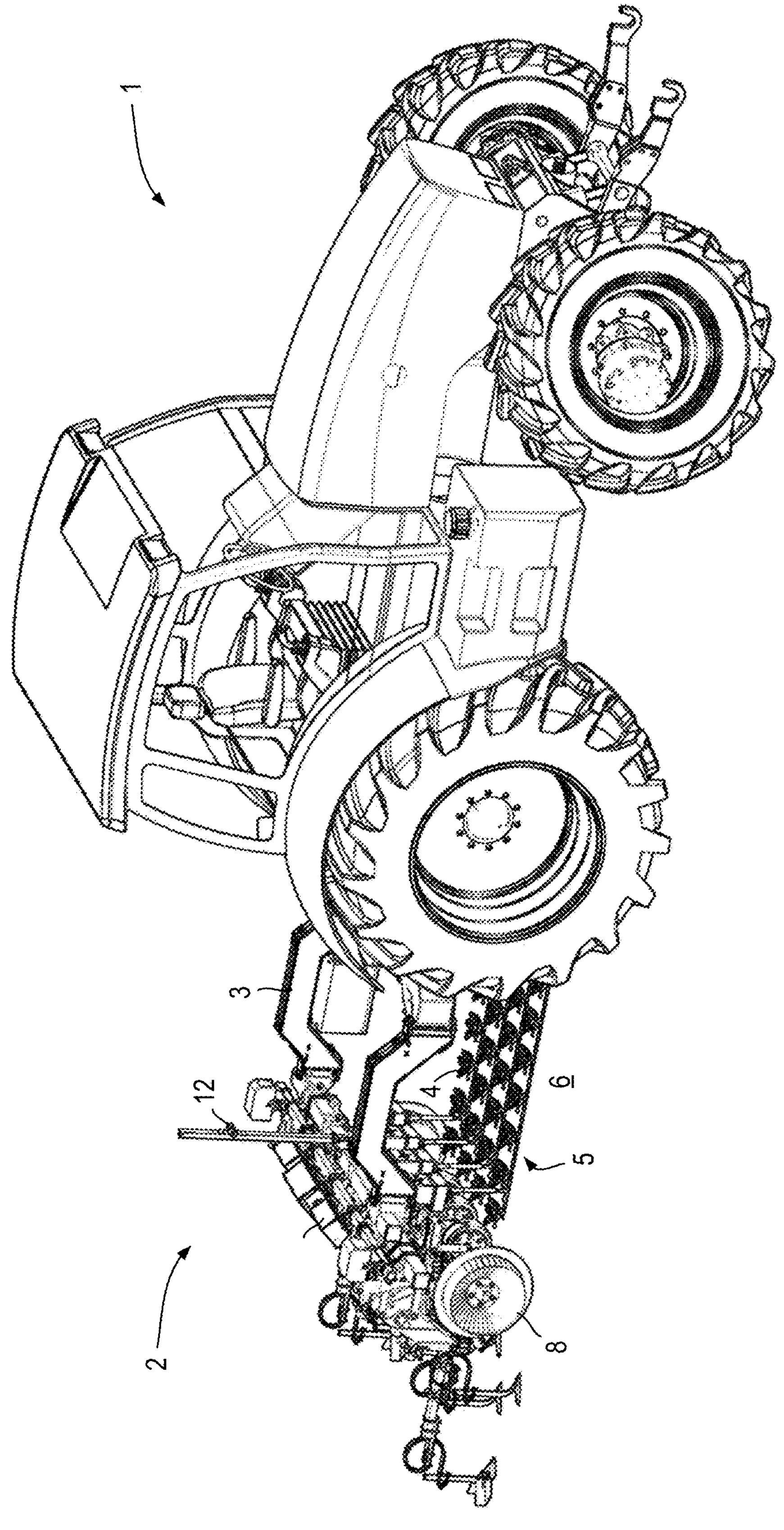
FIG. 1 is a perspective view of a tractor and a rear-mounted weeding implement.

Referring to FIG. 1, a tractor 1 and a weed-control implement 2 (herein also referred to as a "weeding system") mounted to the rear of the tractor 1 using a side shift unit 3 is shown. The weeding system 2 can be used to weed high-value vegetable or salad crops 4 planted in rows 5 in soil 6.

Figure 2:
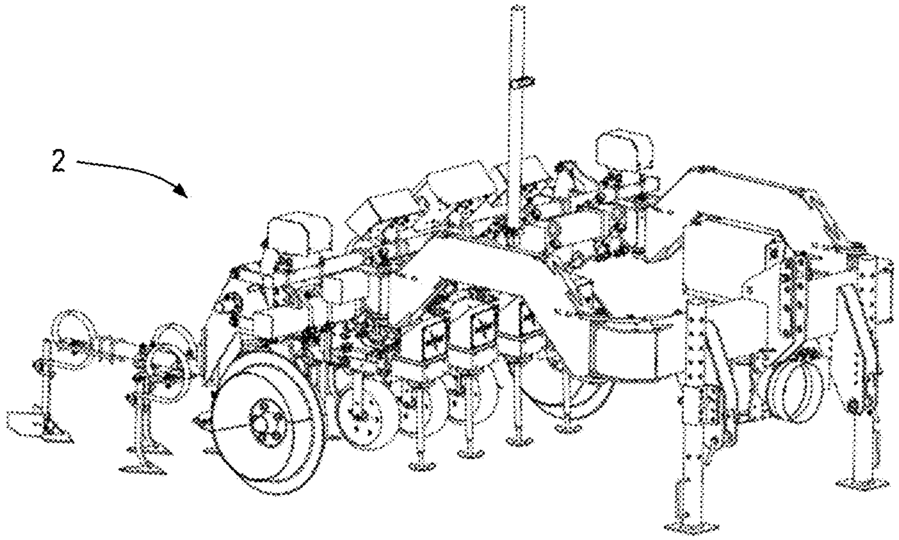
FIG. 2 is a perspective view of a rear-mounted weeding implement.

Referring also to FIG. 2, the weeding system 2 takes the form of a mechanical weeder and includes an array of weeding units (not shown) that destroy weeds (not shown) by uprooting, displacing and/or cutting the weeds. The weeding units (not shown) may be electrically- or hydraulically-driven. The weeding system 2 includes a pair of disc steer units 8 for guiding and levelling the weeding system 2.

The weeding system 2 is of an in-row (or "intra-row") type capable of weeding between plants 4 in a row 5 and employs reciprocating blade weeders or rotary weeders. The weeding system 2 may, however, be an inter-row type of weeding implement (which tends to be used for weeding broad acre crops) and/or may employ other forms of weeder unit, such as reciprocating blade weeders.

As will be described hereinafter, an imaging system 11 (FIG. 4) employing a multiple-image sensor system 12 (or "multiple-camera system" or simply "image sensor system" or "camera system") is used for controlling the weeding system 2 in particular the position of the weeders 7. The imaging system 11 helps identify the positions of plants stems centres. Accurate positioning of plant stems centres can allow the crop to be planted more closely in row and/or for weeding to damage the crop less.

Figure 3:
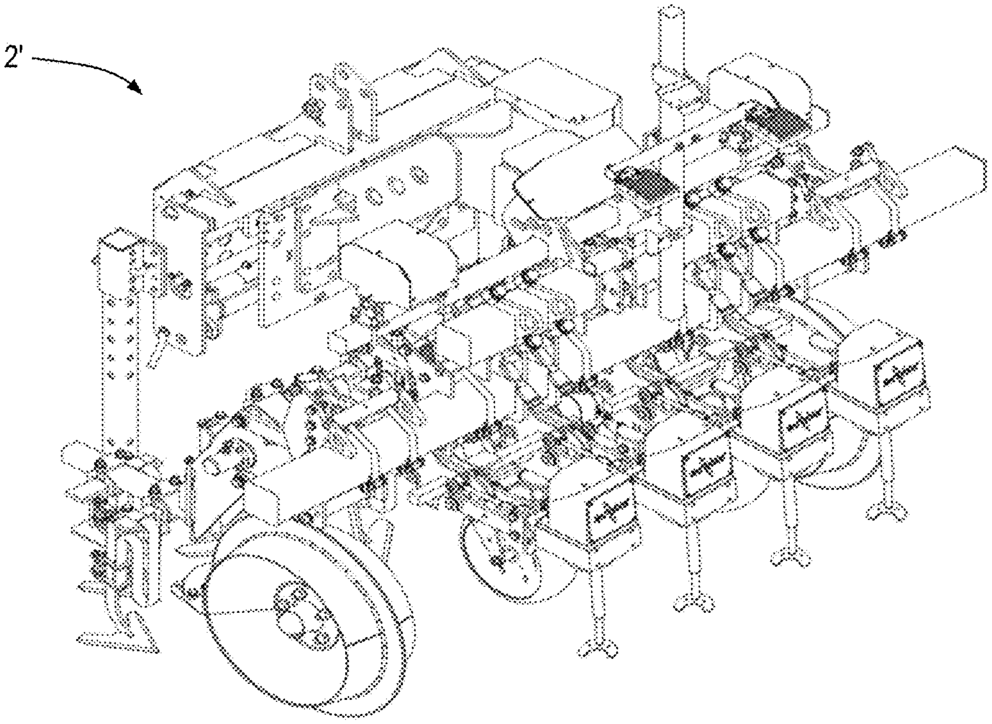
FIG. 3 is a perspective view of a front-mounted weeding implement.

Referring also to FIG. 3, the imaging system 11 can be used in a front-mounted weeding system 2', i.e., a weeding system which is mounted in front of the tractor 1.

Imaging System

Figure 4:
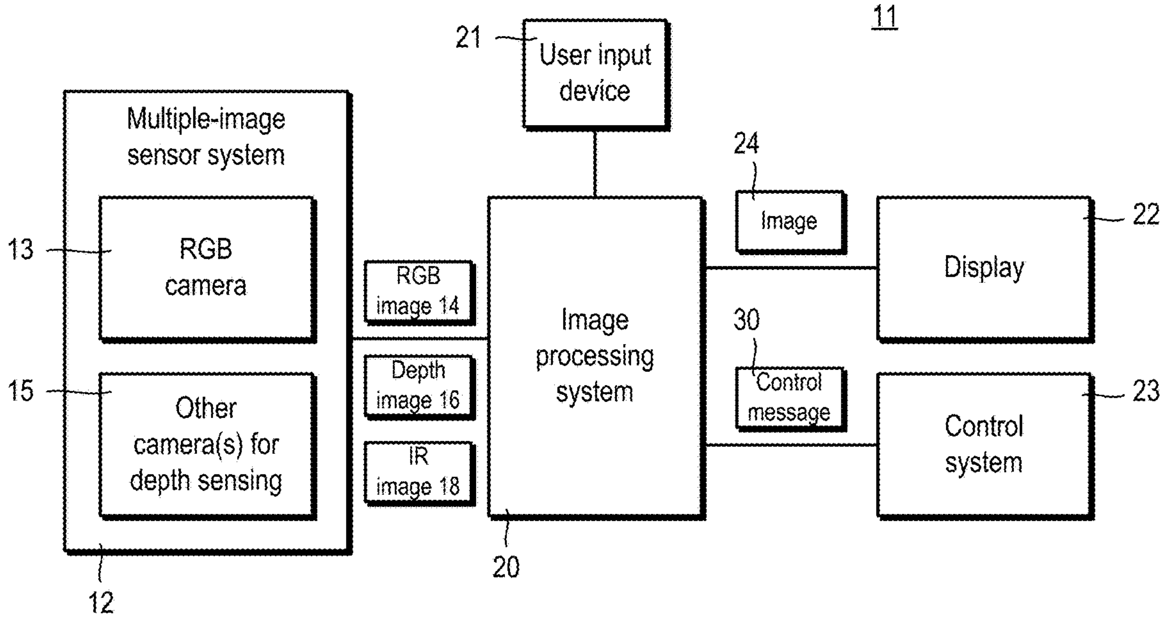
FIG. 4 is a schematic block diagram of an image processing system.

Referring to FIG. 4, the image sensor system 12 comprises a colour image sensor 13 (or "colour camera", "RGB image sensor" or "RGB camera") for obtaining a colour image 14 (or "RGB image") and at least one further image sensor 15 (or "camera") for obtaining a depth image 16. Preferably the cameras 13, 15 are provided in the same unit or housing, although different camera units can be used which are suitably positioned.

In this case, the image sensor system 12 comprises a colour image sensor 13 and two infrared image sensors $\mathbf{15}_1$, $\mathbf{15}_2$ (FIG. 8) which are arranged for stereo depth sensing. Examples of suitable image sensor systems include Intel (RTM) RealSense™ depth camera models D435 and D455. As will be explained in more detail later, the infrared image sensors $\mathbf{15}_1$, $\mathbf{15}_2$ (FIG. 8) can be used to obtain an infrared image 18 that can, together with the colour image 14 and depth image 16, be processed to identify the positions of plants stems 29. The infrared image 18 can also be used to calculate a normalized difference vegetation index (NDVI).

Other combinations of cameras and other types of depth sensing can be used. For example, a colour camera and a time-of-flight infrared-based depth camera 14 can be used, such as an Intel (RTM) RealSense™ LIDAR camera or Microsoft (RTM) Azure Kinect™. Two colour cameras can be used, for example, the Stereolabs™ ZED 2 stereo camera. An external camera (i.e., a different camera not contained in the same housing), such as a separate colour camera, can be provided even if a camera of the same type is already provided, e.g., to provide stereo depth sensing and/or to provide a camera with a different field of view.

Referring still to FIG. 4, the imaging system 11 further comprises an image processing system 20 which takes the form a computer system, user input device(s) 21 such as push buttons, keyboard, pointing device and/or touch display, a display 22 and a control system 23 for controlling at least one motor and/or actuators in the weed-control implement 2. The motor(s) and/or actuator(s) can be used to move the weeding units (FIG. 1) laterally and to raise/lower ("level") the weed-control unit 2. The control system 23 may take the form of a microcontroller or system-on-a-chip, or a microcomputer.

Figure 5:
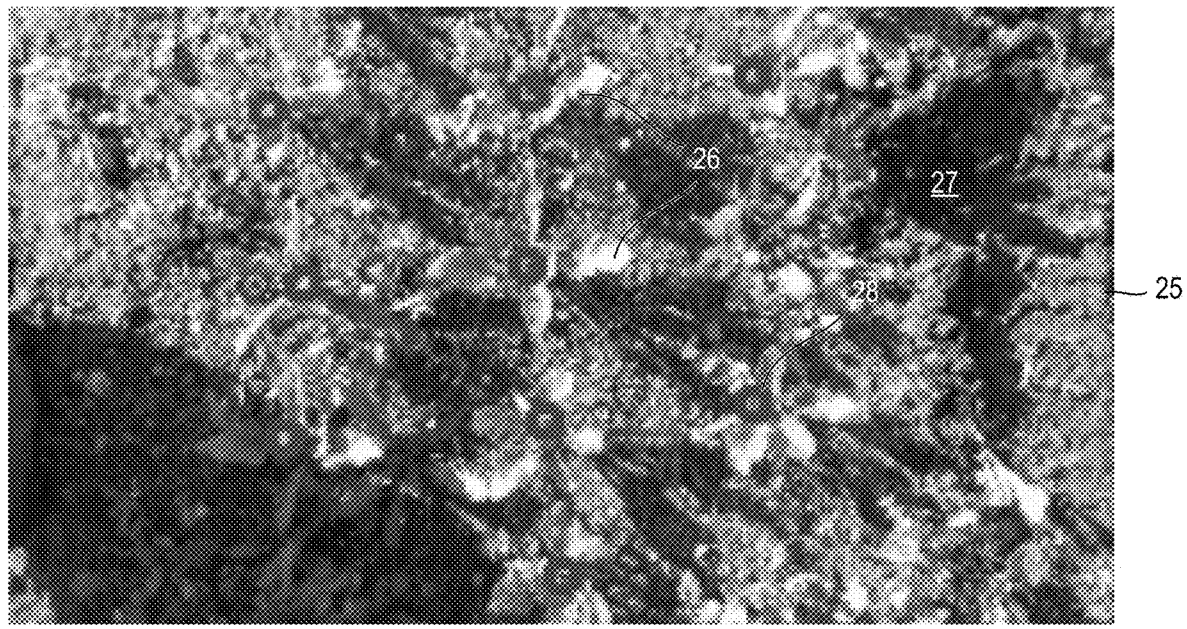
FIG. 5 is an image obtaining using an image processing system of a crop marked with positions of the centres of stem of the crop plants.

FIG. 5 shows an augmented image 24 (or "composite image") which includes an image 25 of plants 26 and the ground 27, and plant stem location marker 28 overlaid onto the image 25. The image 25 takes the form of a colour camera image.

Referring to FIGS. 4 and 5, the image processing system 20 receives a stream of images 14, 16, 18 (for example at frame rate of 30 frames per second) from the image sensor system 12 and processes the images 14, 16, 18 to identify stem locations 29 (or "plant coordinates").

The stem locations 29 are provided to the control system 23 in messages 30 to control the positions of the weeding units.

Figure 6:
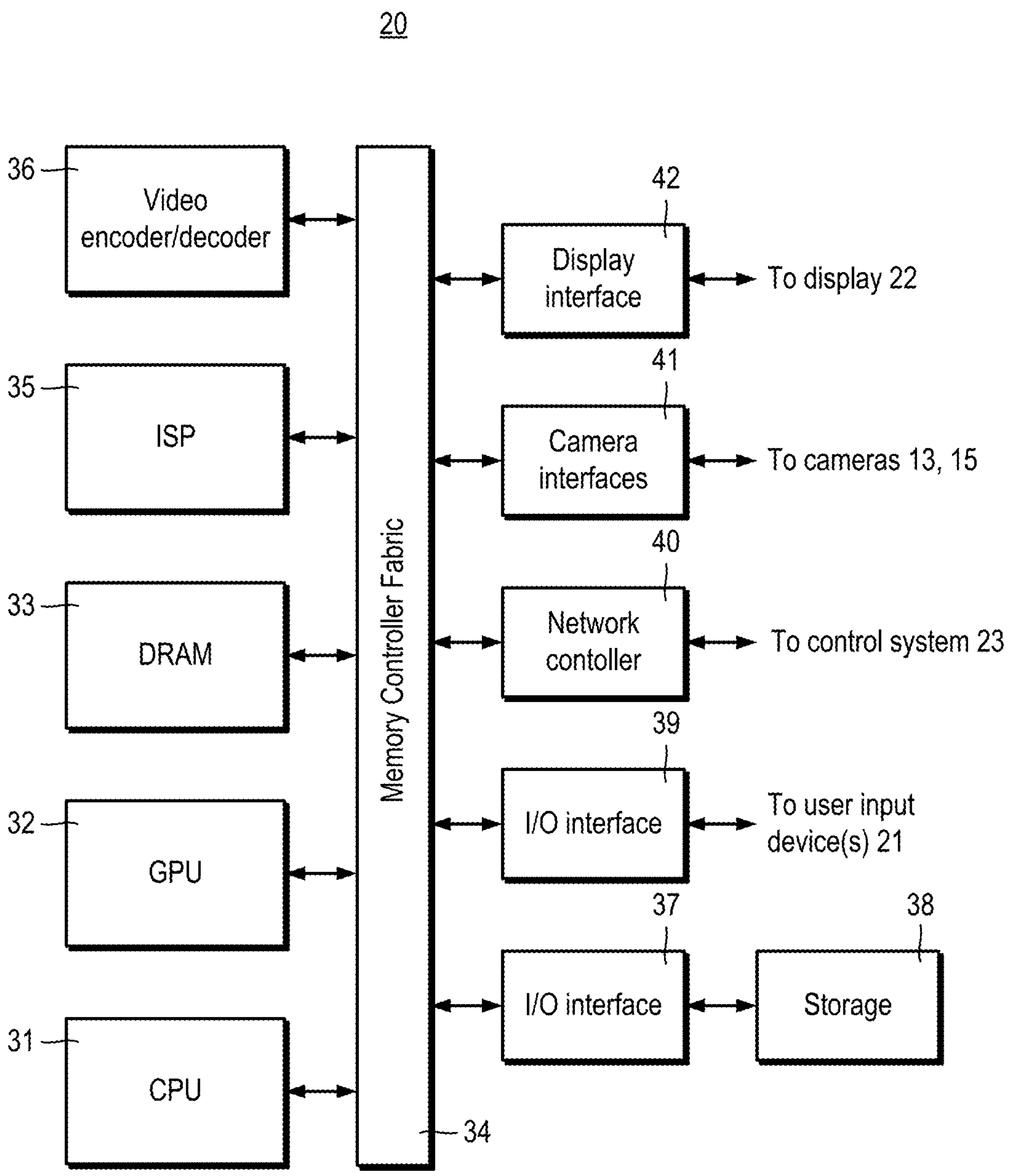
FIG. 6 is schematic block diagram of a computer system for implementing the image processing system shown in FIG. 4.

Referring to FIG. 6, the image processing system 20 includes a central processing unit (CPU) 31, a graphical processing unit (GPU) 32 and DRAM 33 (i.e., memory) connected by memory controller fabric 34. The image processing system 20 also includes image signal processor (ISP) 35, video encoder/decoder 36, a first type of input/output interface 37, such as Peripheral Component Interconnect Express (PCIe), for providing an interface to storage 38, such as an SSD hard drive, a second type of input/output interface 39 such as a USB interface for connecting to user input devices 21, a network controller 40 for providing an interface to the control system 23, camera interfaces 41, such as camera serial interface (CSI) or USB or Ethernet, and a display interface 42, such as High-Definition Multimedia Interface (HDMI).

Figure 7:
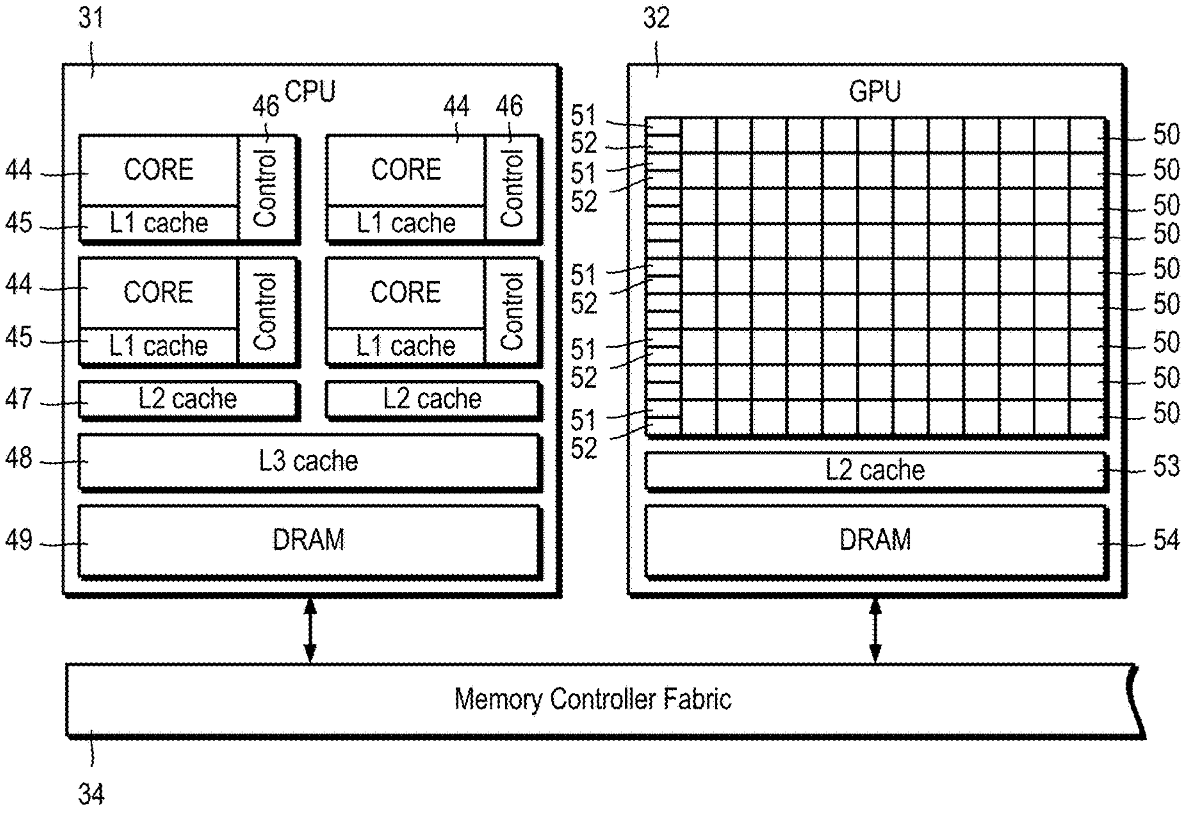
FIG. 7 is schematic block diagram showing a CPU and GPU in the computer system shown in FIG. 6.

Referring to FIG. 7, the CPU 31 comprises multiple cores 44, each core 44 provided with a respective level 1 (L1) cache 45 and flow control units 46. The CPU 31 includes level 2 (L2) cache 47, a level 3 (L3) cache 48 and DRAM 49.

In this example, a four-core CPU 31 can implement simultaneous multithreading (or "hyper-threading") to provide eight executing threads. However, the CPU 31 may have more cores (for example, six or eight cores) or fewer cores (for example, two cores).

Referring still to FIG. 7, the GPU 32 may include multiple streaming multiprocessors (SMs) 50, L1 cache 51, flow control unit 52, L2 cache 53 and DRAM 54. Each SM 50 has four warp schedulers (not shown), each able to execute 32 threads. Thus, the GPU 32 can provide N compute unified device architecture ("cuda") cores, where N is equal number of SMs×number of warp schedulers×number of threads executable by each warp scheduler. In this example, an NVIDIA (RTM) Jetson AGX Xavier™ board is used which provides 512 CUDA cores capable of simultaneously executing 512 threads. Other graphics cards (GPU) can be used, such as AMD Radeon cards be used.

GPU computing allows use of on-chip memory which is quicker than global external GPU RAM. On-chip throughput of shared memory inside an SM can be >1 TB/s and local per-warp RAM can be even quicker.

Image Processing

Figure 8:
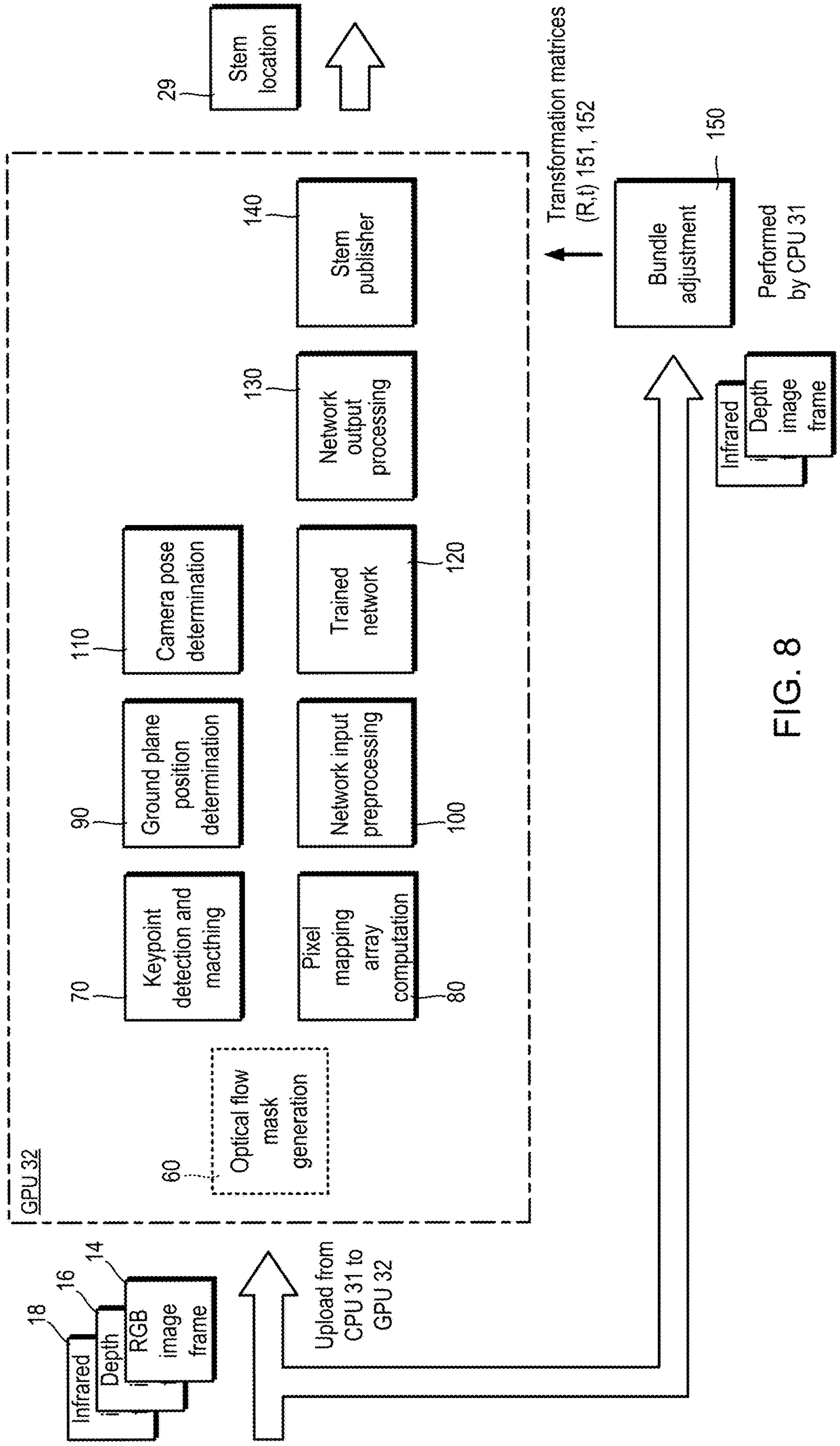
FIG. 8 is a schematic block diagram of process blocks used to process images to produce plant stem centre coordinates.

Referring to FIG. 8, the CPU 31 uploads images 14, 16, 18 from the sensor system 12 (FIG. 4) to the GPU 32 for processing so as to determine stem locations 29.

The GPU 32 includes several processing blocks including an optional optical flow mask generation block 60, a processing block 70 for detecting and matching keypoints, a pixel mapping block 80 and ground plane determination block 90.

The processing blocks include a network input preparation block 100 and a camera pose determination block 110. The processing blocks include a trained neural network block 120, a network output processing block 130 and a stem publisher 140.

The CPU 31 also performs bundle adjustment 150 using depth and infrared images 16, 18 to refine the camera orientation and trajectory. In particular, bundle adjustment block 150 generates translational and rotational matrices $\mathbf{15}_1$, $\mathbf{15}_2$ which are used by the GPU 32 to convert a position in the real world in camera coordinates into a position in the real world in world coordinates. Bundle adjustment 150 may, however, be incorporated into camera pose determination block 110 and be performed by the GPU 32.

Figure 9:
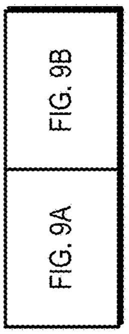
FIGS. 9A and 9B is a more detailed schematic block diagram of the process blocks used to process images to produce plant stem centre coordinates.
Figure 9A:
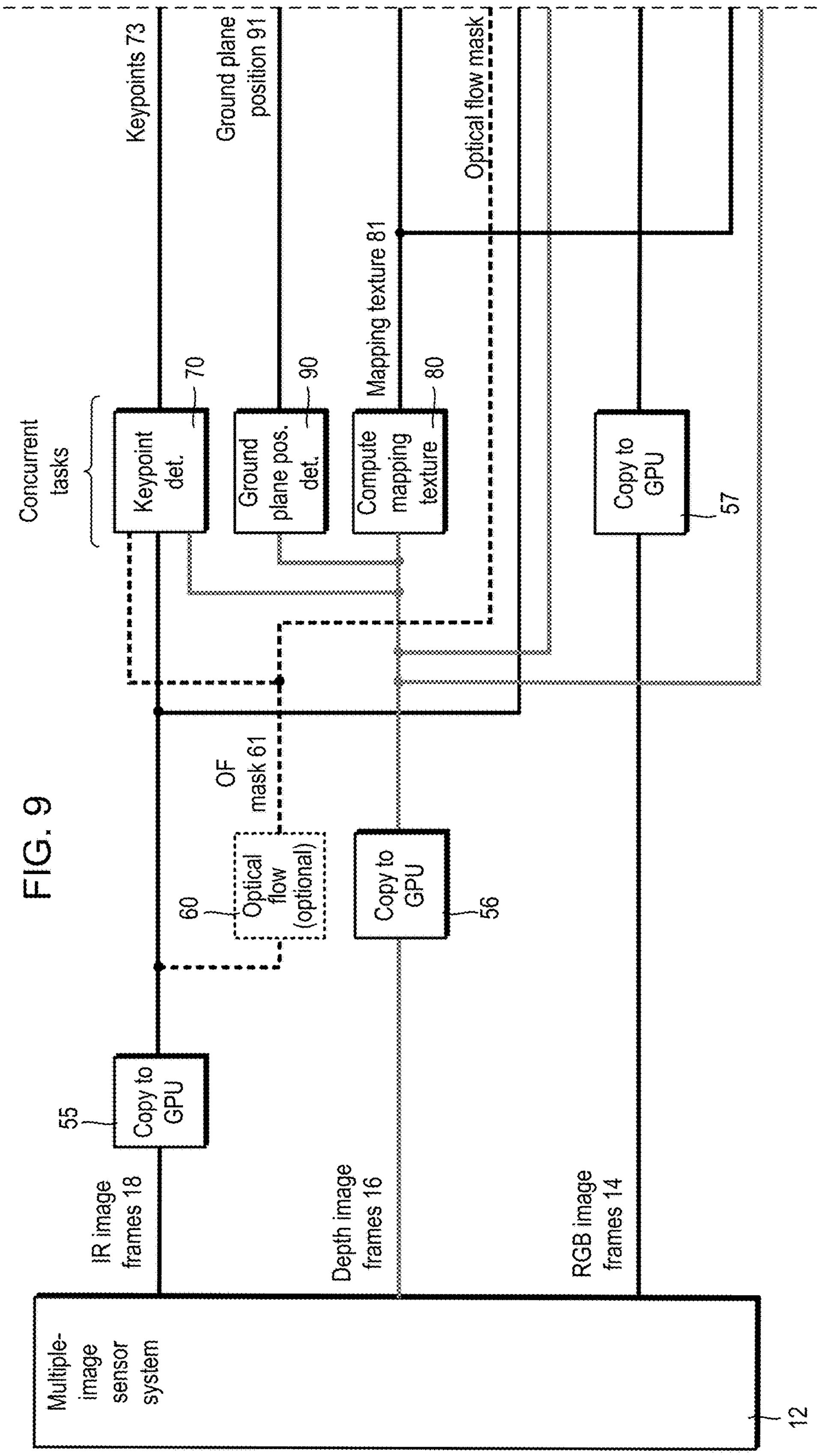

Referring also to FIG. 9, an example of a processing pipeline performed by the CPU 31 and GPU 32 is shown.

The multiple-image sensor system 12 outputs a stream of colour, infrared and depth image frames 14, 16, 18. The CPU 31 processes frames 14, 16, 18, in real-time, on a frame-by-frame basis. Processing in the GPU 32 is staged and ordered so that certain tasks occur at the same time and, thus, make better use of GPU 32 processing.

In block 55, the CPU 31 copies of the infrared image frame 18 pass to the GPU 32. If optical flow is performed, then the infrared image frame 18 passes to the optical flow generation block 60 to generate an optical flow mask 61. The infrared image frame 18 passes to the keypoint detection and matching block 70, for example, based on oriented FAST and rotated BRIEF (ORB), scale-invariant feature transform (SIFT) or speeded up robust features (SURF) processes.

In block 56, the CPU 31 copies the depth image frame 16 to the GPU 32. The depth image frame 16 passes to the keypoint detection and matching block 70, to the mapping array block 80 which generates a mapping array 81 and to the ground plane position determination block 90 which determines the ground plane 91, for example using a random sample consensus (RANSAC) process.

In block 57, the CPU 31 copies the colour image frame 14 to the GPU 32. If generated, the optical flow mask 61 passes to the network input pre-processing block 100.

The keypoint detection and matching block 70 returns matched keypoint positions 73, 73' in pixel coordinates of current frame and world coordinates of previous camera pose. The keypoints 73, 73' pass to the camera pose determination block 110 which outputs camera pose 111. As will be explained in more detail later, the bundle adjustment block 150 (FIG. 8) computes rotational and transformation matrices $\mathbf{15}_1$, $\mathbf{15}_2$ to give the current frame's trajectory from previous camera pose in world coordinates. This allows the camera pose determination block 110 to transform matched points 73' in world coordinates of previous camera pose into the camera pose of the current frame and to project the transformed matched points 73' into the frame.

The colour, depth and infrared image frames 14, 16, 18, optical flow 61 (if used), mapping array 81 and ground plane position 91 pass to the network input pre-processing block 100 which generates a network input image 101 which is fed to a trained network 120 which generates a network output 121 (herein also referred to as a "response map").

Figure 42:
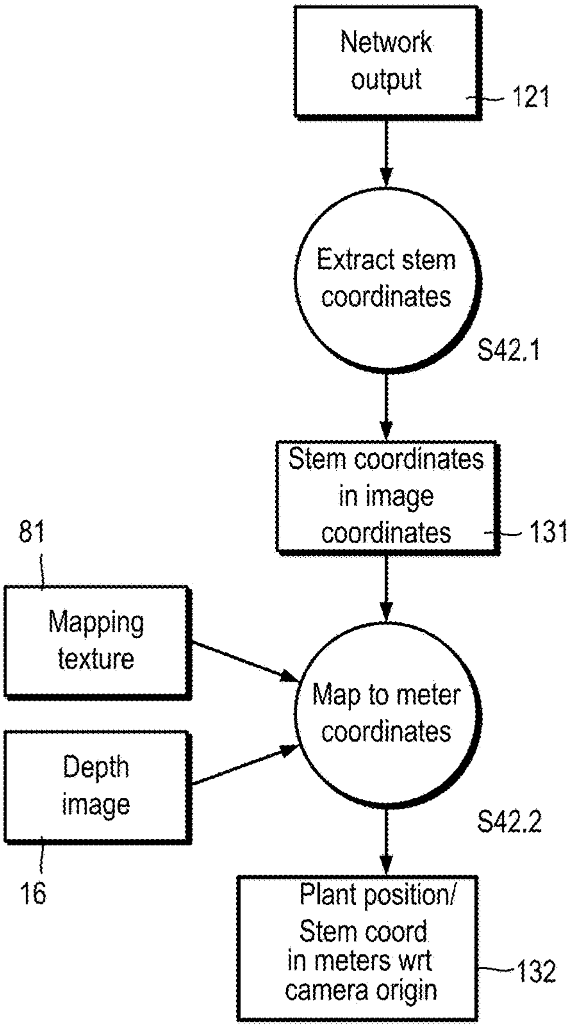
FIG. 42 is a process flow diagram of obtaining plant coordinates in camera coordinates.

The network output 121, the mapping array 81 and depth image frame 16 are pass to the network output processing block 130 which generates plant positions/stem coordinates 131 (FIG. 42) in image coordinates and outputs plant positions/stem coordinates 132 in camera coordinates.

The camera pose 111 and the plant positions/stem coordinates 132 in camera coordinates pass to a stem publisher block 140 which performs stem amalgamation which outputs the plant stem location 29. Using the stem location 29, a new hoe position determination block 160 computes a new hoe position.

Sensor Intrinsics and Extrinsic Parameters

Before describing the image sensor system 12 (FIG. 4) in detail, a brief explanation of some of the terminology will first be given, with reference to FIG. 10.

Figure 10:
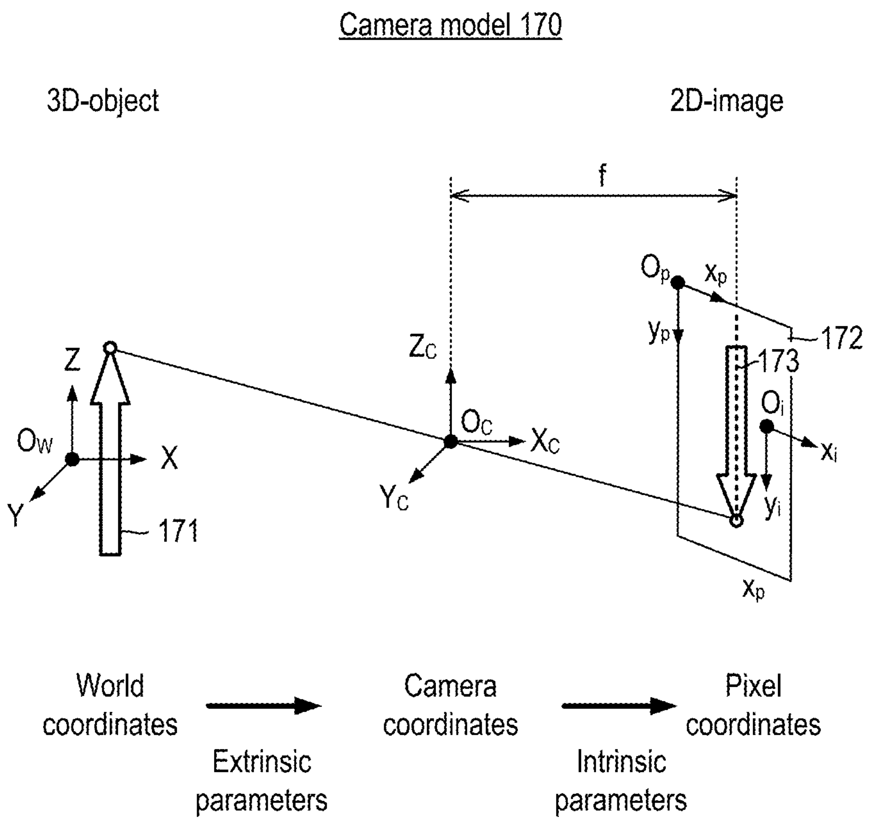
FIG. 10 illustrates a camera model showing different coordinate systems camera calibration parameters.

Referring to FIG. 10, in a camera model 170, a three-dimensional object 171 is projected onto an image plane 172 as a two-dimensional image 173. In the real world, there is a world coordinate system (X', Y', Z') having a principal point $O_W$. In the camera, there is a camera coordinate system ($X_C'$, $Y_C'$, $Z_C'$) having a principal point $O_C$ which serves as a focal point. In the image, there is an image coordinate system ($x_i$, $y_i$) having a principal point $O_i$. The image may also be expressed in terms of a pixel coordinate system ($x_p$, $y_p$) having a principal point $O_p$.

A set of extrinsic parameters (or "extrinsics") can be used to transform (in particular, by rotation and translation) from the world coordinate system (X', Y', Z') to the camera coordinate system ($X_C'$, $Y_C'$, $Z_C'$) and a set of intrinsic parameters (or "intrinsics") can be used to project the camara coordinate system ($X_C'$, $Y_C'$, $Z_C'$) onto the pixel coordinate system ($x_p$, $y_p$) according to focal length f, principal point and skew coefficients.

Processing of images 14, 16, 18 (FIG. 4) from the image sensor system 12 (FIG. 4) involves use of intrinsic and extrinsic parameters.

Hereinafter, in general, coordinates given in lower case, such as x, y, refer to pixel coordinates in an image, and coordinates given in upper case, such as X, Y, refer to normalised coordinates in an image or field of view. Normalised coordinates comprise a pair of values, each value lying in a range between 0 and 1 (i.e., $0 \leq X \leq 1$; $O \leq Y \leq 1$) and can be found by dividing a pixel position in a given dimension by the relevant size of the dimension, that is, width or height (expressed in pixels). Normalised coordinates need not correspond to a discrete pixel and, thus, only take discrete values. Normalised coordinates can be interpolated.

The subscript "W" is used to denote world and the subscript "C" is used to denote camera. Thus, $O_W$ refers to an origin in world coordinates and $O_C$ refers to an origin in world coordinates.

Arrays, Images, Textures, Surfaces and Framebuffer Textures

An array is a portion of memory with an allocated memory address. The address can be expressed in terms of integer values (for example, 32-bit integer values), float values or other formats. An array can be expressed (and accessed) relative to a base memory address using an index number, i.e., the number of values from the base memory address. Arrays can be accessed in strides using two-dimensional or three-dimensional pixel coordinates if later converted to an index position. A one-dimensional indexed array can be accessed in strides to represent two-dimensional or three-dimensional data in row-major or column-major format.

Suitable code for converting x- and y-pixel values x, y into an index value is:

```
___host___ ___device___ int XYtoIndex(int x, int y, int width, int
height)
{
  return int (y*width + x);
```

Using an index can facilitate handling of textures in memory since textures are usually stored in a sequence.

An image tends to be defined as an array, usually with multiple channels. For example, there are three channels for an RGB image and there are four channels for an RGBA image. Allocated memory is divided into 8-bit (i.e., one byte) integer values in the range 0 to 255. Like an array, an image can be expressed (and accessed) using an index value or pixel coordinates if later converted to an index position.

Textures are accessed through a texture cache (not shown) on a GPU 32 (FIG. 7) which allows special accessing of values using two-dimensional normalised coordinates. The texture cache (not shown) also allows hardware interpolation of neighbouring pixels, allowing normalised coordinates between pixel positions still to be accessed. Interpolation is assumed to be linear, unless otherwise stated, giving linear interpolation between neighbouring pixels. Nearest interpolation, however, can also be used, which returns the nearest pixel position to the desired normalised coordinate.

Texture accessing of values is often quicker than normal array accessing on a GPU 32 (FIG. 7) which can increase processing speed. 8- and 16-bit values created as textures can also be normalised between 0 and 1.0 to provide more flexible accessing. Texture accessing can also take advantage of the wide width (e.g., 128 bits) of the bus (not shown) in the GPU 32 (FIG. 7) which can allow all four channels of an image texture (RGBA) to be returned simultaneously.

Textures are created by copying memory via the texture cache (not shown) to create a new texture object (not shown).

Surfaces are special, writable textures enabling values to be written to surface memory (not shown) in the memory 33 (FIG. 6) in pixel coordinates and later read as a normal texture using normalised coordinates. This can be particularly useful for allowing calculated values to be used to render composite views from multiple textures.

Framebuffer textures allow textures to be rendered, without displaying on a screen, into a texture object and used later on in the pipeline. Thus, it replaces the screen as the primary destination to display textures. Since it is itself a texture, a framebuffer texture can be accessed later on using two-dimensional normalised coordinates.

As will be explained in more detail hereinafter, a mapping texture can be written as a surface to memory (during generation), and read as a texture from memory. Textures can be accessed, rendered, read from and written to via graphics frameworks such as OpenGL and accessed via the cudaTextureObject_t in Nvidia CUDA API via cuda-OpenGL interoperability. Other GPU frameworks, other than CUDA APIs can be used, such as Open CL.

As explained earlier, colour, infrared and depth frames 14, 16, 18 are copied onto the GPU before mapping texture generation. Thus, once copied to the GPU 32, colour, infrared and depth frames 14, 16, 18 can be referred to as textures.

Figure 9B:
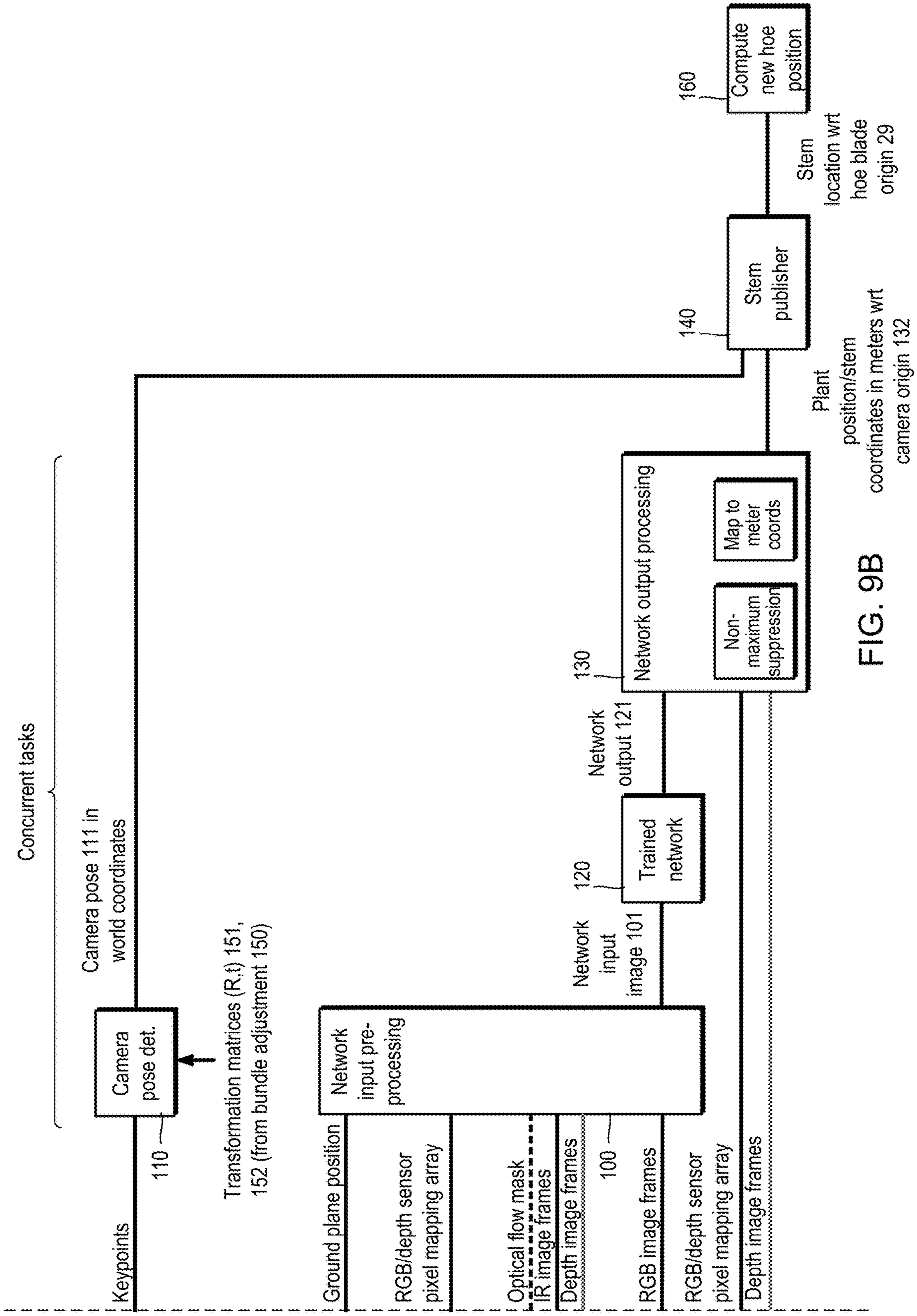

As will be explained in more detail hereinafter, a final composite in RGBNDI format is rendered using the mapping texture, depth, infrared and colour textures to a framebuffer texture. The framebuffer texture is later sampled to create the network input array 101 (FIG. 9B) to go into the network 120 (FIG. 9B).

Image Sensor System 12

Figure 11:
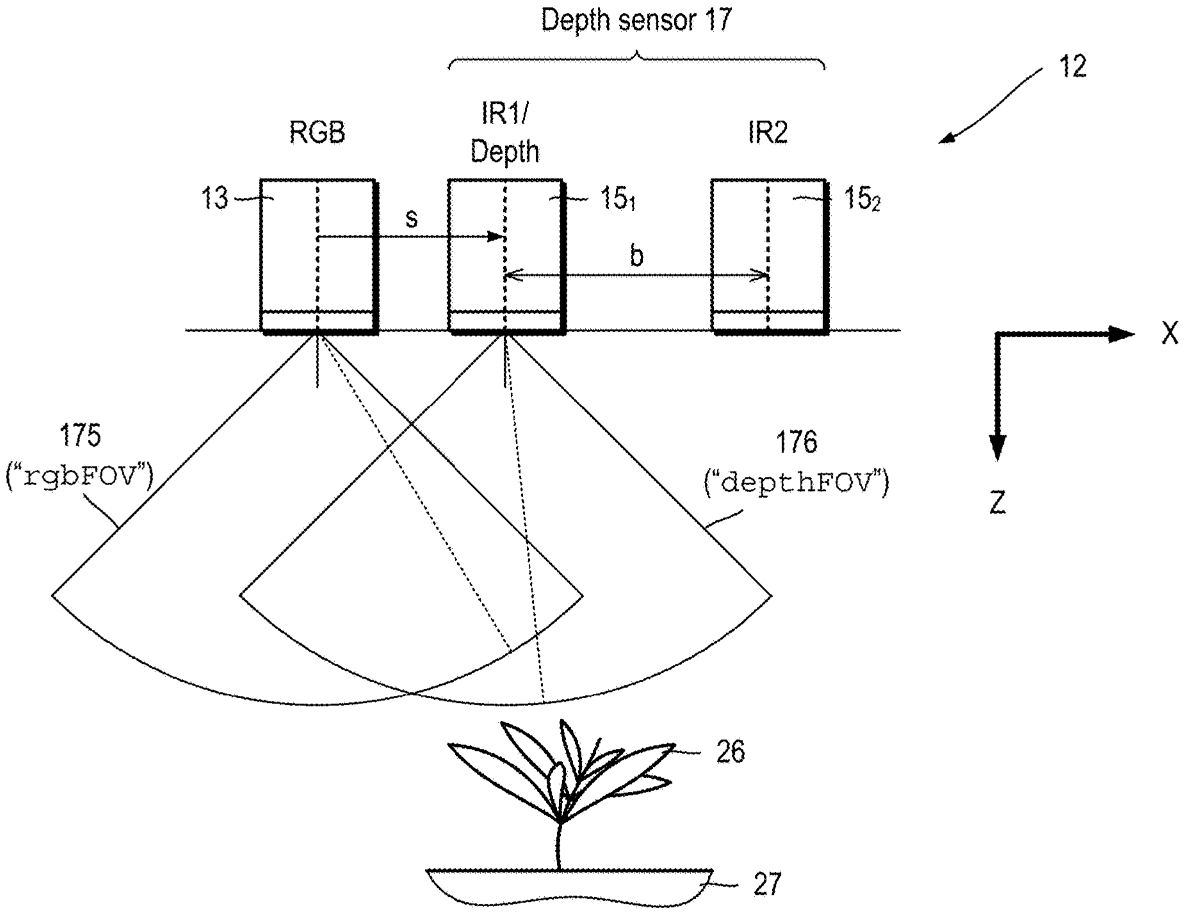
FIG. 11 is schematic diagram of a set of sensors which is capable of sensing depth including at least one infrared sensor and a colour sensor.

Referring to FIG. 11, the image sensor system 12 comprises a colour image sensor 13 and first and second infrared image sensors $15_1$, $15_2$ (herein referred to as "left and right infrared image sensors" respectively or simply "IR1 and IR2" respectively) which are arranged for stereo depth sensing. The image sensor system 12 is used to capture video comprising a series (or "stream") of images 14, 16, 18 ("or frames") at a frame rate of, for example, 30 frames per seconds, and present the images 14, 16, 18 to the image processing system 20 (FIG. 4) for processing in real time. In the following, description of processing of individual images/frames 14, 16, 18 will be described, although it will be appreciated that processing is repeatedly performed the image streams. The sensors 13, $15_1$, $15_2$ are orientated at an inclined angle (in other words, with a downward component) towards plants 26 and the ground 27.

The colour image sensor 13 is used to obtain a colour image 14 and the infrared image sensors $15_1$, $15_2$ are used to obtain a depth image 16 which is aligned with respect to the first infrared image sensor $15_1$. The first infrared image sensor $15_1$ can also be used to obtain an infrared image 18. As will be explained hereinafter in more detail, the infrared image 18 can be used to create a normalized difference vegetation index (NDVI) image. Herein, the infrared image sensors $15_1$, $15_2$ are referred to a depth sensor 17.

The colour image sensor 13 is offset by a distance s with respect to a first infrared image sensor $15_1$. The colour image sensor 13 may suffer from distortion, such as modified Brown-Conrady distortion, whereas the infrared image sensors $15_1$, $15_2$ may not suffer distortion or may suffer distortion which is different from that suffered by the colour image sensor 13. Furthermore, the colour image sensor 13 may have a field of view 175 ("rgbFOV") which is different from a field of view 176 ("depthFOV") of the infrared image sensor $15_1$. However, in some image sensor systems, the colour image sensors and infrared image sensors may have the same field of view 175, 176. As a result of the offset s, distortion and possible differences in field of views 175, 176, the colour image 14 and the depth image 16 and infrared image 18 may be mis-aligned and/or can have different boundaries.

Relationship Between Fields of View of the Colour and Depth Sensors 13, 17

Figure 12:
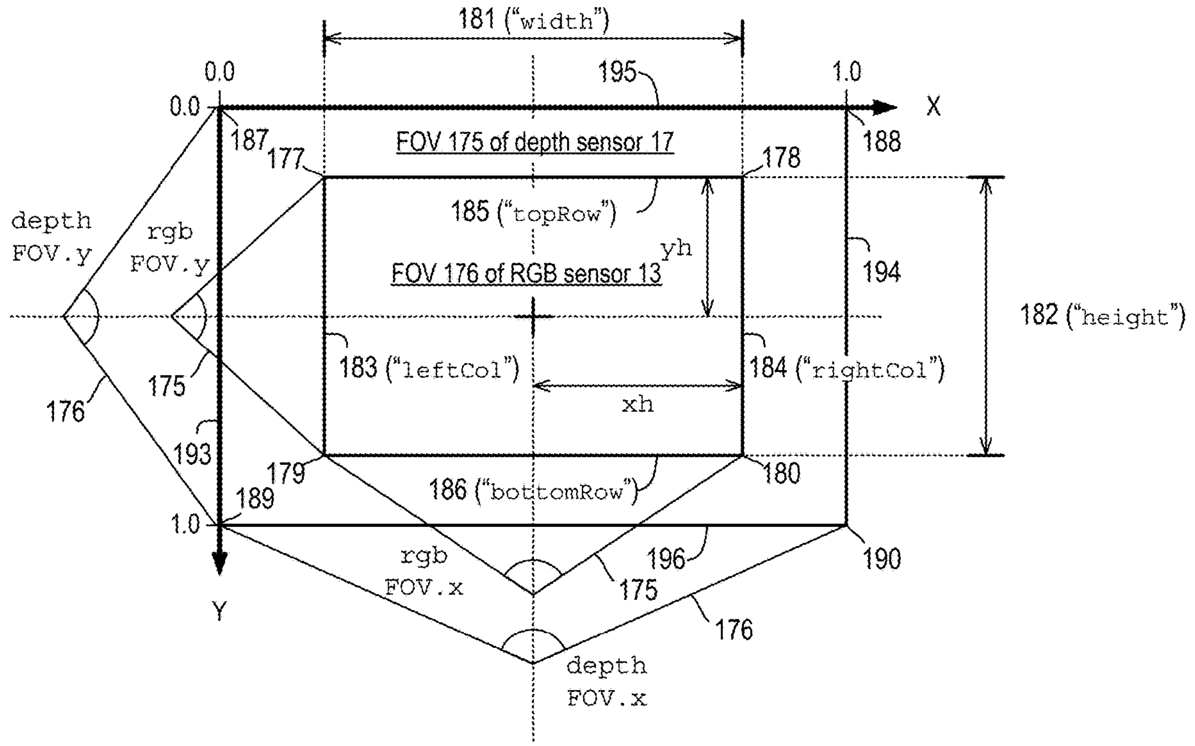
FIG. 12 illustrates fields of view of a colour sensor and depth sensor.

Referring to FIG. 12, the fields of view 175, 176 of the colour and depth sensors 13, 17 are shown.

The colour sensor 13 has an upper-left corner 177 ("rgbTopLeft"), an upper-right corner 178 ("rgbTopRight"), a lower-left corner 179 ("rgbBottomLeft") and a lower-right corner 180 ("rgbBottomRight"), a width 181 ("width") and height 182 ("height"), a left edge 183 ("leftCol"), a right edge 184 ("rightCol"), a top edge 185 ("topRow") and a bottom edge 186 ("bottomRow"). The depth sensor 17 has upper left, upper right, lower left and lower right corners 187, 188, 189, 190, a width 191 and height 192, a left edge 193, a right edge 194, a top edge 195, and a bottom edge 196.

The depth sensor 17 has a larger field of view than the colour sensor 13. Accordingly, not every part of an image obtained by the depth sensor 17 can be mapped to a corresponding part of an image obtained by the colour sensor 13.

Figure 13:
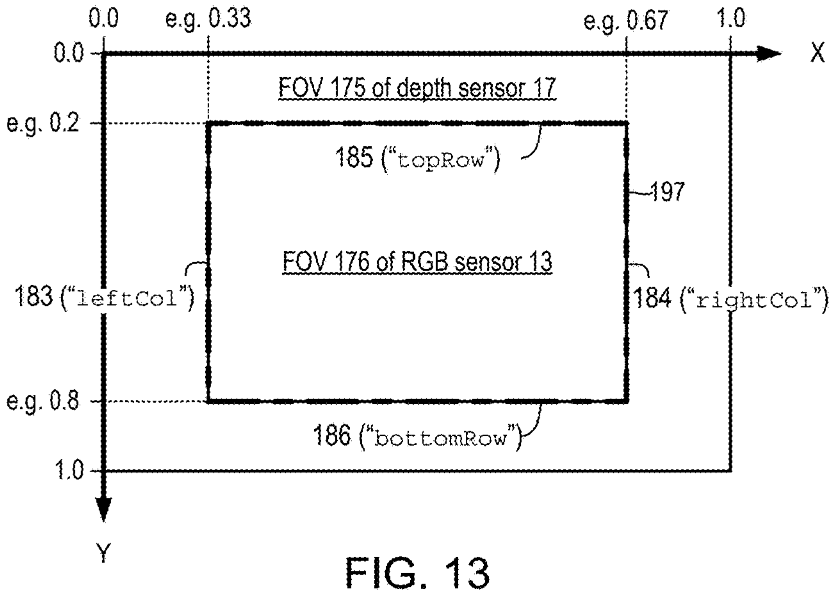
FIG. 13 illustrates fields of view of a colour sensor and depth sensor and a search area.

Referring to FIG. 13, the edges 183, 184, 185, 186 of the field of view 175 of the colour sensor 13 serve as boundaries of a search space 197 (i.e., a region of the depth sensor 17 needed to provide depth values) found by comparing the fields of view 175, 176 of the colour and depth sensors 13, 17. The edges of the search space 197 are expressed in normalised coordinates (X, Y), for example, leftCol=0.33 and rightCol=1−leftCol=0.67.

The focal lengths of the colour and depth sensors 13, 17 are used to compute the corners 177, 178, 179, 180 of the colour sensor 13. The sensors 13, 17 have respective sets of intrinsic parameters including an x-value of the position of a principal point ("ppx"), a y-value of the position of the principal point ("ppy"), an x-value of the position of a focal point ("fx"), and a y-value of the position of the focal point ("fy"). The width 181 and height 182 (of the field of view) of the colour sensor 13 are width and height respectively. For example, width and height of the colour sensor 13 may take values of 424 and 240 pixels respectively.

The x- and y-values ("FOV.x", "FOV.y") of a field of view FOV can be calculated using:

$$FOV.x = \arctan(ppx + 0.5 / fx) + \arctan((\text{width} - (ppx + 0.5)) / fx)$$

$$FOV.y = \arctan(ppy + 0.5 / fy) + \arctan((\text{height} - (ppy + 0.5)) / fy)$$

The half-frame values of width xh and height yh of the colour sensor 13 with respect to the depth sensor 17 can be calculated using:

$$xh = \tan(rgbFOV.x / 2) / (2 * \tan(depthFOV.x / 2))$$

$$yh = \tan(rgbFOV.y / 2) / (2 * \tan(depthFOV.y / 2))$$

The corner positions 177, 178, 179, 180 of the colour sensor 13 with respect to the depth sensor 17 can be calculated using:

$$rgbBottomRight = \{0.5 + xh, 0.5 + yh\}$$

$$r - bBottomLeft = \{0.5 - xh, 0.5 + yh\}$$

$$rgbTopRig - t = \{0.5 + xh, 0.5 - yh -$$

$$rgbTopLe - t = \{0.5 - xh, 0.5 - yh\}$$

As will be explained in more detail hereinafter, the boundaries 183, 184, 185, 186 of the colour sensor 13 are computed during initialisation of the system 20 and are subsequently used in mapping array generation and pixel mapping. Reducing the proportion of the depth sensor 17 that needs to be mapped onto the colour sensor 13 can help to reduce processing and memory overheads. For example, along with faster texture memory accesses on the GPU 32 (FIG. 7), it can speed-up alignment of depth to colour sensors by about a factor of three compared to CUDA code in the Realsense (RTM) software development kit (SDK).

Pixel Mapping

Referring to FIGS. 4, 11 to 15, the image processing system 20 employs mapping (herein referred to as "pixel mapping") to align images from different sources (such as different image sensors 13, $15_1$, $15_2$) allowing images to be processed in parallel.

As hereinbefore described, the infrared sensors $15_1$, $15_2$ can also be seen as a depth sensor 17. For convenience, when discussing the source of depth images 16, the infrared sensors $15_1$, $15_2$ are describes as a unitary depth sensor 17. However, as explained earlier, depth image can be obtained in other ways, e.g., without stereo depth sensing and/or without using infrared sensors.

As hereinbefore explained, the image processing system 20 can compute sensor boundaries (step S15.1). This typically need only be performed once, during initialisation, for example, when the system 20 is switched on.

The image processing system 20 processes images from the colour sensor 13 and the infrared sensors $15_1$, $15_2$ (steps S15.2 and S15.3). Frames from the sensors 13, $15_1$, $15_2$ (i.e., colour images 14 and depth images 16) are processed frame-by-frame (for example, at a frame rate of 30 fps) in real time.

Figure 14:
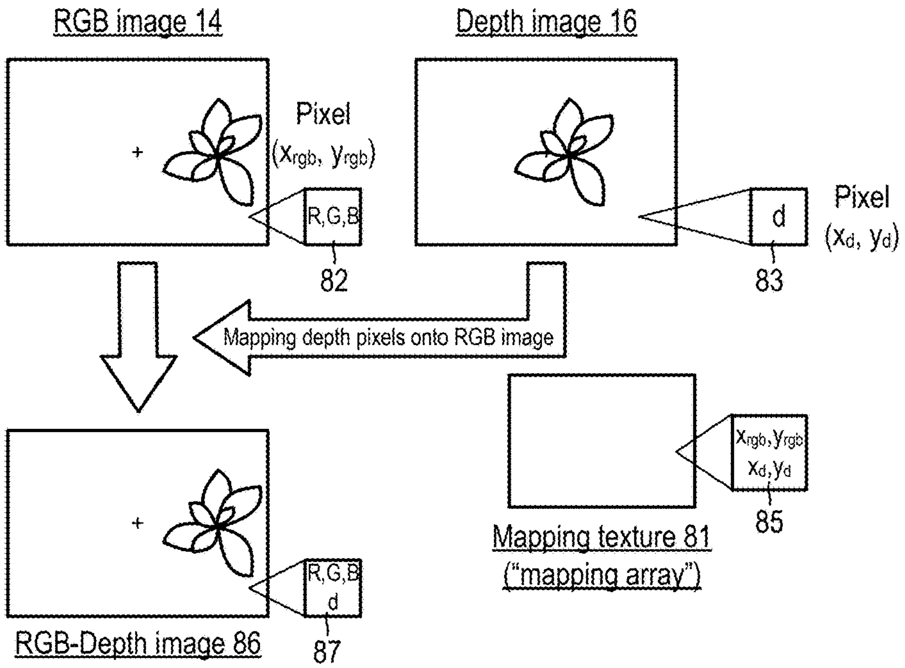
FIG. 14 schematically illustrates obtaining a mapping array (or "mapping texture") from a colour image and a depth image.
Figure 15:
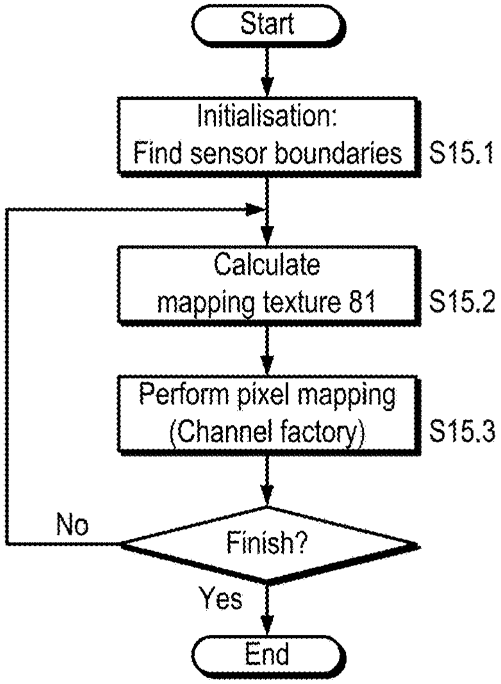
FIG. 15 is a process flow diagram of calculating a mapping array and performing pixel mapping.

Referring in particular to FIG. 14, the colour image 14 and the depth image 16 can be seen as respective arrays of pixels 82, 83. Expressed in terms of pixel coordinates, a pixel 82 in the colour image 14 has a coordinate $x_{rgb}$, $y_{rgb}$ and a pixel 83 in the depth image 16 has a coordinate xa, Ya. The pixel 82 in the colour image 14 contains respecle values for red (R), green (G) and blue (B) for example, as a triplet of values lying between 0 and 255. Other numeric representations can be used. For example, values can take the form of floating-point numbers. Other colour models can be used. For example, a YUV system, such as YCbCr system, can be used.

Generating Mapping Texture

A mapping array 81 (herein also referred to as a "mapping texture") comprising mapping information 85, for example two pairs of pixel coordinates, is used to map depth pixels 83 from the depth image 16 onto the colour image 14 to create a colour-depth image 86 which can be seen as an array of pixels 87 containing both colour and depth information. As explained earlier, by using a search area 197 (FIG. 13), less depth image data need be mapped. Also, as will be explained in more detail hereinafter, the mapping array 81 can be used to map infrared image data.

Images can be processed without adjusting for perspective (herein referred to as "unadjusted mapping" or "straight mapping") or adjusting for perspective (herein referred to as "view-transforming mapping" or "plan view mapping") by, for example, using constant width mapping or mapping using orthographic projection.

Generating Mapping Texture without Adjusting for Perspective

Figure 16:
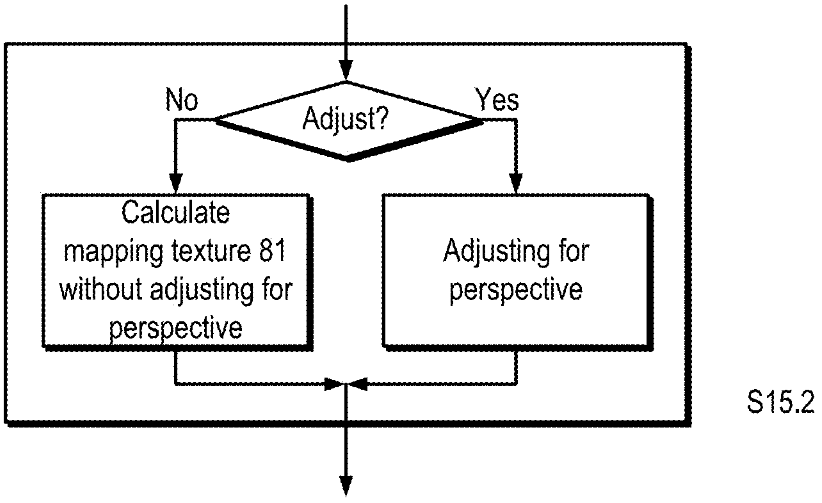
FIG. 16 illustrates selection of two different types of mapping array calculation.
Figure 17:
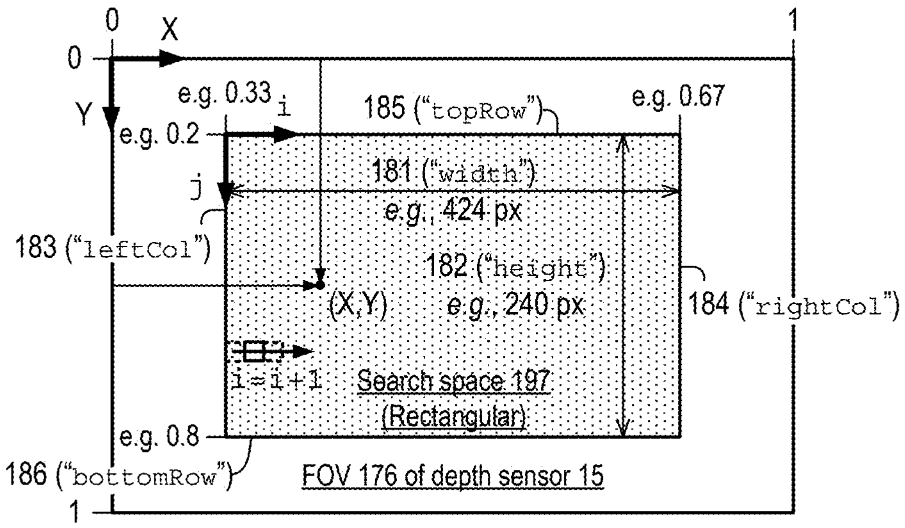
FIG. 17 illustrates a rectangular search space used in mapping array calculation.
Figure 18:
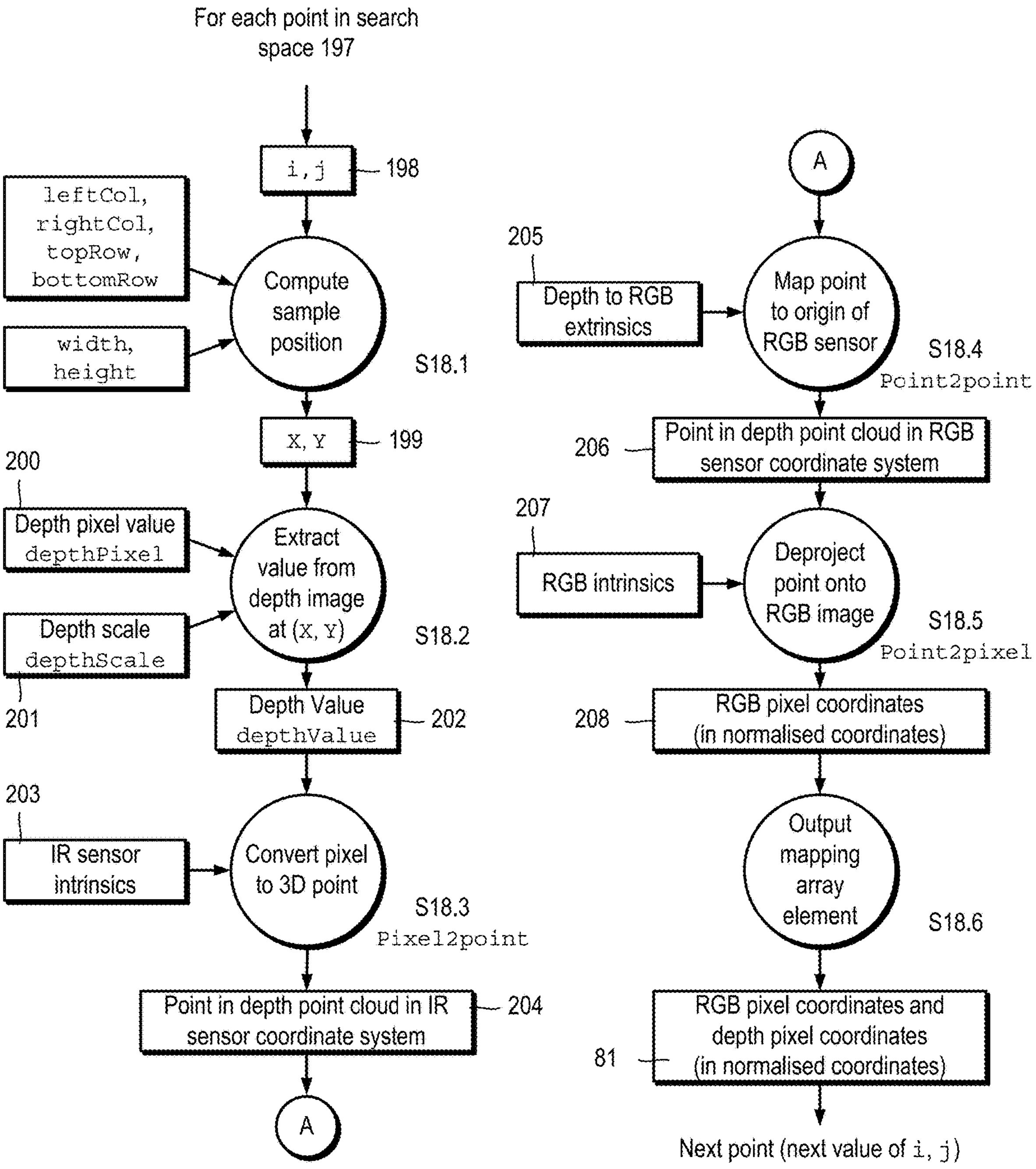
FIG. 18 illustrates a process of calculating a mapping array.

Referring to FIGS. 16, 17 and 18, generation of a mapping texture 81 without adjusting for perspective will now be described.

The boundaries 183, 184, 185, 186 of the field of view 59 of the colour sensor 13 (or simply "the boundaries 183, 184, 185, 186 of the colour sensor 13") provide the boundaries of the search area 197. Thus, in this case, the search area 197 is rectangular. In the case where an adjustment is made for perspective, a modified, non-rectangular search area is used.

The GPU 32 (FIG. 7) steps through the search area 197 using a pair of index values (i, j) 198, starting at (0,0) incrementing i until the end of the row is reached, then resetting i and incrementing j, then incrementing i and so on.

The GPU 32 (FIG. 7) finds an interpolated sample position 199 ("X, Y"), expressed in normalised coordinates, within the boundaries 183, 184, 185, 186 of the colour sensor 13 using the index values i, j, the width 181 and height 182 of the colour sensor 13 (which is also the width and height of the search area 197), and the values of boundaries 183, 184, 185, 186 of the colour sensor 13. Examples of values (in normalised coordinates) of the left and right columns 183, 184 are 0.33 and 0.67 respectively and top and bottom rows 185, 186 are 0.2 and 0.8 respectively (step S18.1).

The GPU 32 extracts a pixel value 200 ("depthPixel") of a pixel 83 (FIG. 14) from the depth image 16 using the interpolated sample position 199 and, using a scaling factor 201 ("depthScale"), generates a depth value 202 ("depthValue") in a real-world unit of distance, in this case, meters (step S18.2). The pixel value 200 is a 16-bit integer number (and so can take a value of between 0 and 65,536), the scaling factor 201 is a floating-point number which can take a value between 0 and 1 and the depth value 202 takes the form of a floating-point number. Other number formats can be used.

The GPU 32 uses the extracted depth value 202 and infrared sensor intrinsics 203 ("intrinDepth") to generate a depth point 204 ("depthPoint") in a point cloud having coordinates in the infrared camera coordinate system ($X_{IR}$, $Y_{IR}$, $Z_{IR}$) (step S18.3). Suitable code which generates the depth point 204 is:

```
float3 depthPoint = pixel2Point(depthValue, ((X*intrinDepth->width)+0.5,Y*intrinDepth->height)+0.5,intrinDepth);
```

which calls the function pixel2Point, which in turn returns depthCoord as the depth point 204:

```
device
float3 pixel2Point(float depth, float X, float Y, rs2_instrinsics*depth
Intrin)
{
  float3 depthCoord;
  depthCoord.z = depth;
```

-continued

```
  depthCoord.y = ((Y-depthIntrin->ppy)/depthIntrin->fy)*depthCoord.z;
  depthCoord.x = ((X-depthIntrin->ppx)/depthIntrin->fx)*depthCoord.z;
  return depthCoord
}
```

The GPU 32 then uses depth-to-colour extrinsics 205 ("extrinD2C") to map the depth point 204 having coordinates in the infrared camera coordinate system to a depth point 206 ("rgbPoint") in a point cloud having coordinates in the colour camera coordinate system ($x_{rgb}$, $y_{rgb}$, $Z_{rgb}$) (step S18.4). The depth-to-colour extrinsics 205 are based on based on infrared sensor extrinsics (not shown) and colour sensor extrinsics (not shown), for example, by multiplying the two sets of extrinsics.

Suitable code which generates the depth point 206 is:

```
float3 rgbPoint = point2Poin t(depthPoint,extrinD2C);
```

which calls the function point2Point, which in turn returns rgbCoord as the depth point 206:

```
device
float3 point2Point(float depthCoord, s2_extrinsics*depth2RGB)
{
  float3 rgbCoord;
  float*rot = depth2RGB->rotation;
  float*trans = depth2RGB->translation;
  float X = depthCoord.x;
  float Y = depthCoord.y;
  float z = depthCoord.z
  rgbCoord.x = X*rot[0] + Y*rot[3] + Z*rot[6] + trans [0];
  rgbCoord.y = X*rot[1] + Y*rot[4] + Z*rot[7] + trans [1]
  rgbCoord.z = X*rot[2] + Y*rot[5] + Z*rot[8] + trans [2]
  return rgbCoord
}
```

The GPU 32 then uses colour sensor intrinsics 207 ("intrinCol") to deproject the depth point 206 into $x_{rgb}$, $y_{rgb}$ coordinates 208 on the colour sensor (step S18.5). Suitable code which generates the coordinates 211 is:

```
float2 rgbCoord = point2Pixel(rgbPoint,intrinCol);
rgbCoord = {rgbCoord.x-0.5f/inntrinCol->width), rgbCoord.y-
  (0.5f/inntrinCol->height)};
```

which calls the function point2Pixel, which in turn returns texCoord as the coordinates 208:

```
device
float2 point2Pixel(float3 rgbCoord, rs2_instrinsics*rgbIntrin)
{
  float2 texCoord;
  texCoord.x = (((rgbCoord.x/rgbCoord.z)*rgbIntrin->fx) +
rgbIntrin->ppx)/rgbIntrin->width;
  texCoord.y = (((rgbCoord.y/rgbCoord.z)*rgbIntrin->fy) +
rgbIntrin->ppy)/rgbIntrin->height ;
  return texCoord
}
```

The GPU 32 out outputs a set of two pairs of coordinates comprising x- and y-colour pixel values $x_{rgb}$, $y_{rgb}$ and x- and y-depth pixel values $x_d$, $y_d$ ("outputArray")

```
outputArray[normXYtoIndex(rgbCoord.x,rgbCoord.y,width,height)])=
  {rgbCoord.x, rgbCoord.y, X, Y}
```

In this example, the x- and y-colour pixel values $x_{rgb}$, $y_{rgb}$ are output as an index value found by calling a function normXYto Index:

```
___host___ ___device___ int normXYtoIndex(float x, float y, int width,
int height)
{
  int X = x*width;
  int Y = y*height;
  return int (Y*width + X);
```

Using an index can facilitate handling of textures in memory since textures are usually stored in a sequence in memory. However, conversion into an index value is not necessary.

Adjusting for Perspective

The cameras sensors 13, 15$_1$, 15$_2$ (FIG. 9) are usually orientated at the ground at an acute or obtuse angle, in other words, not perpendicular. Thus, when a two-dimensional image of parallel rows of crops is captured using the sensors 13, 15$_1$, 15$_2$ (FIG. 9) and rendered, the rows appear to converge. In other words, the distance between the rows (i.e., in the x-dimension) becomes smaller with increasing distance from the camera.

It is not necessary to adjust for perspective to identify stem locations using the images captured using the sensors 13, 15$_1$, 15$_2$ (FIG. 9). Doing so, however, can be helpful. For instance, it can allow a model trained using images obtained using camera sensors at one height and one angle to be used for locating stems with sensors at other heights and/or angles. Adjusting for perspective can also remove the need for a trained model to learn the variation in converging of rows, thereby reducing the variation between images in different settings.

Perspective adjustment can be achieved in different ways.

One approach is to modify the search space of the mapping texture to scale each texture row by the fixed width in camera coordinates. Corresponding colour and depth sensor pixel coordinates can be found by interpolating along the search space using the fixed width and an average depth value calculated per texture row.

Another approach is to generate a mapping texture of corresponding depth and colour sensor pixel positions scaled by pixel dimensions, with an unmodified search space. This involves finding the camera coordinates for each pixel position in the mapping array and transforming them to normalised coordinates using an orthographic projection to scale horizontal and vertical dimensions by a fixed distances in camera coordinates (in meters). The image is rendered using the newly-transformed camera coordinates. The previously-found corresponding mapping coordinates is used to sample the depth and colour textures to find pixel intensities at each pixel position.

Both approaches will now be described in more detail.

Constant width-Generating mapping array adjusting for perspective Referring also to FIGS. 19 to 22, a mapping texture 81 can be generated which adjusts for perspective, in other words, converts images into a plan view.

Figure 19:
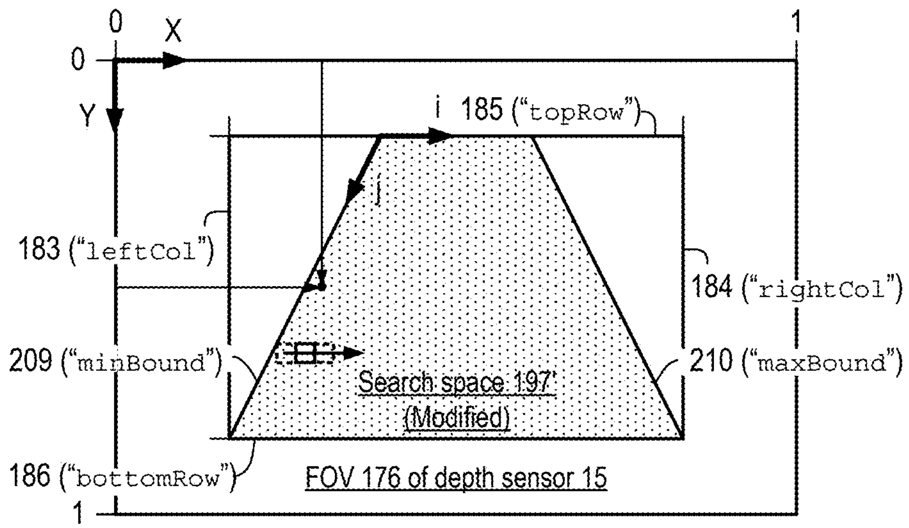
FIG. 19 illustrates a non-rectangular search space used in mapping array calculation.
Figure 20:
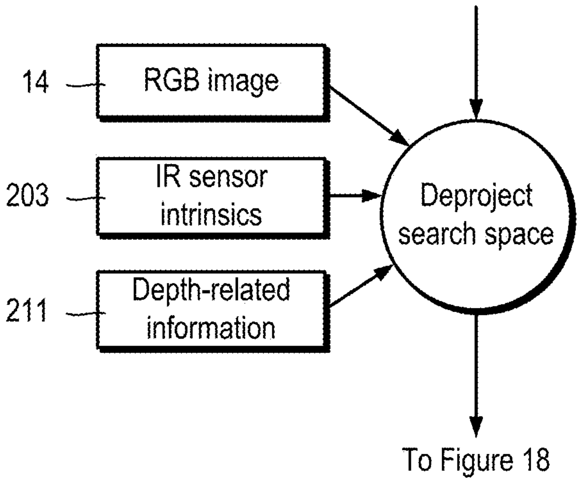
FIG. 20 illustrates an initial step of de-projecting search space prior in the mapping array calculation process of FIG. 18.

Referring in particular to FIGS. 19 and 20, a modified search space 197' can be used.

The modified search space 197' can be found from an RGB image 14, IR sensor intrinsics and depth-related information 211 which allows a mapping texture 81 to be generated which transforms images from a perspective view of the ground into a plan view (or "deperspectified view") of the ground.

Figure 21:
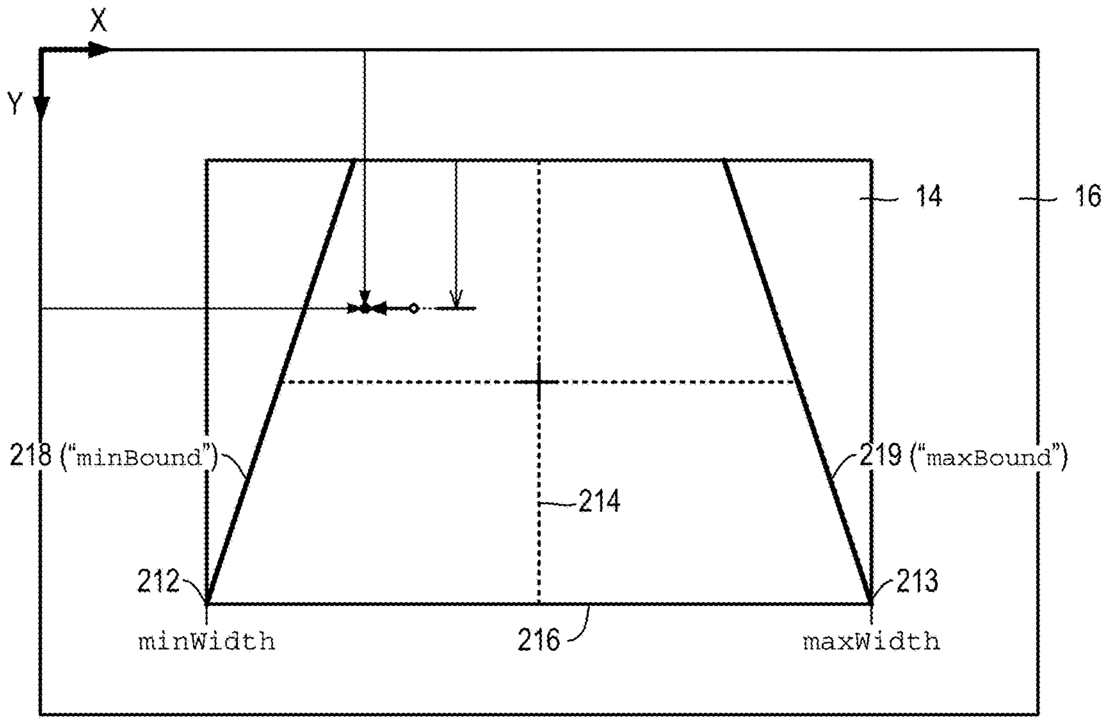
FIG. 21 illustrates an example of an approach to de-projecting search space using minimum and maximum values of image width.
Figure 22:
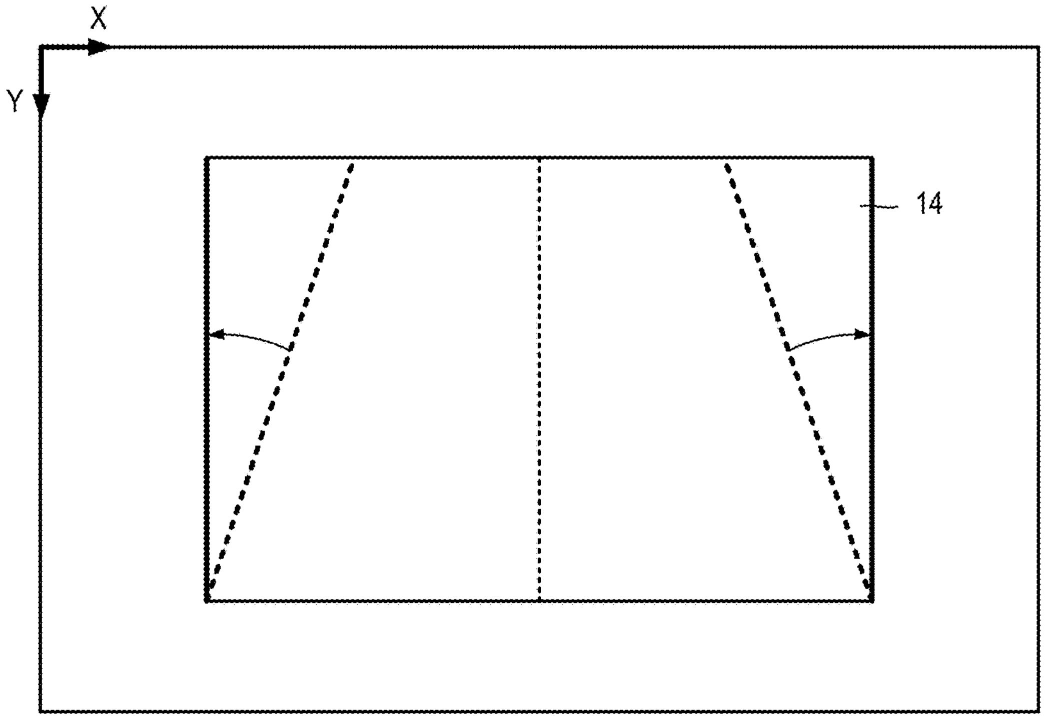
FIG. 22 illustrates transformation of an image using the approach to de-projecting search space shown in FIG. 17.

Referring in particular to FIGS. 21 and 22, one approach to adjusting perspective is to obtain minimum and maximum values 212, 213 ("minWidth", "maxWidth") of texture coordinates from an image center line 214 of the physical width of the bottom edge 216 of an RGB image 14. Coordinates X, Y of a sample point in a depth image 16 are taken by interpolating between first and second non-parallel left and right boundaries 209, 210 ("minBound", "maxBound").

minBound $X_{min}$ and maxBound $X_{max}$ values indicating the edges of the search space on the depth sensor are found by projecting the average depth value per row, $Z_{Ca'gj}$' and minWidth $X_{'min}$' or maxWidth $X_{cmax}$' onto the depth image sensor using the depth intrinsics, namely principle point ($pp_x$, $pp_y$) and focal lengths ($f_x$, $f_y$), and dividing by the image width $w_p$ (in pixels):

$$X^j_{min} = \frac{1}{w_p} \cdot \left( \frac{X_{c_{\min}} \cdot f_x}{Z_{c_{avg} j}} + pp_x \right)$$

$$X^j_{max} = \frac{1}{w_p} \cdot \left( \frac{X_{c_{\min}} \cdot f_y}{Z_{c_{avg} j}} + pp_y \right)$$

For normalised pixel position (i, j) in the mapping texture with sampling width $w_s$ and sampling height $h_s$ in pixels, the sampling coordinates for the depth image sensor can be found by interpolating between $X_{min\_i}$ and $X_{max\_i}$ and using the normalised j value:

$$X^j_D = \frac{i}{w_s} \cdot \left( X^j_{max} - X^j_{min} \right) + X^j_{min}$$

For normalised pixel position ($i_{norm}$, $j_{norm}$) in the mapping texture, the sampling coordinates are:

$$X^j_D = i_{norm} \cdot \left( X^j_{max} - X^j_{min} \right) + X^j_{min}$$

The topRow 185 and bottomRow 186 are normalised:

$$Y_D = \frac{j}{h_s} \cdot (\text{topRow} - \text{bottomRow}) + \text{bottomRow}$$

or (in the case of normalised pixels)

$$Y_D = j_{norm} \cdot (\text{topRow} - \text{bottomRow}) + \text{bottomRow}$$

Once the sampling coordinates for the depth sensor have been found, a depth pixel value can be sampled and deprotected into a camera coordinate using pixel2Point. It can then be transferred to the RGB sensor (using point2point) and projected onto the RGB sensor (using point2Pixel) to find the pixel sampling position for the RGB sensor.

Normalising Depth Data

Figure 23:
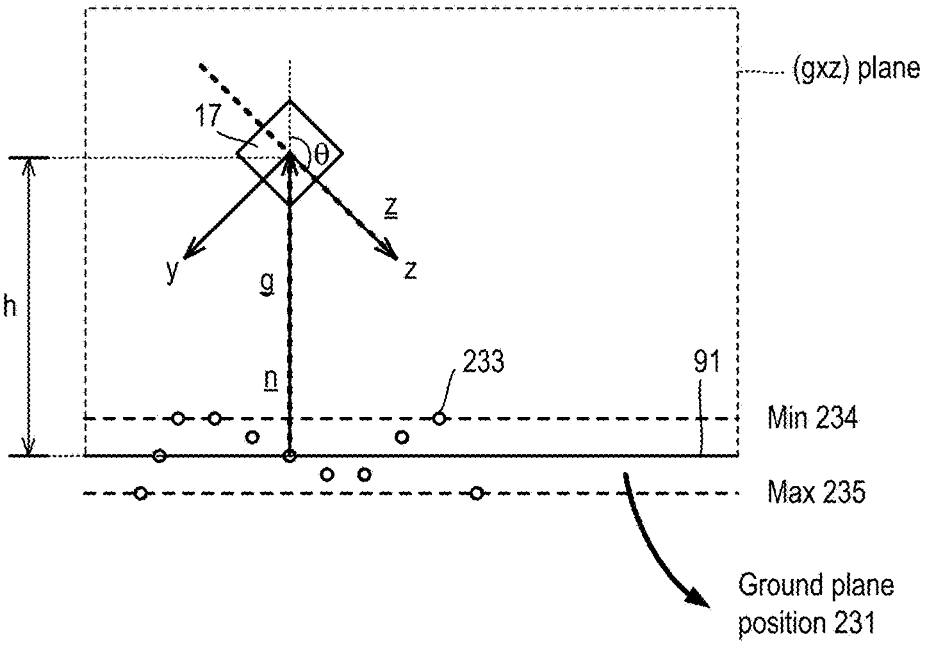
FIG. 23 schematically illustrates a camera which can be used to determine a ground plane.

Referring to FIG. 23, as will be explained in more detail later, the system 20 (FIG. 4) can determine the position 231 of a ground plane 91 using a ground plane equation to find a perpendicular (or "vertical") distance h between the depth camera 17 and the plane 91. Thus, depth values should be similar depending on crop rather than changes in camera height and/or camera angle.

Generally, two approaches can be used.

First, the system 20 (FIG. 4) can simply find the perpendicular distance h (or "height") of all depth points 233 in an image and normalising between minimum and maximum limits 234, 235 of the height to obtain values between 0 and 1 and then subtracting 0.5 to obtain an estimate of the mean of the height values. This assumes that the ground plane magnitude (i.e., the camera height) is equal to the mean perpendicular distance to make data scale between −0.5 and +0.5.

Secondly, the system 20 (FIG. 4) can store the sum of all perpendicular distances h and sum of squares of perpendicular distances h allows the data to be standardised between 0 and 1 by subtracting the mean value $\overline{x}$ and dividing by the standard deviation σ:

$$\overline{x} = \frac{\sum x}{n}$$

$$\sigma = \frac{\sqrt{\sum x^2 - n \cdot \overline{x}^2}}{n-1}$$

and $$\text{standardised value} = \frac{x - \overline{x}}{\sigma}$$

This standardises values with $\overline{x}=0$ and $\sigma=1$ while maintaining the distribution of the data. Values are scaled in terms of number of standard deviations away from the mean (e.g., range of ±1σ would be ±1.0 for standardised values).

This can be done for all input channels instead of just subtracting pixel mean values for RGB data and using the first approach using minimum and maximum values.

Orthographic Projection

Projections are can be used to represent a three-dimensional object on a two-dimensional plane. Different types of projection can be used.

Figure 24:
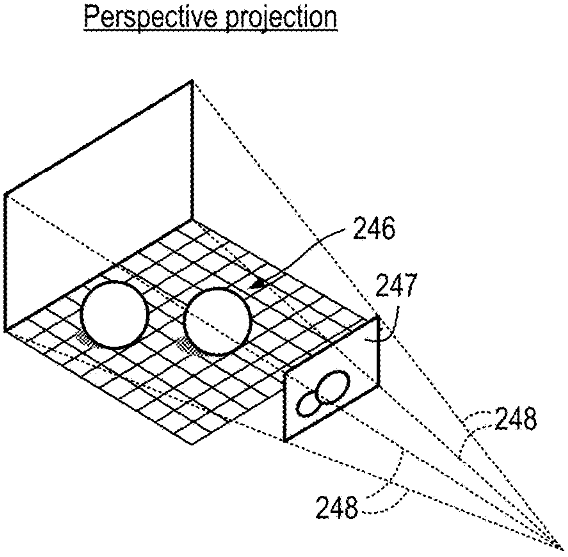
FIG. 24 illustrates perspective projection.
Figure 25:
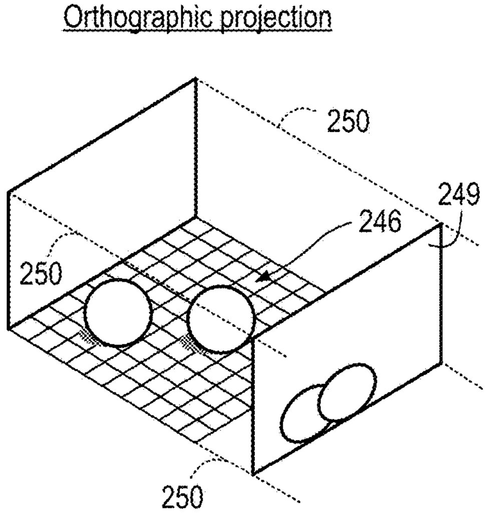
FIG. 25 illustrates orthographic projection.

FIGS. 24 and 25 illustrate perspective and orthographic projections respectively of objects 246, in this case two spheres, on an image plane 247, 249. The perspective and orthographic projections have respective projection lines 248, 250.

Orthographic projection is a form of parallel projection in which all the projection lines 250 are orthogonal to the projection plane resulting in the projected size of objects remaining constant with distance from the image plane 249.

Figure 26:
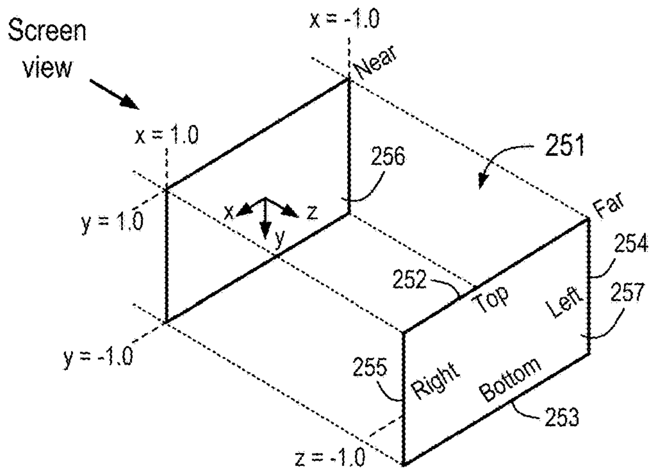
FIG. 26 illustrates a viewing box used in orthographic projection.

Referring to FIG. 26, an orthographic projection is obtained by defining a viewing box 251 having top t 252, bottom b 253, left l 254, right r 255, near n 256 and far f 257 sides or edges.

Figure 27:
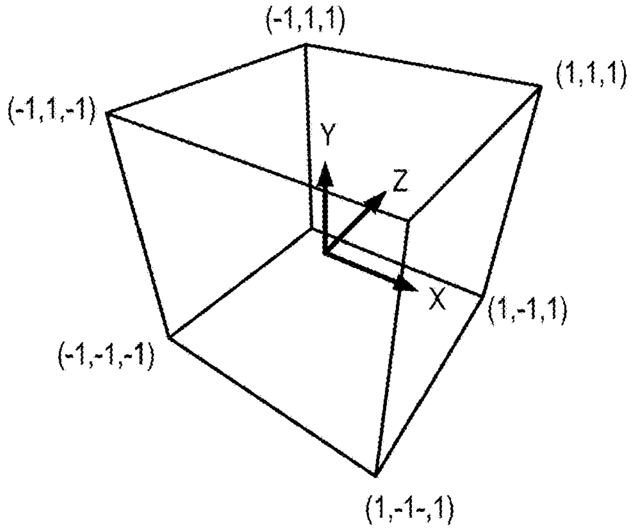
FIG. 27 illustrates normalize device coordinates space into which points are transformed or clipped.

Referring also to FIG. 27, the values define the size of the box 251 in real-world units of measurement (e.g., in meters) to use a matrix to transform the values of top t 252, bottom b 253, left l 254, right r 255 linearly into normalised device coordinates ("NDC") taking values between −1 and 1.

To describe transforming a three-dimensional object to view on a two-dimensional screen in NDC coordinates, a Model, View (camera) and Projection (orthographic/perspective) matrices [M], [V], [P] can be used.

$$NDCcoordinates = [M] * [V] * [P] * \begin{bmatrix} X_C \\ Y_C \\ Z_C \\ 1.0 \end{bmatrix}$$

where [M], [V], [P] are 4×4 matrices are of the form:

$$\begin{bmatrix} r_{11} & r_{12} & r_{13} & t_1 \\ r_{21} & r_{22} & r_{23} & t_2 \\ r_{31} & r_{32} & r_{33} & t_3 \\ 0.0 & 0.0 & 0.0 & 0.1 \end{bmatrix}$$

In this case, a simple model [M] is used to transform the NDC coordinate system with the y-axis running down the image centred on the camera origin. Reference is made to page 117, Chapter 3 of OpenGL Programming Guide, Fifth edition, version 2.

All coordinates outside of top t 252, bottom b 253, left l 254, right r 255 are clipped or ("removed") and are not rendered.

Figure 28:
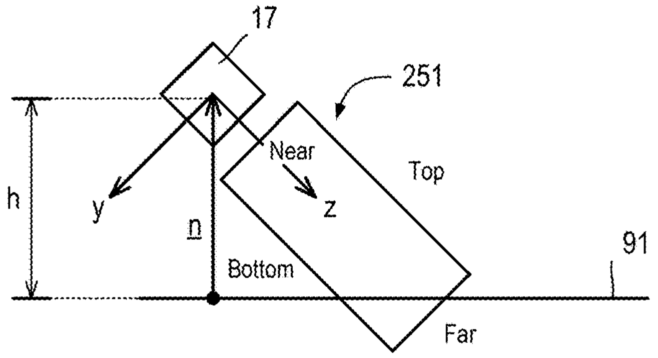
FIG. 28 illustrates a camera and the viewing box of FIG. 26.

Referring also to FIG. 28, a simple camera matrix [V] in the form of an identity matrix orientated along the z axis is used to view the projected image and a suitable camera matrix to orientate the view to look directly down the camera z axis as shown in FIG. 28 can be used 28. Constructing the view matrix [M] can be done with opengl lookAt function listing the eye, center and up vectors.

The edges of the rendered image equal to the top t 252, bottom b 253, left l 254, right r 255 parameters.

Linearly scaling the vertical and horizontal dimensions of the image effectively creates an image of constant width.

Figure 29:
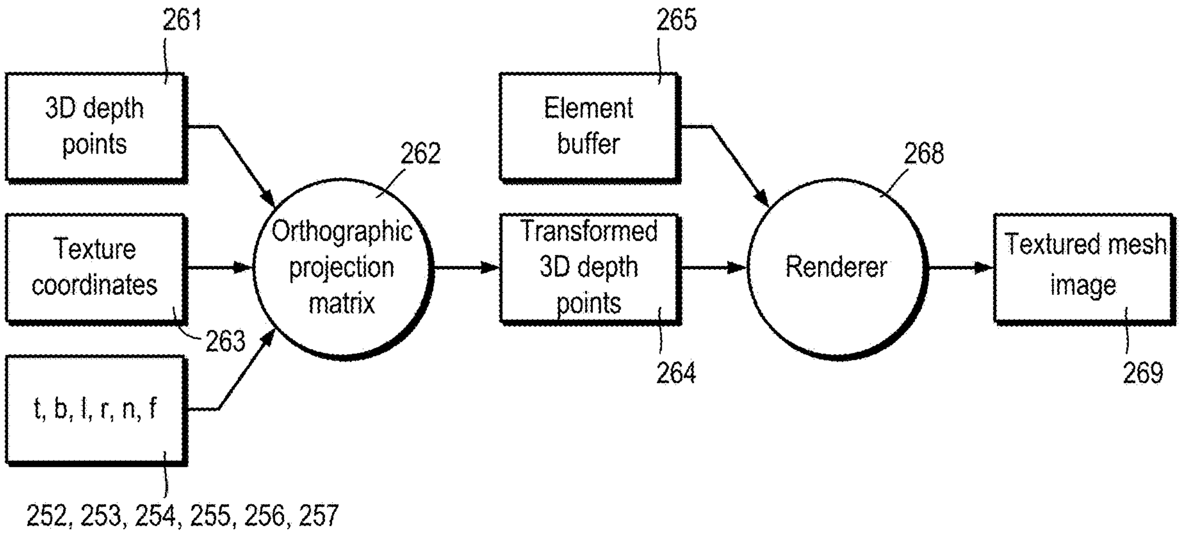
FIG. 29 illustrates a process of using an orthographic projection matrix to obtain an orthographic projection.

Referring also to FIG. 29, to render, individual 3D depth points (X, Y, Z) 261 (or "vertices") are transformed using an orthographic projection matrix 262 (or vertices shader) using corresponding mapping array 263 containing texture coordinates (u, v) 263, i.e., position of the corresponding pixel in colour image 14, depth image 16 or infrared image 18, and viewing box parameters 252, 253, 254, 255, 256, 257. The orthographic matrix is:

$$\begin{bmatrix} \frac{2}{r-l} & 0 & 0 & \frac{-r+l}{r-l} \\ 0 & \frac{2}{t-b} & 0 & \frac{-t+b}{t-b} \\ 0 & 0 & \frac{-2}{f-n} & \frac{-f+n}{f-n} \\ 0 & 0 & 0 & 1 \end{bmatrix}$$

where t, b, l, r, n and f are the top, bottom, left, right, near and far 252, 253, 254, 255, 256, 257.

Figure 30:
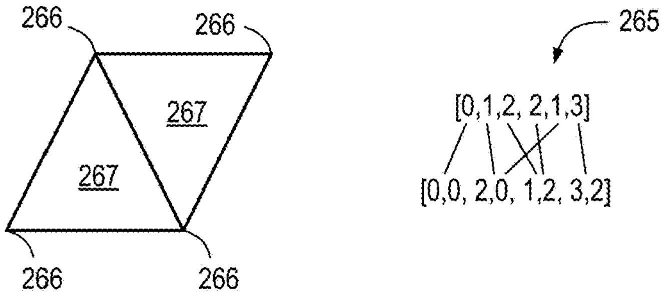
FIG. 30 illustrates element having vertices obtained by sampling 3D depth points and an element buffer for sampling the vertices.

Referring also to FIG. 30, an element buffer 265 contains a list of the index of each depth point for each vertex 266 of each triangle 267 (or "element") to be sampled by renderer 268 to produce the textured mesh image 269 and rendered using OpenGL rendering.

Figure 31:
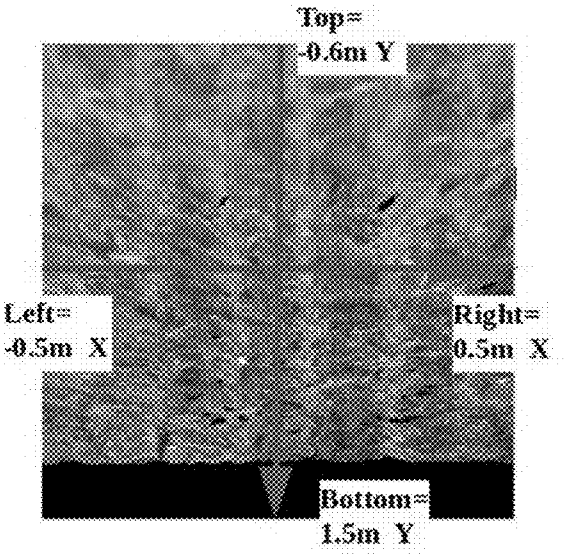
FIG. 31 is an image in the form of an orthogonal projection of a crop.

FIG. 31 illustrates an example of a two-dimensional orthographic projection of six rows of crops in which the values of top t, bottom b, left l and right r parameters 252, 253, 254, 255 are −0.6 m, 1.5 m, −0.5 m and 0.5 m respectively.

Referring again to FIG. 15, once a mapping texture 81 has been calculated (step S15.2), the GPU 32 performs pixel mapping using the mapping array 81 (step S15.3).

Network Input Pre-Processing

Figure 32:
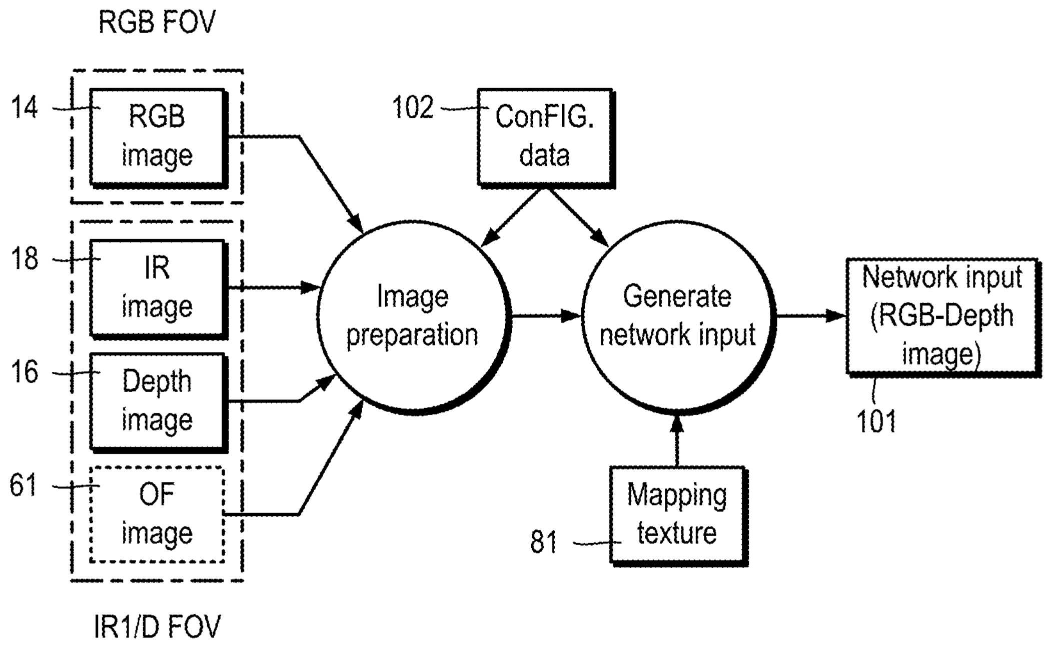
FIG. 32 illustrates a process of pre-processing images and generating a network input.
Figure 33:
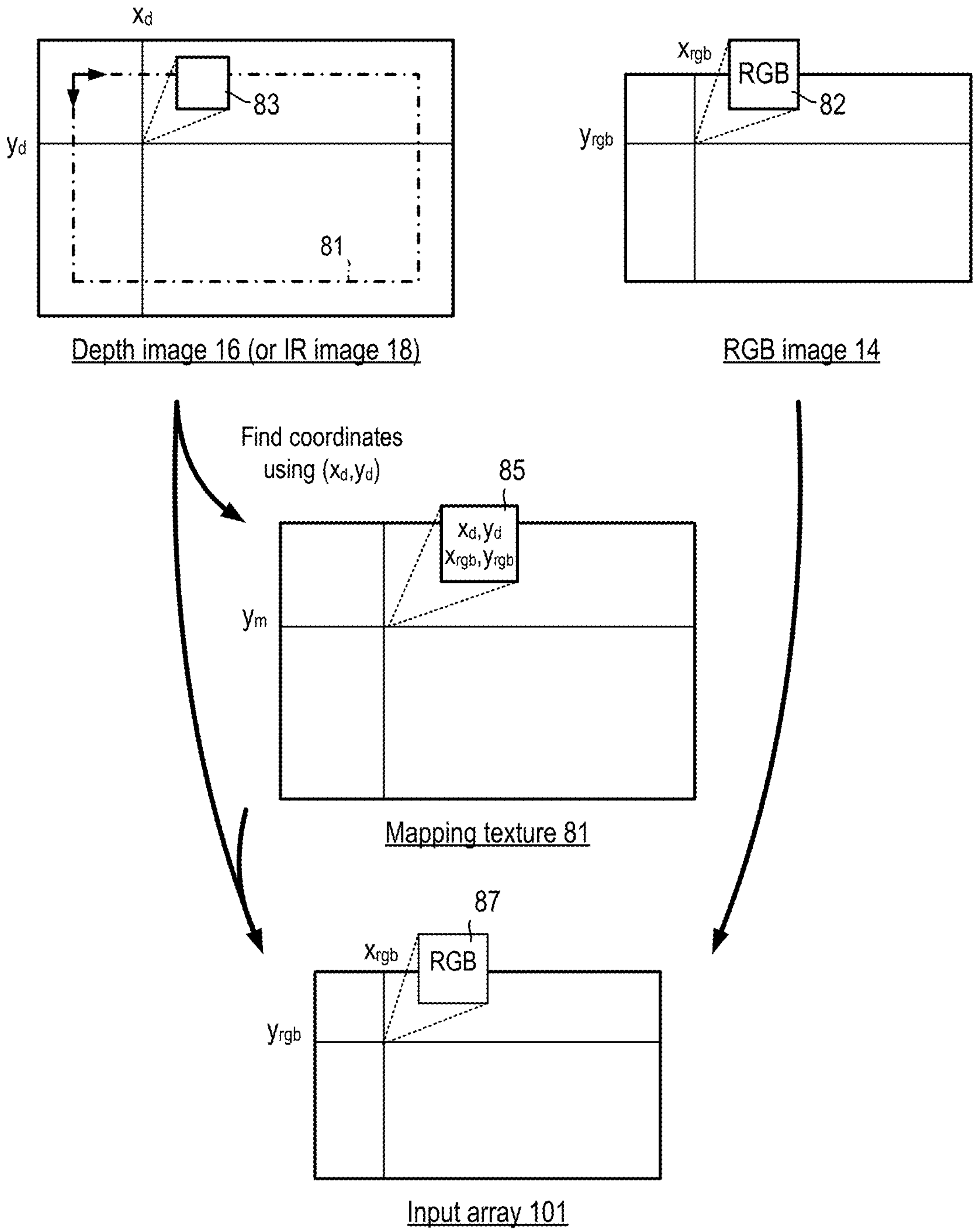
FIG. 33 illustrates using a mapping array to generate an aligned colour-depth image.

Referring to FIGS. 32 and 33, during pixel mapping, the GPU 32 (FIG. 7) assembles, coordinate-by-coordinate, a multiple-channel input array 101 (or "multiple-channel image") from one or more source images, such as the colour image 14 and depth image 16, selected using configuration data 102. The GPU 32 steps through coordinates i, j retrieves a respective pixel value from each source image 14, 16, 18 and collates, for each coordinate, a set of values, such as values for red, green and blue channels and a depth value, using the mapping texture 81 to register image data obtained using the colour sensor 13 and infrared sensors $\mathbf{15}_1$, $\mathbf{15}_2$.

Referring again to FIG. 12, the mapping texture 81 is an array, equal in size to the network image, i.e., the network input array 101. The mapping texture 81 contains two pairs of pixel coordinates 85 for each pixel position (i.e., four numbers for each pixel), namely ($x_d$, $y_d$) and ($x_{rgb}$, $y_{rgb}$). The two pairs of pixel coordinates give the positions for that pixel in a colour image 14 and in a depth image 16 and/or an infrared image 18. This means that corresponding pixel intensities from the field of view of colour image sensor 13 (FIG. 11) and the field of view of the first infrared image sensor $\mathbf{15}_1$ (FIG. 11) or the depth sensor 17 can be conveniently brought together for each pixel of the network input image 217.

The mapping texture 81 is referred to as a texture since it can be stored in a cudaTextureObject. It may, however, also be referred to as a "mapping array".

The images 14, 16, 18, 61 can be pre-processed (or "prepared"), for example, to standardise and/or normalise values, and to generate derived images such as NDVI, prior to generating the network input 101.

Image channels in each image can be normalised by subtracting the dataset mean, such as, the mean of the green channel standardized all images in the dataset. Additionally, or alternatively, image channels can be normalised by dividing values by the standard deviation of the channel of the dataset.

Colour images values which are in the form of an 8-bit number (and, thus, take a value between 0 and 255) can be normalised to take a value between 0 and 1 before being standardised. For NDVI, NDVI values which lie between −1 to 1 can be normalised to lie between −0.5 to 0.5.

For depth images, a standard deviation and mean depth for each image can be used to standardise the data between −0.5 and 0.5. Ground plane parameters can be used to transform depth values to give the perpendicular distance from the ground plane 91 (i.e., height off the ground) rather than distance to the camera. Alternatively, it is possible to normalise per image row. Normalising depth coordinates depth coordinates using the ground plane 91 can yield a real crop height.

Neural Network

Figure 34:
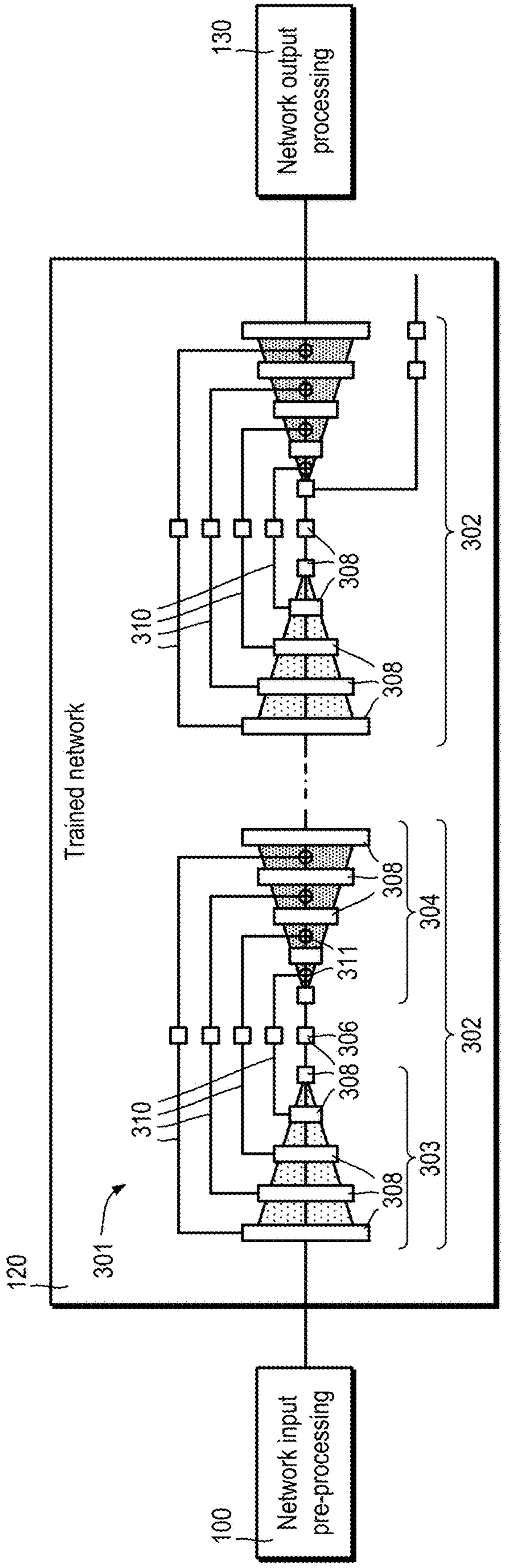
FIG. 34 illustrates a convolutional neural network for identifying stem coordinates.

Referring to FIG. 34, the trained neural network 120 has a stacked (or "multistage") network structure 301 comprising a stack (or "series") of encoder-decoder modules 302. Each module 302 comprises an encoder part 303 and a decoder part 304. The encoder part 303 (or "feature extractor") encodes a received image into a low-resolution, but deep, feature map. Initial predictions are made at a center 306 of the module 302 and the decoder part 304 up-samples the feature map to produce a heatmap to show position of objects. Each module 302 is formed from residual blocks 308 and skip connections 310 between the encoder and decoder parts 303, 304 via summing nodes 311.

Suitable stacked networks include an hourglass network and a multi-stage pyramid network. In this example, a multi-stage pyramid network is used similar to that described in W. Li, Z, Want, B. Yin, Q. Peng, Y. Du, T Xiao, G. Yu, H. Lu, Y. Wei and J. Sun: "Rethinking on Multi-Stage Networks for Human Pose Estimation", arXiv: 1901.00148v4 (2019) using a two-stage network 301 and ResNet-18 feature extractors (instead of ResNet 50 feature extractors). An EfficientNet feature extractor can be used instead of a ResNet feature extractor, such as that described in M. Tan and Q. Le: "EfficientNet: Rethinking Model Scaling for Convolutional Neural Networks" arXiv: 1905.11946v5 (2020) to help increase accuracy and reduce execution time.

A decoder upsamples and combines image features encoded by convolutional layers into per-class response maps of a suitable resolution for extracting features of interest. For example, the output network image has a resolution which is 1/N times the resolution of the input image, and N may be for example, N≥1, for example, N may be 1, 2, 3, 4 or more.

Decoder modules can have different convolutional structures, such as Fully Convolutional Networks (FCNs), or more complex structures, such as Feature Pyramid Networks (FPNs). For example, J. Long, E. Shelhamer, T. Darrell in "Fully Convolutional Networks for Semantic Segmentation" arxiv: 1411.4038v2 (2015) describes upsampling and combining image features to produce a single response map of suitable resolution. T. Lin, P. Dollar, R. Girshick, K. He, B. Hariharan and S. Belongie: "Feature Pyramid Networks for Object Detection" arxiv: 1612.03144v2 (2017) describes networks which can be used to combine encoded feature maps of different resolutions with added convolutional layers producing a response map of predictions at each level of the network. Loss can be calculated for each response map at each level of the network allowing what is referred to as "coarse-to-fine supervision" of learned image features deep into the network structure.

A stack of encoder-decoder modules need not be used. For example, a set of one or more convolutional modules (or blocks) that can generate a response map of suitable resolution can be used. For instance, the module may comprise upsampling layers (such as bi-linear upsampling) or convolutional layers containing learned parameters.

Training

The neural network 120 works by extracting features from an image using layers of convolution filters. Convolutional filters are sets of learnable parameters which can be combined with a portion of an image as a kernel (or filter) using a dot product. The result of the dot product provides the response (or "activation") of the kernel to that portion of the image. By passing the filter across all parts of the image, an activation map is created.

The neural network allows custom convolutional filters to learn to extract the desired features from an input image. The parameters of the convolutional layers are known as "weights" of the network. Convolutional weights are randomly assigned at the beginning of a training process and where annotated ground truth images are provided to allow network prediction to be refined.

Figure 35:
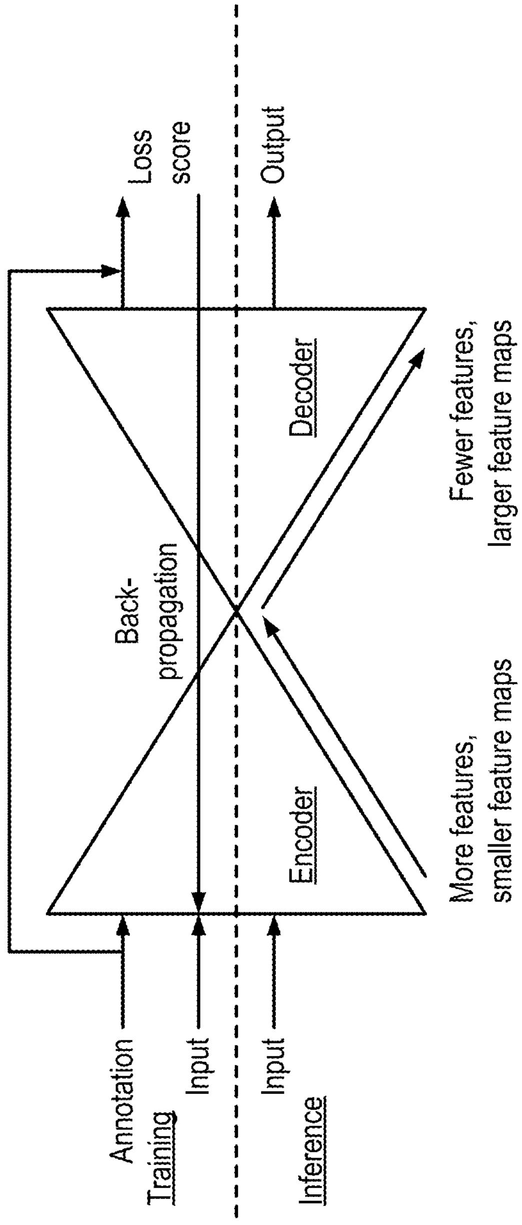
FIG. 35 illustrates an encode-decoder during training and inference.

Referring to FIG. 35, training of a neural network is conducted by finding a measure of error (or "loss") of the final output activation of the neural network compared with image ground truth images using a loss function. Finding the derivative of the loss of the output activation of the network allows previous layers' convolutional weights to be corrected through a backpropagation process using a gradient descent algorithm to minimise the loss function.

Figure 36:
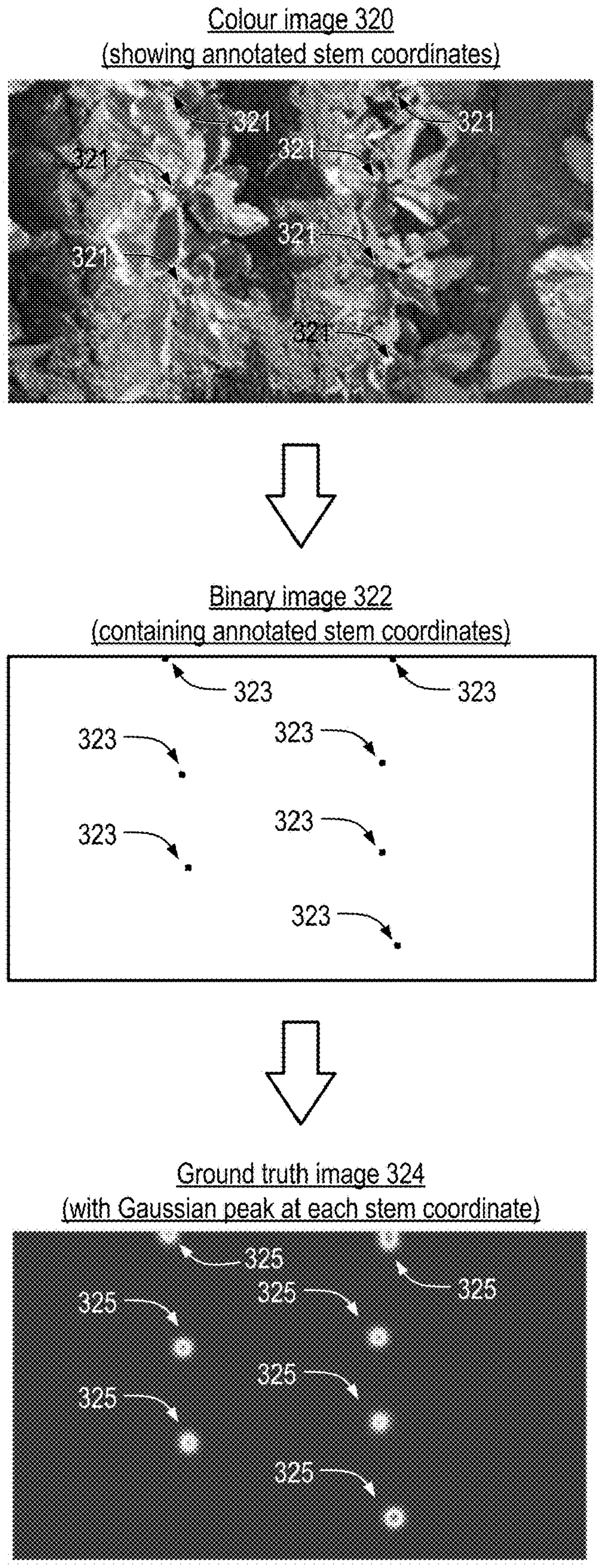
FIG. 36 illustrates generating a ground truth for training.

Referring also to FIG. 36, a ground truth image 324 can be generated from an image, such as a colour image 320.

A user annotates the image 320 by identifying stem coordinates 321, for example, by positioning a cursor and clicking on the image 320 at the location of the stem.

The image 320 is converted into a binary image 322 containing annotated stem coordinates 323 (where a pixel value is equal to 255 at each stem coordinate, else is equal to 0).

The binary image 322 is converted into a Gaussian-filtered image 324 (or "heatmap") containing a Gaussian peak 325 at each stem coordinate 323 by passing a Gaussian filter (not shown) across the binary image 322.

The heatmap 324 provides a gradient allowing pixel intensity to be proportional to likelihood of the pixel being a stem coordinate.

A dataset is labelled with stem location annotations and split, 80:20, into training and validation datasets. A data-loader script can be used to load batches of images into the network. The dataloader script also applies random augmentations, such as flipping and rotation to the images, to increase image variability and reduce the chance of network overfitting to trivial image features (number of rows, certain shadow orientations, etc.). Network predictions are compared to ground truth images to calculate a measure of loss at the end of each training iteration. Network parameters can be refined over repeated training iterations. The validation dataset can be used every few training iterations to calculate network performance metrics on images unseen in the training set to gauge real-world performance. Network structure can be described and training sequences conducted using machine learning frameworks such as Pytorch or Tensorflow. The dataset consists of between 1,000 to 2,000 labelled images, although a larger number of images, for example, between 5,000 to 10,000 can be used. There are between 20 and 40 epochs and validation is performed every 5 epochs. The batch size is between 50 to 100 images, although the batch size varies according to size of images. The learning rate is 0.0025.

Figure 37:
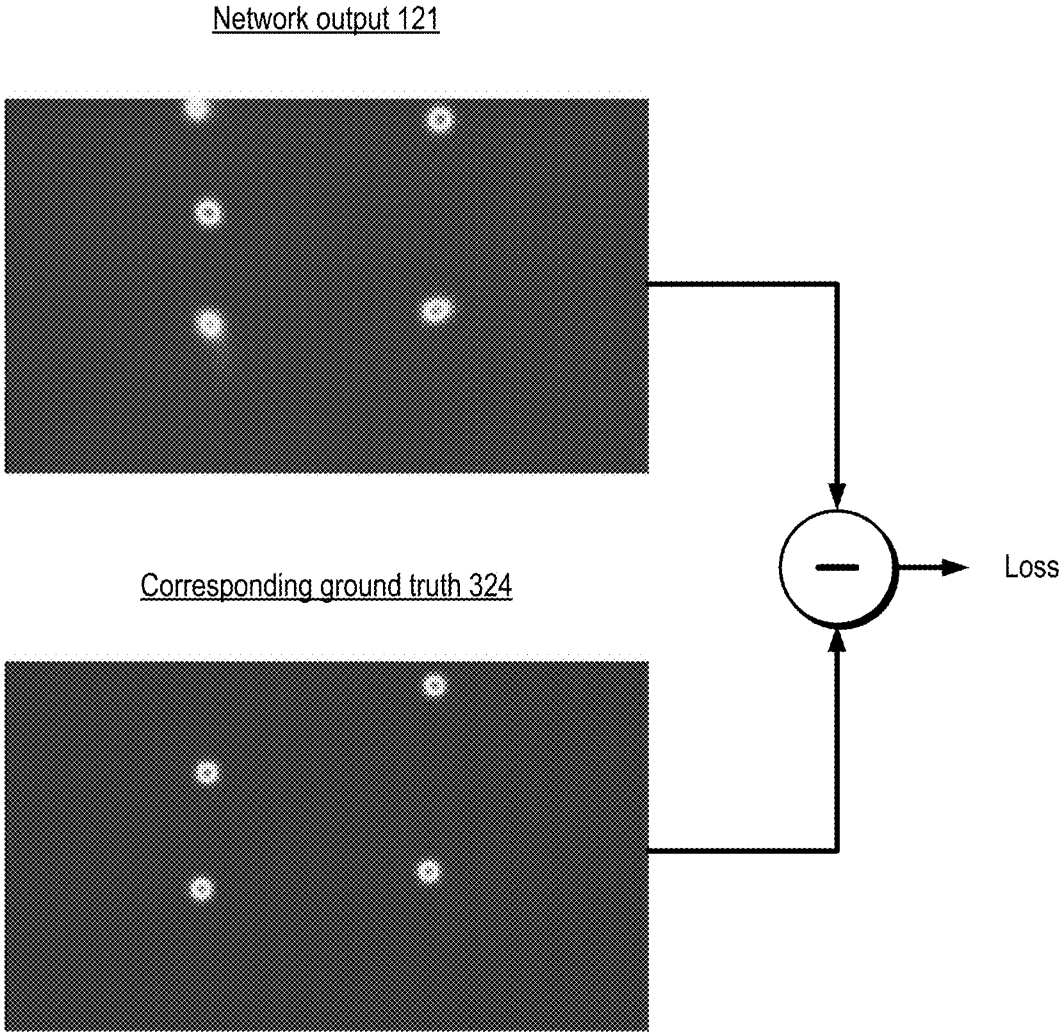
FIG. 37 shows measuring loss during training.

Referring also to FIG. 37, a network output 121 (obtained by the network 120 using the original image 320) is compared with a corresponding heatmap 324 (i.e., ground truth) using a loss function such as mean-squared error (MSE):

$$E(y_n) = \frac{1}{N}\sum\{y_n - \hat{y}_n\}^2$$

where E is the mean-squared error, N is the number of data paints, $y_n$ is observed value and $\widehat{y_n}$ is the predicted value.

A measure of loss for the network output 121 can be found by finding the MSE for each pixel in the network output 121 compared to the corresponding pixel in the ground truth image 324. The loss function can be minimised and the weights of each network layer updated using a gradient descent algorithm.

The gradient descent algorithm is defined by:

$$w^{(\tau+1)} = w^{(\tau+1)} - \eta\nabla E(w^{(\tau)})$$

where $w^{(\tau+1)}$ represents an updated weight value, $w^{(\tau)}$ represents a current weight, η is the learning rate of the network and ∇E is the derivative of the error function.

The amount of change in the updated weight value is governed by the value of the learning rate n.

To allow convolutional weights in the network to be further refined, the activation map of a convolutional layer is combined with a non-linear activation function to give a differentiable, non-linear result able to be used with the gradient descent algorithm.

Suitable non-linear activation functions include tanh, sigmoid and rectified linear unit (ReLu).

Images can be batched together to insert into the network, allowing a loss for the entire batch (or epoch) to be minimised (batched gradient descent) or per training image example (stochastic gradient descent).

Over many training examples, the gradient descent algorithm minimises the result to a global minimum, indicating an optimum result has been reached. The speed of change of the updated weight values is governed by the learning rate n. Adjustment of learning rate can prevent the gradient descent algorithm finding a local minimum, which can prevent an optimal result from being found.

Optimisation of the learning rate parameter can be conducted by analysing the momentum or rate of change of each network parameter to prevent gradients stagnating. Suitable optimisers include variations on the Adam (Adaptive Moment Estimation) optimiser which stores an exponentially decaying average of past gradients for each network parameter to estimate gradient moment and prevent stagnation.

Output

Figure 38:
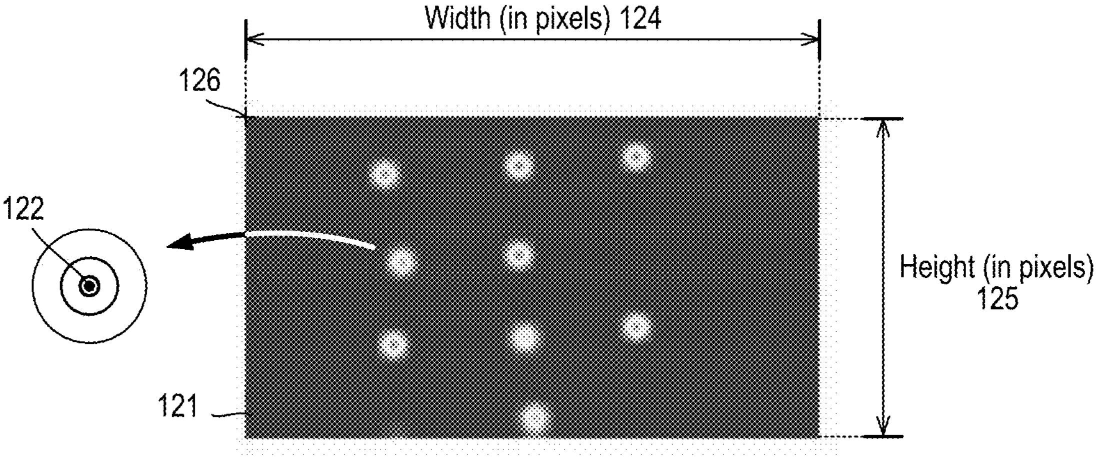
FIG. 38 illustrates a network output comprising keypoints representing plant stem locations, each keypoint having a Gaussian distribution.
Figure 39:
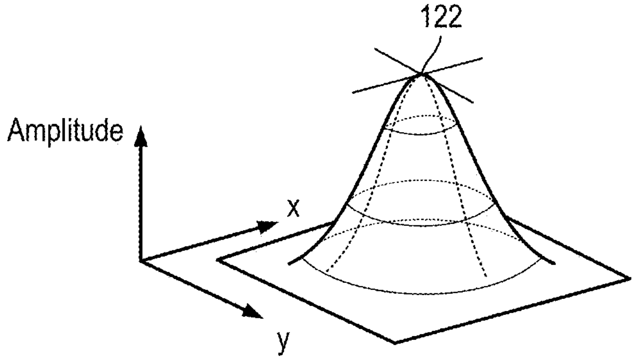
FIG. 39 illustrates a Gaussian distribution.

Referring to FIGS. 38 and 39, the network output 121 (or "response map") takes the form of a feature map having a heatmap-like appearance comprising keypoints 122 (or "points") representing plant stem coordinates, each keypoint 122 takes the form of a feature map having a Gaussian-filtered appearance comprising peaks representing plant stem locations resembling a similar distribution to the corresponding ground truth image.

As will be explained in more detail hereinafter, the stem coordinate is found and is normalised (i.e., taking a value between 0 and 1) using the network output array pixel width 124 and height 125 for more flexible handling later on in the pipeline. The coordinate is taken from the top left corner 126 of the network output array 121. The stem coordinate need not be normalised and/or a different origin can be used.

Using a pose network with non-maximum suppression allows individual keypoints representing stem coordinates to be extracted directly from the network output 121.

Extracting keypoint labels provides a direct approach to finding stem coordinates instead of extracting a centroid of a segmentation. This can be especially useful when, as in this case, cameras are angled and the stem is at the bottom of the plant rather than in the center. Semantic segmentation is not used which allows an output feature map 121 to be smaller than an input image and help to achieve process images faster.

Furthermore, keypoints make it quicker to label images and are more robust compared to segmentation networks as the entire loss function is focused on the correct position of the keypoint rather than the quality of segmentation.

Processing Network Output Array 121 to Obtain Stem Locations 29

Figure 40:
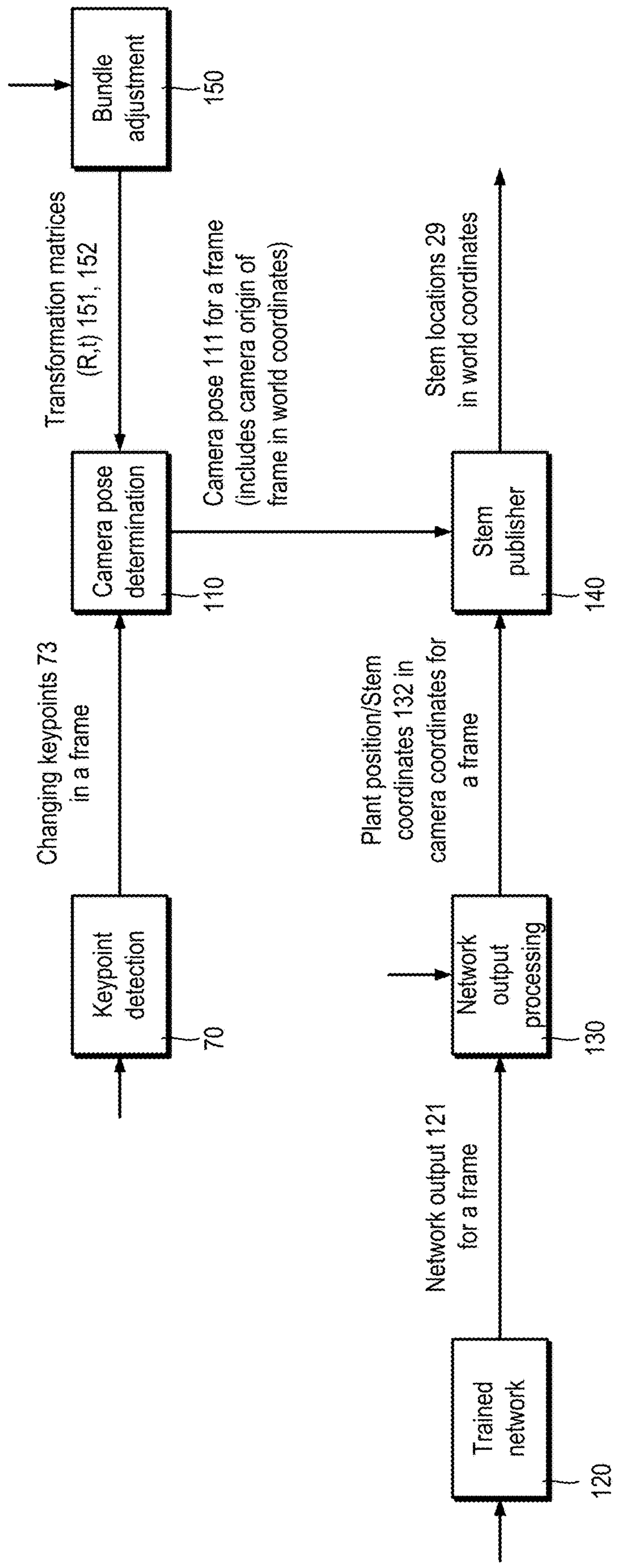
FIG. 40 is a schematic block diagram of a later stages of a processing pipeline.
Figure 41:
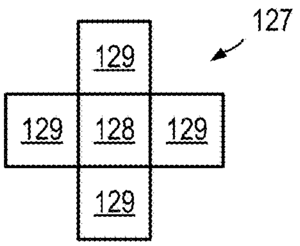
FIG. 41 illustrates a sample area used in non-maximal suppression.

Referring to FIG. 40, network output processing block 130 receives the network output array 121 from the trained network 120 and finds the stem coordinates. The network output processing block 130 initially expresses the stem coordinates in the form of two-dimensional coordinates in a frame 121 (i.e., the network output array).

Further information is needed to generate three-dimensional stem locations 29. A stem location 29 is a stem coordinate which has been converted into to camera coordinates (i.e., a three-dimensional point expressed, for example, in meters) and combined with odometry information to create a three-dimensional point expressed, for example, in meters in world coordinates. If the camera origin of the frame is known in world coordinates, then stem locations 29 can be tracked from one frame to another.

In this case, visual odometry is used to provide the camera origin of the frame in world coordinates, and odometry information is provided by the camera pose determination block 110 based on keypoint detection and matching in block 70. However, visual odometry need not be used. For example, mechanical odometry, for instance using, among other things, a wheel, can be used.

Network Output Processing

Referring to FIGS. 41 to 44, plant stem coordinates $c_x$, $c_y$ 131 in the network output 121 are found (step S42.1). The plant stem coordinates $c_x$, $c_y$ are found using non-maximum suppression ("NMS") performed by sampling each pixel in the image and its four neighbours (i.e., to the left and right of the pixel in the same row and above and below the pixel in the same column) to determine if it is a peak and, if so, recording the pixel as a possible plant stem coordinate $c_x$, $c_y$. In particular, a sample area 127 comprises a central pixel 128 and its four neighbours 129 and is scanned across the network output 121. Peaks in the image can also be found using other approaches, for example, by comparing positions of maximum intensity of pixel for each row and column in the image. If a pixel is a maximum in a row and corresponding column, then the pixel is a peak.

Confidence of the prediction (i.e., the predicted plant stem coordinate) can be measured by measuring the standard deviation of the network image 121. The greater the standard deviation, then the greater spread between results and the sharper the peaks. Thus, a threshold can be set to screen possible plant stem coordinate $c_x$, $c_y$.

The plant stem coordinates $c_x$, $c_y$ 131 in the image 121 are then converted into stem coordinates $c_{XC}$, $c_{YC}$, 122 in meters with respect to the camera origin (step S42.2). In particular, the mapping texture 81 is used to find the corresponding pixel in the depth image 16 and the pixel value can be converted into a point in in camera coordinates by de-projecting the pixel value using the depth sensor intrinsics.

Figure 43:
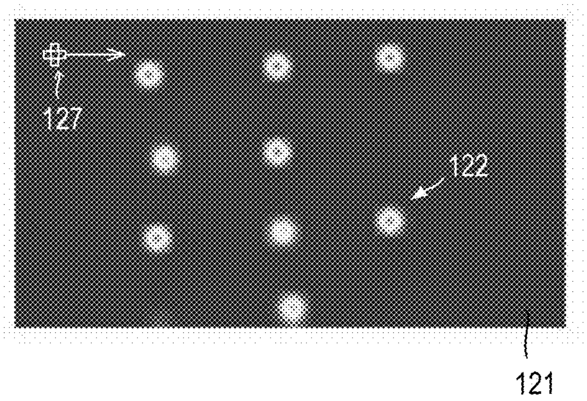
FIG. 43 illustrates a network output comprising keypoints and scanning of the sample area across the image.
Figure 44:
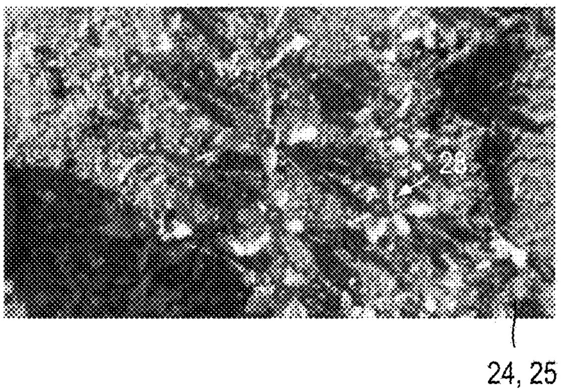
FIG. 44 illustrates an image, corresponding to the network output shown in FIG. 43, showing stem location markers.

FIG. 43 shows keypoints 122 corresponding to plant stems in the network output 121 and FIG. 44 shows corresponding plant stem markers 28 in an augmented image 24 comprising a colour image 25.

Determining Plant Position with Respect to Hoe Blade Origin

Referring again to FIG. 40, stem publisher block 140 (FIG. 8) is able to track plant stems over successive frames and determine stem locations 29 in world coordinates which can then be used, for example, to hoe around the stem using a weeding unit blade (or "hoe blade"). In this section, reference is made to a frame $F_n$ (the $n^{th}$ frame) which is the network output frame 121. As explained earlier, this may be constructed from a colour image frame 14, a depth image frame 16, and/or infrared frame 18 captured at the same time and coordinates can be expressed with reference to one of image sensors, such as the colour image sensor 13 or depth sensor 17.

Figure 45:
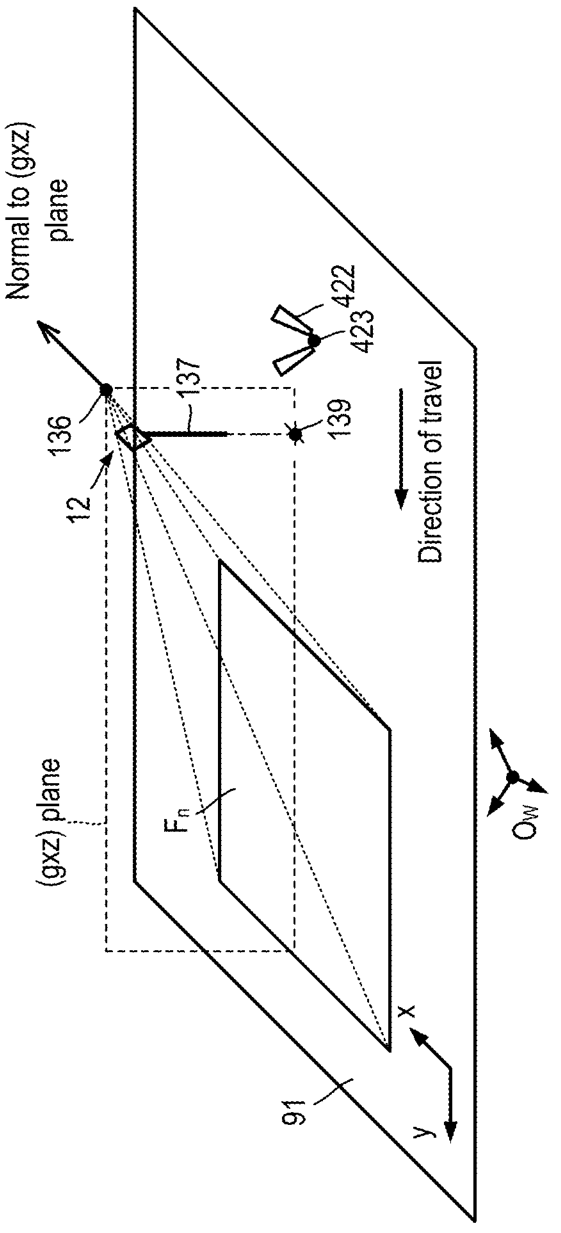
FIG. 45 illustrates a camera origin, a ground plane origin, and a weeding system origin.

Referring to FIG. 45, the camera system 12 in relation to the ground plane 91 is shown. The camera system 12 has an origin 136 ("camera system origin"). The camera system 12 sits on support 137, such as a pole, and lies above a point 139 on the ground plane 91. Each weeding unit blade 422 (in this case, a reciprocating blade although it may be another type, such as a rotary blade) has an origin 423 which sit behind the vertical plane of the camera system 12.

Figure 46:
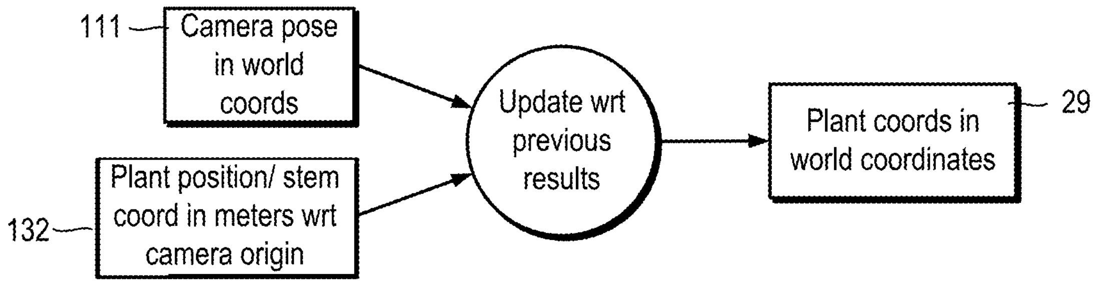
FIG. 46 shows obtaining plant coordinates in world coordinates.
Figure 47:
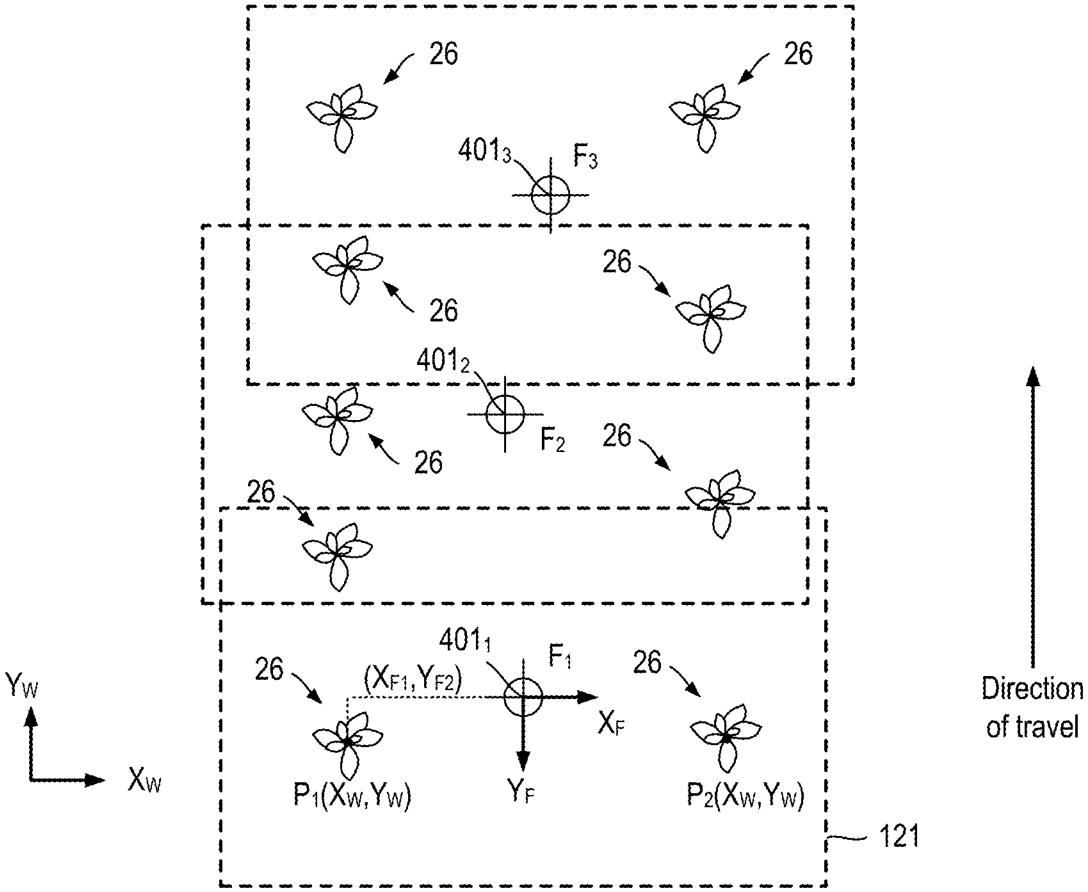
FIG. 47 illustrates a succession of overlapping frames.

Referring to FIGS. 46 and 47, plant positions/stem coordinates 132 in the camera coordinate system are converted into plant coordinates 29 in world coordinates using camera pose 111.

Referring in particular to FIG. 47, tracking is based on a number of assumptions.

It is assumed that each plant 26 has a single position $P_1$, $P_2$, . . . , $P_n$ in world coordinates and that is does not move and that the cameras 13, 15 (FIG. 4) move over the top of the plants 26 with sufficient overlap between successive frames $F_1$, $F_2$, $F_3$, that the same plant 26 appears at least two successive frames $F_1$, $F_2$, $F_3$, preferably many (e.g., five or more) successive frames $F_1$, $F_2$, $F_3$. It is assumed that coordinates are given based on a bird's eye view and so only X and Y dimensions are considered. In the following, it is assumed that $Y_W$ is in the direction of travel and YF is down the frame (in other words, in the opposite direction). The position of the origin 4011, 4012, 4013 of each frame $F_1$, $F_2$, $F_3$ is known in world coordinates and is provided by a land wheel, visual odometry, GPS or other means. It is assumed that the position of each plant 26 is known in frame coordinates, with respect to each respective frame origin 4011, 4012, 4013. Knowing the origin 4011, 4012, 4013 of each frame $F_1$, $F_2$, $F_9$ in world coordinates and the position of each plant in frame coordinates allows the position $P_1$, $P_2$, . . . , $P_n$ of each plant in world coordinates to be calculated.

Referring also to FIGS. 23 and 45, during the amalgamation process hereinafter described, it is assumed that for each frame, $F_n$, stem locations in camera coordinates have been rotated using the ground plane parameters to give X and Y dimensions parallel to the ground plane 91 so that they may be treated in a bird's eye view and the Z dimension not considered.

Vector g is found from ground plane coefficients:

$$ax + by + cz + d = 0$$

$$g = \begin{bmatrix} a \\ b \\ c \end{bmatrix}$$

Vector z is the unit vector of the camera z axis:

$$z = \begin{bmatrix} 0 \\ 0 \\ 1 \end{bmatrix}$$

The normal vector $n_{g \times z}$ is found via the cross product of vectors g and z:

$$n_{g \times z} = g \times z = |g| \cdot |z| \cdot \sin\theta \cdot n$$

As g and z are both unit vectors, angle θ can be found:

$$\sin\theta = |n_{g \times z}|$$

$$\theta = \sin^{-1}|n_{g \times z}|$$

Using the normal vector as the rotation axis and angle between g and z, a quaternion $q_{g\times z}$ can be formed:

$$u = \frac{1}{|n_{g\times z}|} \cdot n_{g\times z}$$

$$q_{g\times z} = q_w + q_x i + q_y j + q_z k$$

$$q_{g\times z} = \cos\left(\frac{\theta}{2}\right) + \left[u_x \cdot \sin\left(\frac{\theta}{2}\right)\right]i + \left[u_y \cdot \sin\left(\frac{\theta}{2}\right)\right]j + \left[u_z \cdot \sin\left(\frac{\theta}{2}\right)\right]k$$

Once a quaternion has been found, it can be converted to a 4×4 rotation matrix using maths libraries such as GLM for OpenGL or Eigen in C++:

$$R = \begin{bmatrix} 1-2s(q_y^2+q_z^2) & 2s(q_xq_y-q_zq_w) & 2s(q_xq_z+q_yq_w) \\ 2s(q_xq_y+q_zq_w) & 1-2s(q_x^2+q_z^2) & 2s(q_yq_z-q_xq_w) \\ 2s(q_xq_z-q_yq_w) & 2s(q_yq_z+q_xq_w) & 1-2s(q_x^2+q_y^2) \end{bmatrix}$$

where $s=\|q\|^{-2}$ if $q_{g\times z}$ is a unit quaternion $s=1^{-2}=1$.

As explained earlier, the GPU 32 continually (i.e., every frame) computes a ground plane 91. The camera system 12 also has an origin 136 ("camera system origin"). The camera system 12 sits on support 137, such as a pole, and lies above a point 139 on the ground plane 91. Each weeding unit blade 422 (in this case, a reciprocating blade although it may be another type, such as a rotary blade) has an 423 356 which sit behind the vertical plane of the camera system 12.

The updating process performed by block 130 receives as inputs n plant positions/stem coordinates 131 in the image coordinate system per frame in frame coordinates of m plants over t successive frames, namely:

$$\begin{bmatrix} (X_1, Y_1)_{p_1} \\ (X_2, Y_2)_{p_2} \\ \cdots \end{bmatrix}_{f_1}, \quad \begin{bmatrix} (X_1, Y_1)_{p_2} \\ (X_2, Y_2)_{p_3} \\ \cdots \end{bmatrix}_{f_2}, \quad \begin{bmatrix} (X_1, Y_1)_{p_2} \\ (X_2, Y_2)_{p_3} \\ \cdots \end{bmatrix}_{f_3} \cdots$$

$$\cdots$$

$$\begin{bmatrix} (X_1, Y_1)_{p_{m-2}} \\ (X_2, Y_2)_{p_{m-1}} \\ \cdots \end{bmatrix}_{f_t}$$

and the camera pose 111 of each frame origin in world coordinates, namely:

$$(X_w, Y_w)_{f_1}, (X_w, Y_w)_{f_2}, (X_w, Y_w)_{f_3} \cdots (X_w, Y_w)_{f_t}$$

and outputs a single world coordinate 29 for each plant 26 (even though there may be many frame coordinates per plant corresponding to that world coordinate), namely:

$$(X_w, Y_w)_{P_1}, (X_w, Y_w)_{P_2}, (X_w, Y_w)_{P_3} \cdots (X_w, Y_w)_{P_m}$$

The frame origin is expressed as $$\text{Frame origin} = (X_w, Y_w)_{f_1}$$

The frame plant coordinates are expressed by:

$$\text{Frame plant coordinates} = \begin{bmatrix} (X_1, Y_1)_{p_1} \\ (X_2, Y_2)_{p_2} \\ \cdots \end{bmatrix}_{f_1}$$

Frame plant coordinates are converted into world coordinates using:

$$(X_w, Y_W)_{P_1} = \begin{bmatrix} X_{w_{f_1}} + X_{f_{1_{P_1}}} \\ Y_{w_{f_1}} - Y_{f_{1_{P_1}}} \end{bmatrix}$$

Plant world coordinates can be converted back into frame coordinates $$(X_{f_1}, Y_{f_1})_{P_1} = \begin{bmatrix} X_{w_{f_1}} + X_{w_{P_1}} \\ Y_{w_{f_1}} - Y_{w_{P_1}} \end{bmatrix}$$

The direction of the world coordinate axed compared to frame coordinate axes should be noted.

Gridmap

Figure 48:
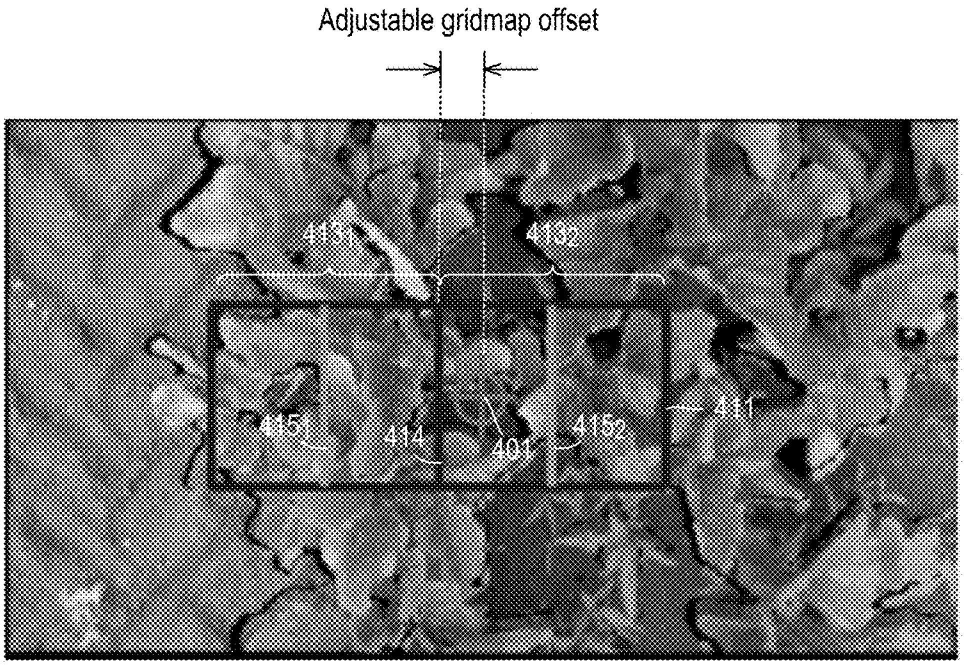
FIG. 48 is a graphical representation of a gridmap and overlaid on an RGB-depth map image frame.

Referring to FIG. 48, a graphical representation of a gridmap object 411 (herein after simply referred to as a "gridmap") overlaid on an RGB-depth map image frame 86 is shown. As will be explained in more detail hereinafter, the gridmap 411 is an array in memory 54 (FIG. 7).

The gridmap 411 is divided into parts $\mathbf{413}_1$, $\mathbf{413}_2$, one part $\mathbf{413}_1$, $\mathbf{413}_2$ for each row. In this case, the gridmap 411 is divided into two parts $\mathbf{413}_1$, $\mathbf{413}_2$ separated by a gridmap centreline 414, each row $\mathbf{413}_1$, $\mathbf{413}_2$ having a row centre $\mathbf{415}_1$, $\mathbf{415}_2$.

The gridmap 411 is used in a process of amalgamating points 122 (FIG. 43) corresponding to plant stems from different frames and so determine a single amalgamated plant coordinate per plant per frame. Coordinates are projected onto the gridmap 411.

Figure 49:
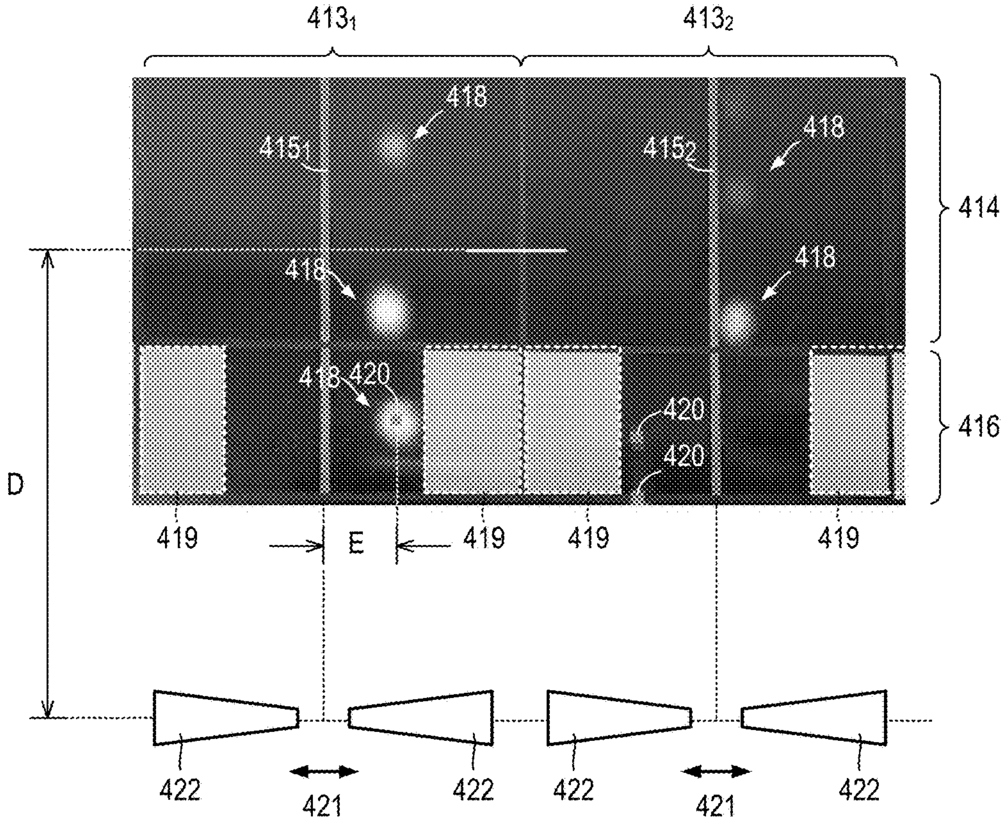
FIG. 49 is a graphical representation of a gridmap and a corresponding relief area overlaid an amalgamating image.

Referring also to FIG. 49, graphical representations of the gridmap 411 and a corresponding relief area 416 overlaid an image which is one in a series of images (i.e., in a video-like way) is shown. Each image contains amalgamated points 418 ("amalgamated peaks") corresponding to possible stems.

Figure 50:
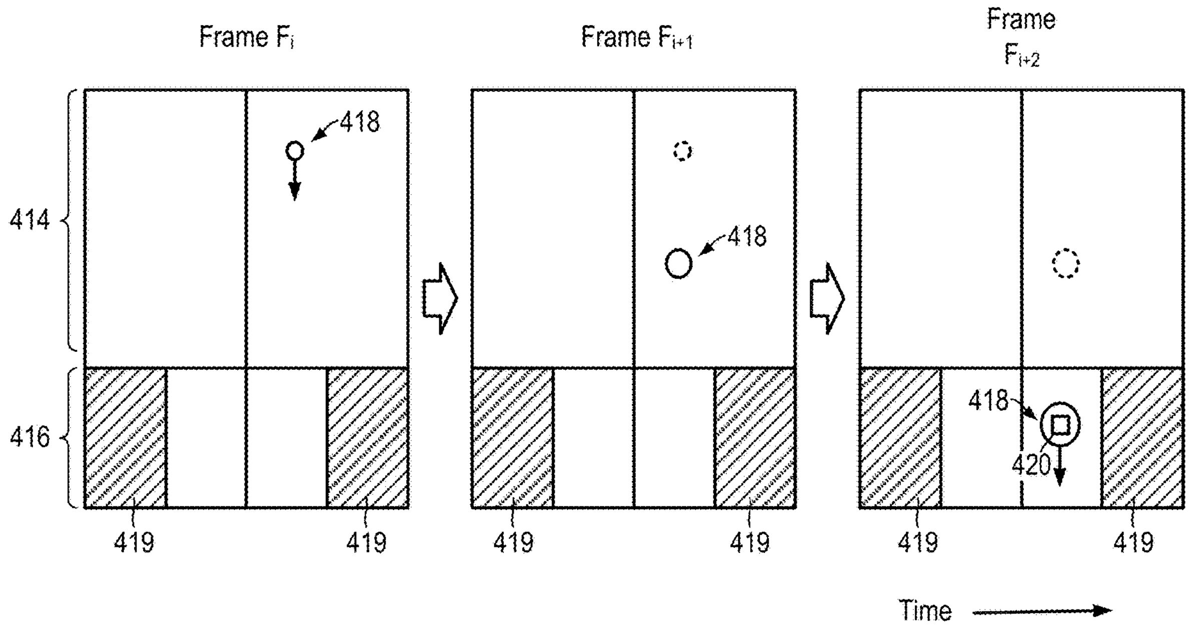
FIG. 50 illustrates development of amalgamated peaks in a series of images.

Referring also to FIG. 50, progressing through the series of images, the amalgamated peaks 418 move down the image towards the relief area 416. As they move, the amalgamated peaks 418 are tracked amalgamated points become brighter as they move down the frame as more points 122 (FIG. 43) are amalgamated. Once an amalgamated peak 418 enters the relief area 416, provided it does not lie in an outlier region 419, it may be tagged with a marker 420. The average distance of amalgamated points 420 from the row centre line $\mathbf{415}_1$ is the side shift error E which is send as a correction to the side shift unit 3 (FIG. 1).

The process allows lateral adjustment 421 of the physical hoe blades 422 using horizontal offsets from the frame origin 401 in units of distance, e.g., meters. There is no vertical offset between gridmap and the frame origin. The hoe blades 422 are mounted at a position a fixed distance D from the frame origin 401, for example, 1.4 m.

Figure 51:
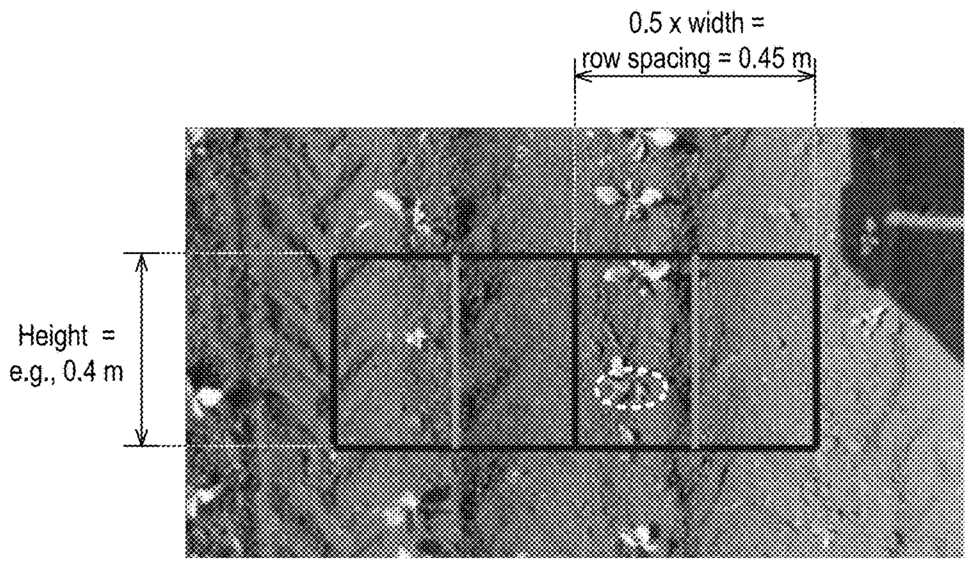
FIG. 51 is another graphical representation of a gridmap and overlaid on an RGB-depth map image frame.

Referring also to FIG. 51, as mentioned earlier, the gridmap 411 is an array in memory 54 (FIG. 7). The number of elements in the gridmap 411 depends on the sampling rate, for example, 5 mm per interval, and the size of the physical area, W×H, on the ground covered by the gridmap 411. In this case, the gridmap 411 covers two rows, the row spacing (0.5 W) is 0.45 m and the height H is 0.4 m (although larger or smaller heights can be used). Thus, the width (i.e., number of elements) of the gridmap 411 is, therefore, (2×0.45)/(0.005)=180 elements, the height of the gridmap is 0.4/(0.005)=80 elements and the size of the gridmap 411 is 14,400 elements.

Amalgamating Peaks

Figure 52:
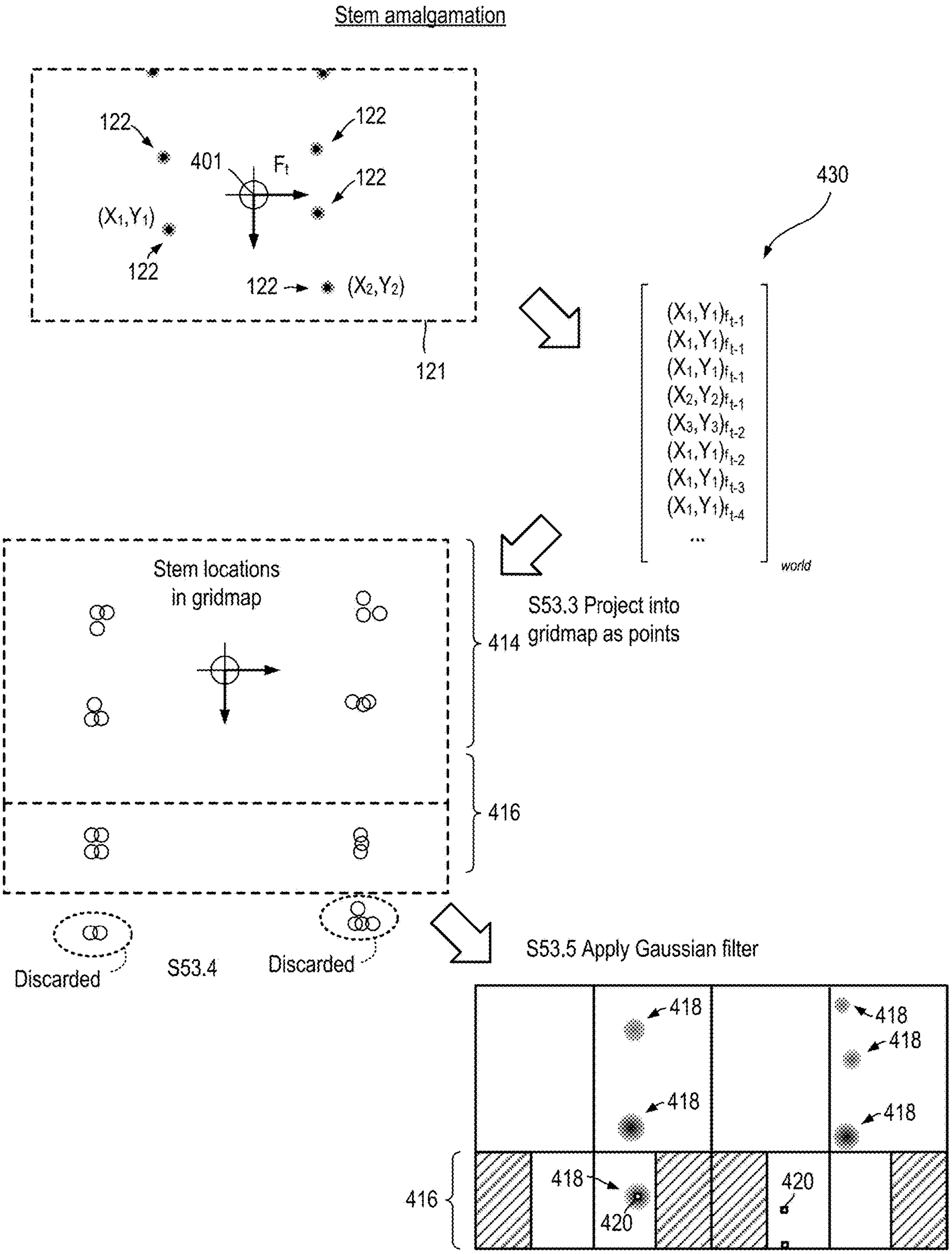
FIG. 52 illustrates stages during stem amalgamation.
Figure 53:
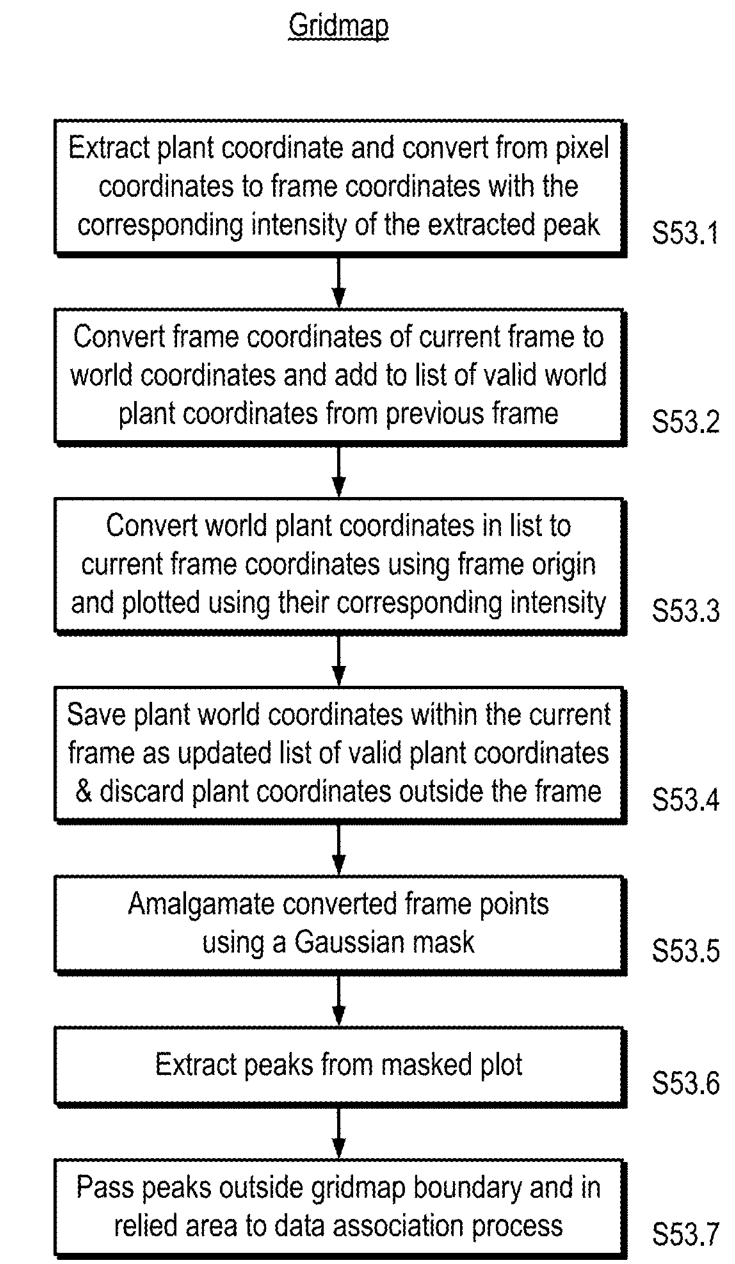
FIG. 53 is a process flow diagram of using a grid map in stem amalgamation.

Referring to FIGS. 52 and 53, a process of amalgamating points 122 (FIG. 43) in a gridmap 411 to produce a single, averaged coordinate per plant per frame will now be described.

The GPU 32 (FIG. 7) extracts plant coordinates from the network output 122 for a frame Ft and converts pixel coordinates to frame coordinates in suitable units of distance (e.g., meters), together with the corresponding intensity of the extracted peak (step S53.1).

The GPU 32 (FIG. 7) converts frame coordinates from the current frame to world coordinates and add the coordinates to a list 430 of valid world plant coordinates from previous frames $F_{t-1}$, $F_{t-2}$, $F_{t-3}$, $F_{t-4}$ (step S53.3). Valid coordinates may have originated from many (e.g., four or more) previous frames.

The world plant coordinates in the list 430 are converted to current frame coordinates using frame origin and plotted using their corresponding intensity (step S53.3). Plant world coordinates that are within the current frame Ft are saved to make an updated list 430 of valid plant coordinates and plant coordinates outside the frame are discarded (step S53.4).

Converted frame points are amalgamated using a Gaussian mask (step S53.5). The greater number of points in the amalgamation, the higher the intensity. The closer points are together in a group, the taller the peak.

Peaks are extracted from the masked plot (step S53.6). This gives an amalgamated plant world coordinate for each plant in each frame.

Peaks outside the gridmap boundary and in the relief area 416 and are passed to the data association process to publish as a single coordinate per-plant (step S53.7).

Data Association

Figure 54:
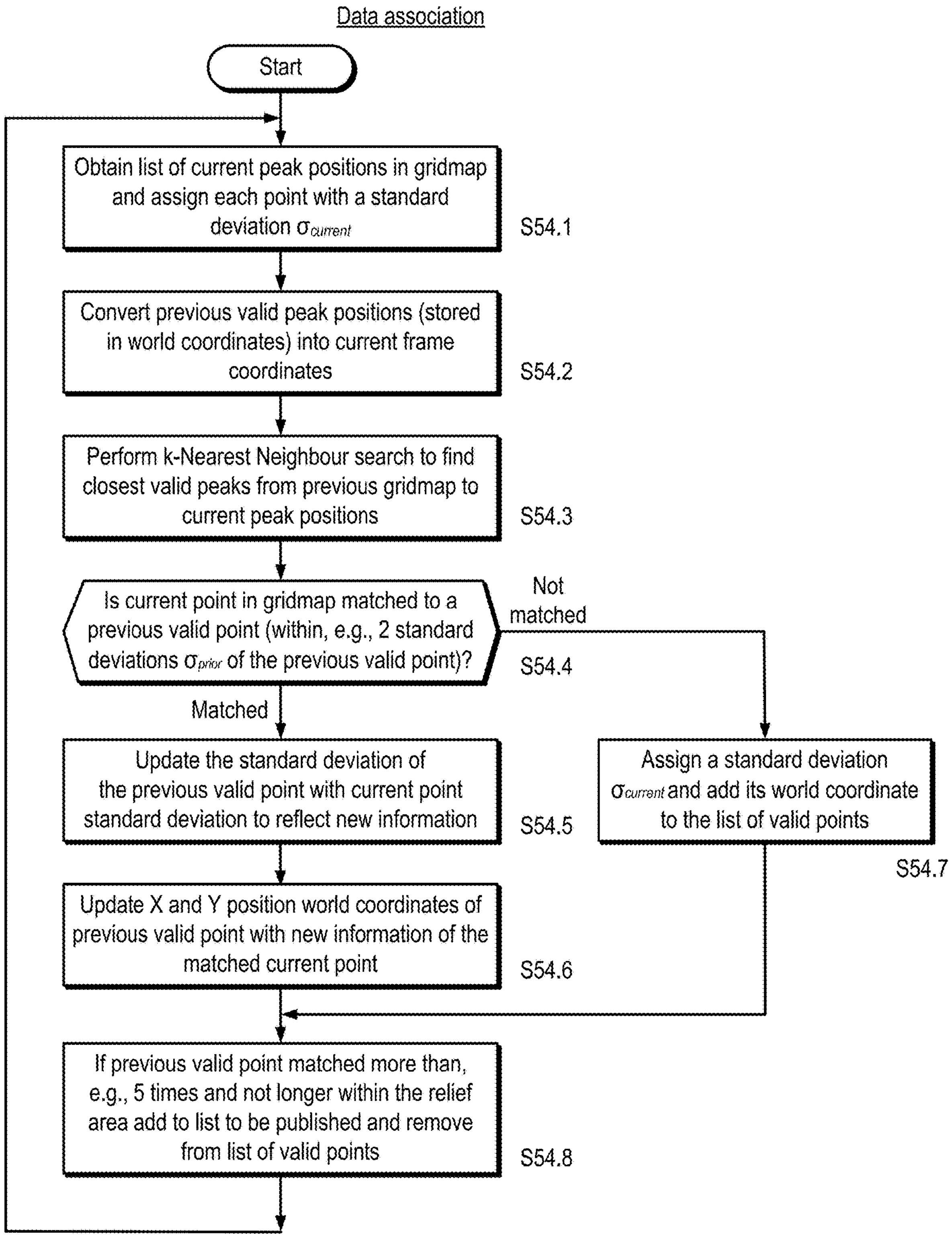
FIG. 54 is a process flow diagram of data association in stem amalgamation.

Referring to FIG. 54, a process of data association whereby coordinates of the same plant across multiple frames are associated to make a single world coordinate 29 (FIG. 8) for each plant to publish will now be described. In particular, a method of Bayesian data association will be described.

The GPU 32 (FIG. 7) receives a list of current peak positions in the gridmap 411 from the amalgamating process and assigns each point with a standard deviation $\sigma_{current}$ (for example, ±10 mm) estimating position error (step S54.1).

The GPU 32 (FIG. 7) converts previous valid peak positions (stored in world coordinates) to current frame coordinates (step S54.2) and performs k-Nearest Neighbour search to find closest valid peaks from previous gridmap to current peak positions (step S54.3).

The GPU 32 (FIG. 7) matches a current point in gridmap to a previous valid point if it is within 2 standard deviations deviation $\sigma_{prior}$ of a previous valid point (step S54.4).

If matched, it updates the standard deviation of the previous valid point with current point standard deviation to reflect new information (step S54.5):

$$\sigma_{posterior} = \sqrt{\frac{\sigma_{prior}^2 + \sigma_{current}^2}{\sigma_{prior}^2 * \sigma_{current}^2}}$$

It also updates X and Y position world coordinates of previous valid point with new information of the matched current point (step S54.6):

$$X_{posterior} = \frac{X_{prior} * \sigma_{current}^2 + X_{current} * \sigma_{prior}^2}{\sigma_{prior}^2 + \sigma_{current}^2}$$

$$Y_{posterior} = \frac{Y_{prior} * \sigma_{current}^2 + Y_{current} * \sigma_{prior}^2}{\sigma_{prior}^2 + \sigma_{current}^2}$$

If the current point is not matched with a previous valid point, the GPU 32 (FIG. 7) assigns a standard deviation $\sigma_{current}$ and adds its world coordinate to the list of valid points (step S54.7).

If a previous valid point has been matched more than a fixed number of times (for example, 4 or 5) and is no longer within the relief area 416 (in other words, it has dropped out of the bottom), it is added to list to be published and remove from list of valid points (step S54.8).

Further details about Bayesian tracking can be found on pages 96 to 97 of "Pattern Recognition and Machine Learning", Christopher M. Bishop (2006).

Thus, the output is a single per-plant, per-frame world coordinate 29 to publish to hoe blade unit.

Ground Plane Determination

Figure 55:
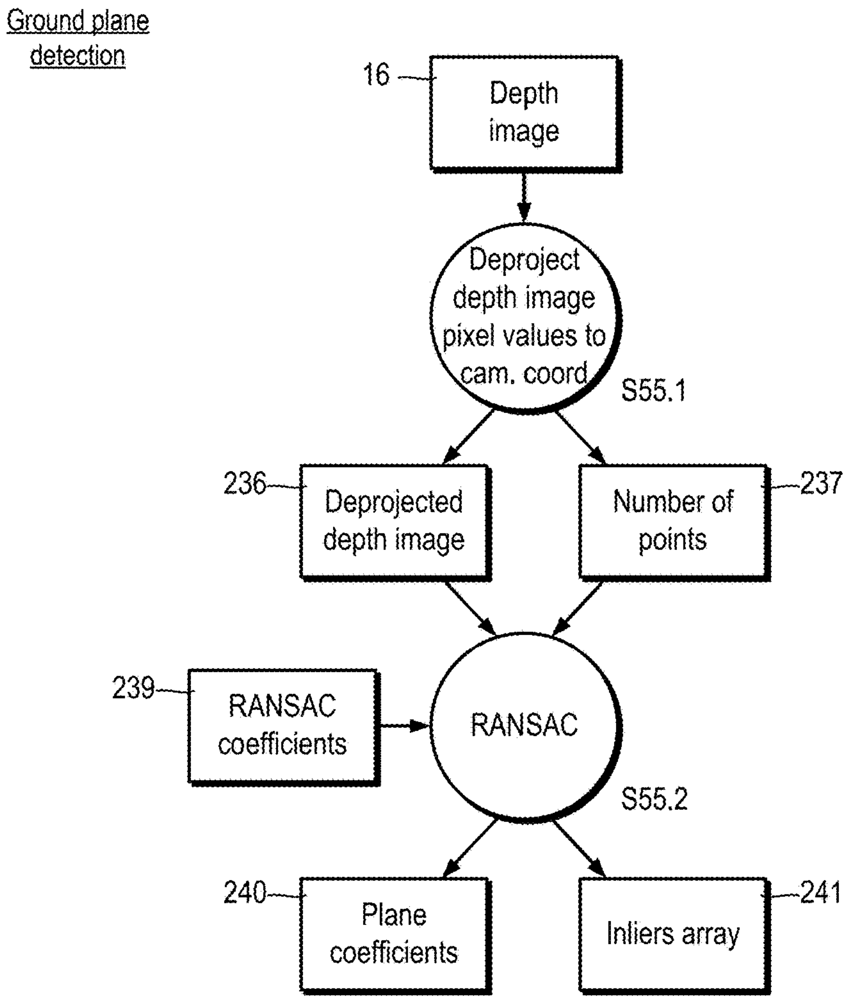
FIG. 55 illustrates a process of detecting a ground plane.
Figure 56:
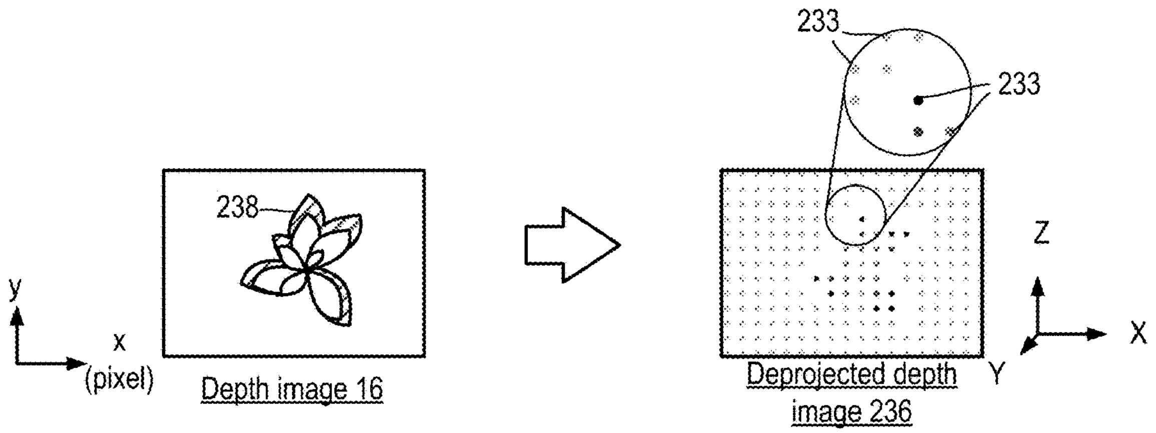
FIG. 56 illustrates generation of a point cloud from a depth image in a process of detecting a ground plane.

Referring to FIGS. 55 and 56, a random sample consensus (RANSAC) process is used to determine the position of a ground plane 91 (FIG. 23).

Before applying the RANSAC algorithm, the pixel values in the depth image 16 is deprojected into a set of points 233 in camera coordinates in real-world units of measurements (e.g., meters) while counting the number 237 of valid depth points in the image (step S55.1). Some regions 238 of the depth image 16 (shown shaded) have no depth information.

The points 233 of the deprojected point cloud 236 and the valid point number 237 are provided to the RANSAC algorithm, together with a set of RANSAC coefficients 239 (step S55.2).

The points 233 are provided in an array of three-dimensional points in real-world units of distance (e.g., meters):

$$\begin{bmatrix} (x_1, y_1, z_1), \\ (x_2, y_2, z_2), \\ \cdots \\ (x_n, y_n, z_n) \end{bmatrix}$$

A RANSAC algorithm available through the Point Cloud Library (PCL) library (https://pointclouds.org/) can be used.

The input RANSAC coefficients 239 comprise a maximum probability (which can take a value between 0 and 1), a distance threshold (which can be set to a value between 0 and 1), a maximum number of iterations (which can be set to positive non-zero integer) and an optimise coefficient flag (which can be set to TRUE or FALSE). The RANSAC algorithm outputs a set of plane coefficients 240 and an inlier array 241.

The inlier array 241 comprises an array of value which are set to 0 or 1 for each pointcloud coordinate 233 to indicate whether it is an inlier or an outlier (i.e., did not contribute to the equation of the plane).

Figure 57:
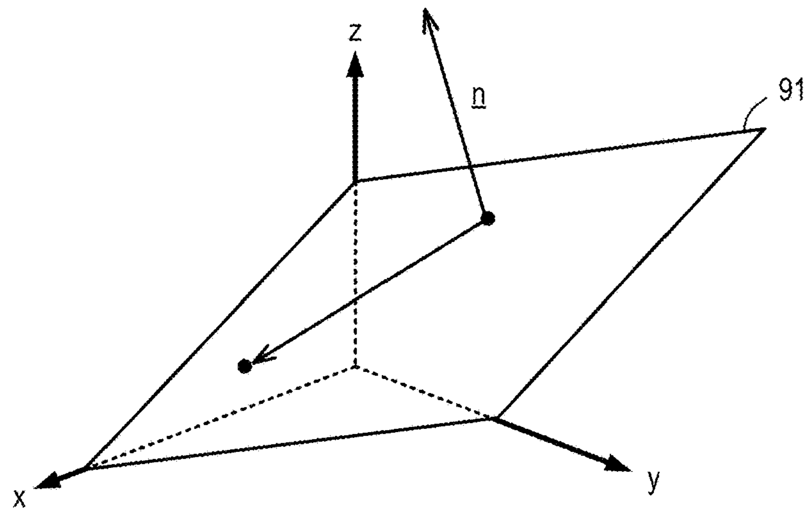
FIG. 57 illustrates a plane and a normal vector to the plane.

Referring also to FIG. 57, the set of plane coefficients 240 consist of four output plane coefficients that take the form:

$$ax+by+cz+d=0$$

The normal vector n to the plane to the camera origin is given by the set of coefficients [a, b, c] and d (shown as h in FIG. 58) corresponds to the magnitude of the normal vector of the plane 91.

Figure 58:
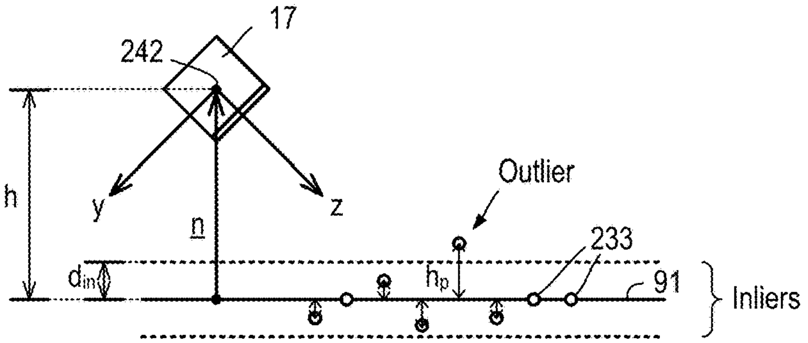
FIG. 58 schematically illustrates a camera and a ground plane.

Referring also to FIG. 58, the magnitude d of the normal vector n gives the camera height h from the plane 91 in meters. The unit vector g (a, b, c) gives the orientation of the plane with respect to the camera origin 242. A unit vector has a magnitude of 1, and so the normal vector n can be calculated by multiplying the unit vector components by the magnitude of the normal vector:

$$n=\begin{bmatrix} a\cdot d \\ b\cdot d \\ c\cdot d \end{bmatrix}$$

RANSAC

The RANSAC algorithm involves randomly sampling a small number of points 233 (in the case of a plane, three points are enough) to calculate an equation of a plane. All other points can be sampled to calculate the perpendicular distance $h_p$ of each point 233 to the plane 91. The measure of the level of fit of the plane to the data is determined by the number of points which are within the inlier distance $d_{in}$ (which can be set by the user). Fitting a plane 91 to a small number of points 233 and counting the number of inliers is repeated up to the maximum number of iterations $n_{max}$ (which can be set by the user). The plane with the greatest number of inliers is chosen and its parameters a, b, c and d are returned as the output 240 and can be used as ground plane position 231.

The inlier distance $d_{in}$ is the perpendicular distance threshold from the ground plane 91. Points 233 within this threshold are considered to be inliers counted for each RANSAC iteration. Maximum number of iterations $n_{max}$ is the maximum number of planes to test against the data to calculate the number of inliers.

—Calculating the Plane Equation from Three Points—

Three points $(x_1, y_1, z_1)$, $(x_2, y_2, z_2)$ and $(x_3, y_3, z_3)$ can be used to calculate an equation of a plane. This can be achieved by finding two vectors a, b from three points:

$$a=\begin{bmatrix} x_1-x_2 \\ x_2-y_2 \\ z_1-z_2 \end{bmatrix}$$

$$b=\begin{bmatrix} x_1-x_3 \\ y_1-y_3 \\ z_1-z_3 \end{bmatrix}$$

The normal vector n between the two vectors a, b is found using the cross product:

$$a\times b=\begin{bmatrix} a_y\cdot b_z-a_z\cdot b_y \\ a_z\cdot b_x-a_x\cdot b_z \\ a_x\cdot b_y-a_y\cdot b_x \end{bmatrix}=|a|\cdot|b|\cdot\sin\theta\cdot n$$

The unit vector u is found by dividing each component of the normal vector n by the magnitude of the unit vector u:

$$u=\frac{1}{|n|}\cdot n$$

The plane equation is found by substituting the components $u_x$, $u_y$, $u_z$ of the unit vector u and the normal vector magnitude |n| into the plane equation $$u_x\cdot x+u_y\cdot y+u_z\cdot z+|n|=0$$

—Calculating Perpendicular Distance of Point from a Plane—

Substituting the x, y and z components of each point 233 into the plane equation yields the perpendicular distance $h_p$ of the point 233 from the plane 91:

$$A=(x_1, y_1, z_1)$$

$$h_p=u_x\cdot(x_1)+u_y\cdot(y_1)+u_z\cdot(z_1)+d$$

Levelling

Figure 59:
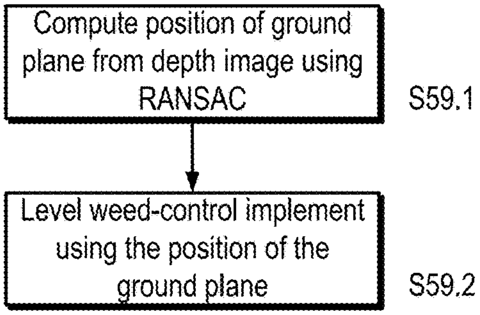
FIG. 59 is a process flow diagram of levelling a weed-control implement.

Referring also to FIG. 59, the position of the ground plane 91 obtained from the depth image 16 using RANSAC can be used to keep the weed-control implement 2 (FIG. 1) level and/or at a fixed height. In particular, if the image control system 20 determines that the ground plane 91 has moved up (or down) (step S59.1), thereby reducing (increasing) the height of the camera 17 above the ground, then it issues a command to actuators which raise (lower) the weed-control implement 2 (FIG. 1) by a distance to compensates for the change in height thereby maintaining the height of the weed-control implement 2 (FIG. 1) above ground (step S59.2).

Determining the position of the ground plane allows non-contact machine levelling and hoe blade depth control. Thus, wheel units or "land wheels" (which run on the ground and which are normally used for machine levelling) can be omitted, which can help to decrease the weight of the machine (i.e., the weed-control implement 2) and to reduce disturbing and damaging the crop. Also, land wheels can lack traction and so be prone to wheel slip in wet conditions and so provide an unreliable indication of speed.

Camera Pose Determination

Figure 60:
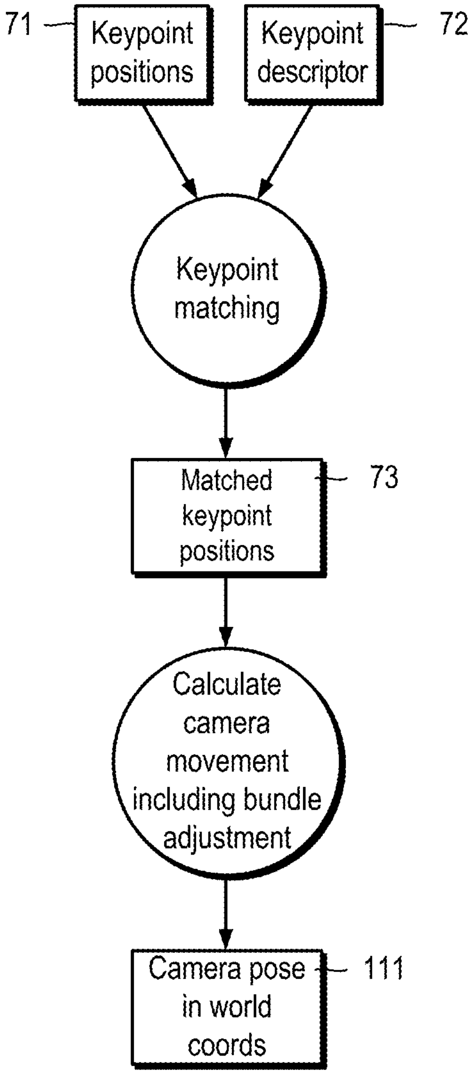
FIG. 60 is a process flow diagram of calculating camera movement.

Referring to FIG. 60, camera pose determination employing a real-time simultaneous localization and mapping (SLAM) algorithm can be used to perform visual odometry based on infrared images 18 and depth images 16. In particular, the oriented FAST and rotated BRIEF (ORB)-SLAM2 SLAM algorithm is used and reference is made to Raúl Mur-Artal and Juan D. Tardós: "ORB-SLAM2: an Open-Source SLAM System for Monocular, Stereo and RGB-D Cameras", IEEE Transactions on Robotics, volume 33, number 5, pages 1255-1262 (2017).

The camera pose determination process is used to track objects. It can take advantage of bundle adjustment allowing iterative optimization points across many frames to calculate the camera movement across keypoints 73, for example in the form of ORB points 73 over frames in real time. As explained earlier, using visual odometry allows wheel units (or "land wheels") can be omitted which can be prone to wheel slip in wet conditions and which can damage crops. Adding GPS to the bundle adjustment calculation can also allow low-cost, real-time kinematic (RTK) positioning-like localisation without the need for a base station.

The ORB-SLAM2 SLAM algorithm uses matched ORB feature points 73 between video frames as input to a bundle adjustment and loop closing method to calculate camera movement in world coordinates. The use of the ORB-SLAM2 SLAM algorithm can have one or advantages. For example, it returns six degrees of freedom (6-DOF) camera pose for each successive image frame. It can be run in real-time at acceptable frame rates (e.g., 30 frames per second), even on a CPU (i.e., it does not need to run on a GPU). Keypoints 73 can be filtered using the optical mask, for instance, to compensate for stationary objects. An RGB-D version is available which allows harnessing of depth coordinates as well as ORB points.

Camera poses 111 are calculated in world coordinates, with the origin being the position of the first frame allowing successive frames to be subtracted to give the translation between video frames in the x, y and z dimensions in real-world distances (e.g., in meters). Knowing translation between overlapping video frames allows successive plant positions to be merged together and a position with respect to physical hoe blades to be calculated, irrespective of camera latency.

Figure 61:
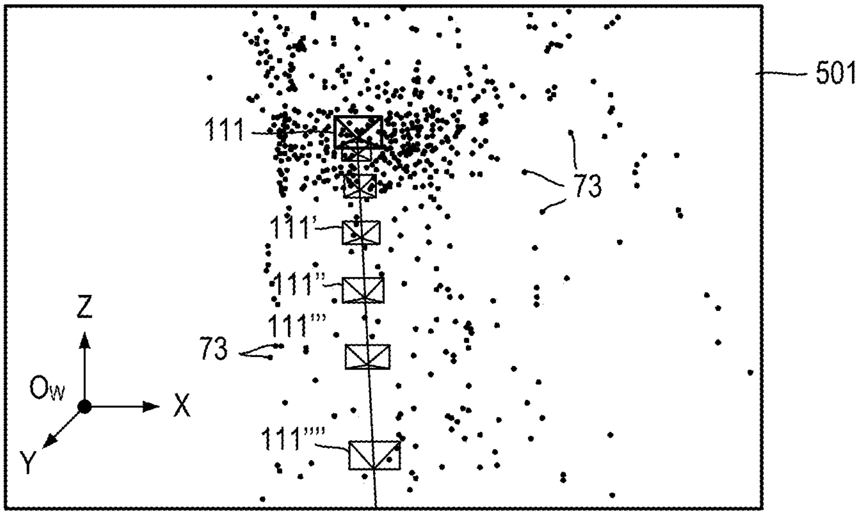
FIG. 61 shows a series of past camera positions and a current camera position, together with matched features positions.

Referring to FIG. 61, an image 501 is shown which includes, at a given time, keypoints 73 in the form of matched ORB points 73, a series of past calculated camera poses 111", 111", 111", 111"" and a current calculated camera pose 111, which is a keyframe.

Figure 62:
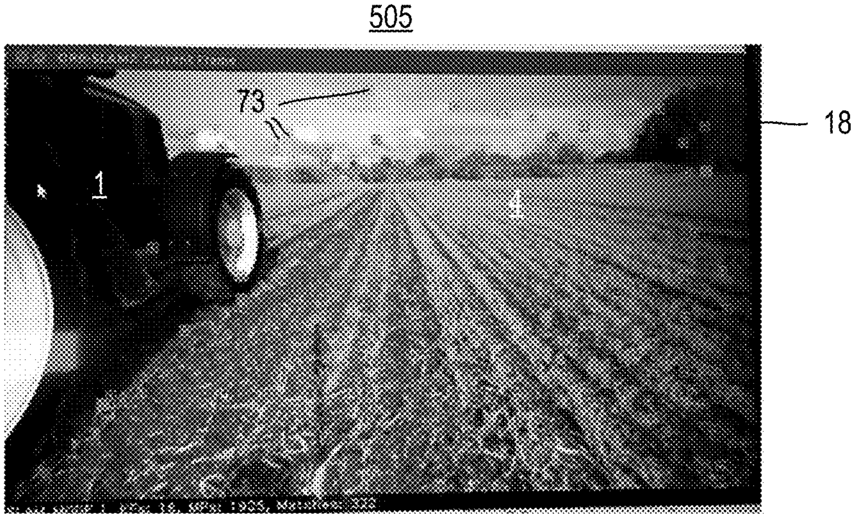
FIG. 62 shows an infrared image overlaid with matched features positions.
Figure 63:
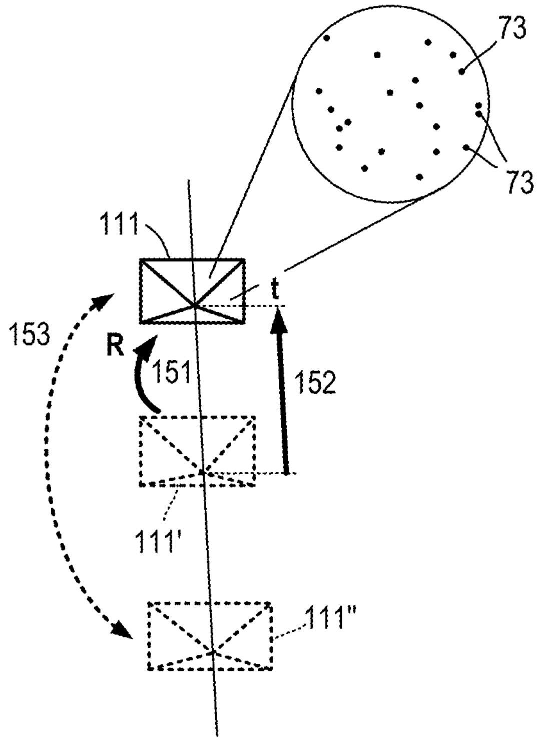
FIG. 63 illustrates translational and rotation matrices in bundle adjustment.
Figure 64:
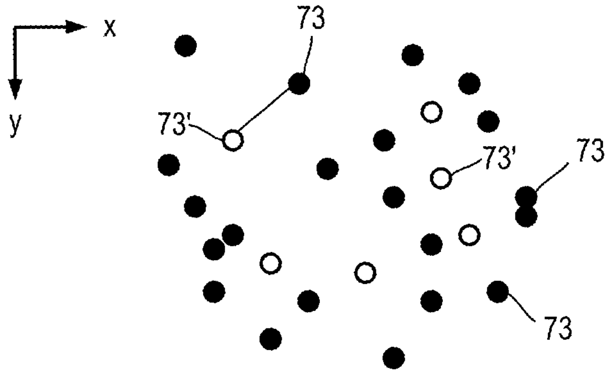
FIG. 64 illustrates two-dimensional pixel positions of keypoints in a current image and matched three-dimensional points of a model reprojected into the current image.

Referring to FIG. 62, a corresponding screenshot 505 is shown which includes an infrared image 18 of the tractor 1 and crop 4, and a set of overlaid matched ORB points 73. Keypoints Referring again to FIG. 11, the image sensor system 12 includes two infrared image sensors $15_1$, $15_2$ which can be used stereo depth sensing, although other forms of stereo image sensors, such as two-colour image sensors, can be used.

The location $x_i$ of a stereo keypoint 73 can be defined as:

$$x^i = \begin{bmatrix} u_x \\ u_y \\ u_z \end{bmatrix}$$

$$u_z = \left(u_x - \frac{f_x b}{d}\right)$$

where $u_x$, $u_y$ are two-dimensional x- and y-pixel coordinates of a keypoint 73 (e.g., a matched ORB point) in an image (in this case, an infrared image 18 obtained by the first infrared image sensor $15_1$), $u_y$ is an approximation of the x-position in the image of the second stereo sensor $15_2$ using the $u_x$ pixel coordinate, the horizontal focal length of the lens $f_x$, the depth value d and a value of the distance b between the two image sensors (in centimeters).

An ORB point 71 provides a unique, rotated BRIEF descriptor 72 for matching with other ORB points 71.

Calculating Camera Pose Using Bundle Adjustment

Referring to FIGS. 61 to 64, bundle adjustment is used to find a rotational matrix R $15_1$ and translation matrix t $15_2$ which minimises two-dimensional Euclidean distance d between two-dimensional pixel positions of keypoints 73, in this case two-dimensional ORB keypoint pixel positions, in a current infrared image 18 and matched three-dimensional points 73' of a model reprojected into the current infrared image 18.

The rotational matrix R $15_1$ and translation matrix t $15_2$ therefore give the position of the current camera pose 111 in world coordinates in relation to previous keyframes 111' using the matched points 73 for optimisation. ORBSLAM2 also conducts bundle adjustment between the previously matched camera poses 111", 111", 111" to perform further pose refinement 153 to reduce or even prevent errors from propagating as one frame is added onto the next. Expressed differently, the current camera pose 111 is a keyframe (or camera pose) and a local bundle adjustment model is used for refining over many previous frames if the ratio of close versus far keypoints drops below a certain level. A close keypoint can be defined as one where the depth is less than 40 times the stereo baseline.

The camera pose determination block 110 (FIG. 9) receives two-dimensional pixel positions of matched keypoints 73 (e.g., matched ORB points) with corresponding depth values.

The problem can be formulated as a non-linear least squares problem to minimise the reprojection error between poses. This creates a large coefficients matrix to be solved to find the rotation and translation coefficients which best minimise the reprojection error. This can be solved iteratively using the Gauss Newton method, preferably, a Levenberg-Marquardt method (also referred to as "damped least squares" method) which introduces a damping factor to Gauss Newton and interpolates it with gradient descent to help avoid fitting to local minima.

Bundle adjustment problems can be solved more efficiently by taking advantage of the sparse nature of the coefficient matrix as most of the values are zero due to not all of the matched points (i.e., observations) being observed in every image. Approaches to taking advantage of the sparse structure of the coefficient matrix include Schur reduction and Cholesky decomposition.

The g20 library is a bundle adjustment library for computer vision, providing a general framework for solving non-linear least squares problems. It uses a number of linear solvers and chooses the best one to solve the required problem depending on dataset size and number of parameters.

Motion Bundle Adjustment: Finding Rotational and Translational Matrices R, t Between Current and Previous Camera Poses Using Matched Keypoints in Current Frame —Initialising Bundle Adjustment—

The first frame to enter the algorithm is inserted as a keyframe and its pose set to the origin (0, 0, 0) in world coordinates. An initial "model" or "map" is created from all keypoints in the initial frame. A stereo keypoints are used, their position in camera coordinates is used to make an initial map (no transformation to world coordinates needed as the first frame is at the origin).

A k-nearest neighbours search (or other similar search) is used to match keypoint 72 of ORB points 73 in current image and previously matched ORB points 73' in the model.

The least squares problem is minimised to find the rotational and translational matrices R, t:

$$R, t = \underset{R,t}{\operatorname{argmin}} \sum_{i \in X} \left\| x^i_{(\cdot)} - \pi_{(\cdot)}(R X^i + t) \right\|^2$$

$$\pi_s = \left( \begin{bmatrix} X \\ Y \\ Z \end{bmatrix} \right) = \begin{bmatrix} f_x \frac{X}{Z} + c_x \\ f_y \frac{Y}{Z} + c_y \\ f_x \frac{X-b}{Z} + c_x \end{bmatrix}$$

where $x_{(.)}^i$ is the computed stereo keypoint position from the matched ORB point, Its provides the function to reproject the model three-dimensional point into the current frame, R, t are the rotational and translational matrices used to transform the previously-matched model point in terms of the current frame's pose and hence reduce the reprojection error when projected into the image plane, $f_x$ and $f_y$ are the horizontal and vertical focal lengths of the image lens, and $c_x$ and $c_y$ are the principle points of the sensor (used for translating projected coordinates into pixel coordinates from the top left-hand corner of the image).

Local Bundle Adjustment: Optimising Rotational and Translational Matrices R, t Between Current and Previous Keyframes to Minimise Error Propagation Optimising is performed across visible keyframes $K_l$ and all points $P_l$ seen in those keyframes. Keyframes which observe points $P_l$ are optimised whereas all other keyframes $K_f$ remain fixed but do contribute to the cost function:

$$X^i, R_l \mid i \in P_l, l \in K_l = argmin_{X^i R_l t_l} \sum_{k \in K_f \cup K_f} \sum_{j \in X_s} p\,(E_{kj})$$

$$E_{kj} = \left\| x^j_{(\cdot)} - \pi_{(\cdot)}(R_k X_j + t_k) \right\|^2$$

Keypoint Detection and Matching

Figure 65:
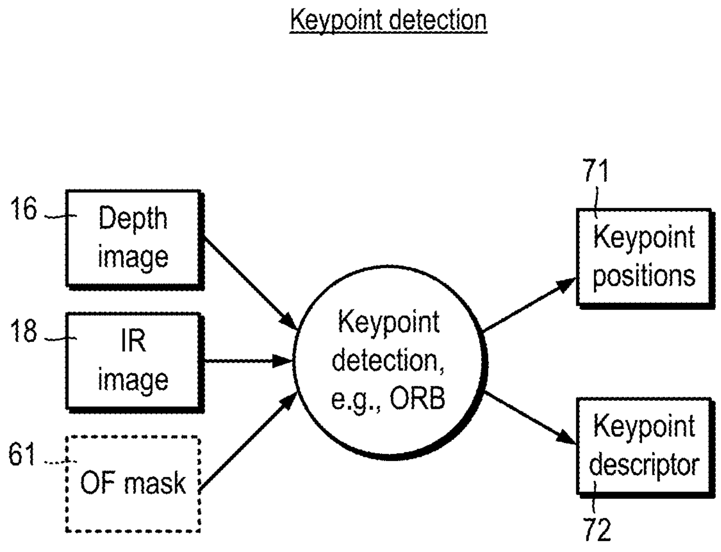
FIG. 65 illustrates a process of feature extraction and descriptor generation.
Figure 66:
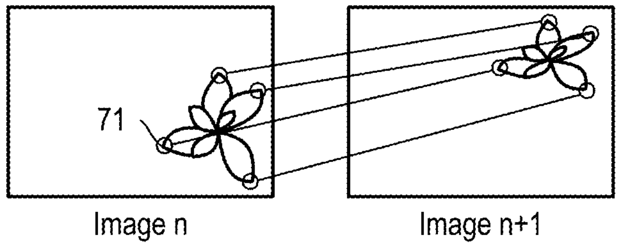
FIG. 66 schematically shows feature matching.

Referring to FIGS. 65 and 66, features in an image, such as tips of leaves 71 or corners of rocks (not shown), can be tracked from one image to the next. By matching features in overlapping images, it is possible to compute camera movement from one image to another, in other words, to perform visual odometry.

Features in an image can be defined using a keypoint 71 and a corresponding descriptor 72 classifying the keypoint. A two-dimensional feature detector and descriptor extractor process is used to find keypoint 71 and corresponding descriptor 72 in the infrared images 18 which can be masked using the optical flow mask 61. A suitable function is cv2.ORB( ) in OpenCV. Other feature detector and descriptor extractor processes, however, can be used, such as scale-invariant feature transform (SIFT) or speeded up robust features (SURF) processes.

Optical Flow Mask

Optical flow allows outliers to be removed from images. Outliers mainly comprise stationary objects (i.e., stationary with respect to the moving camera), such as the back of the tractor 1 (FIG. 1) and other parts of the weed-control implement 2 (FIG. 1). Outliers can also include the sky.

Figure 67:
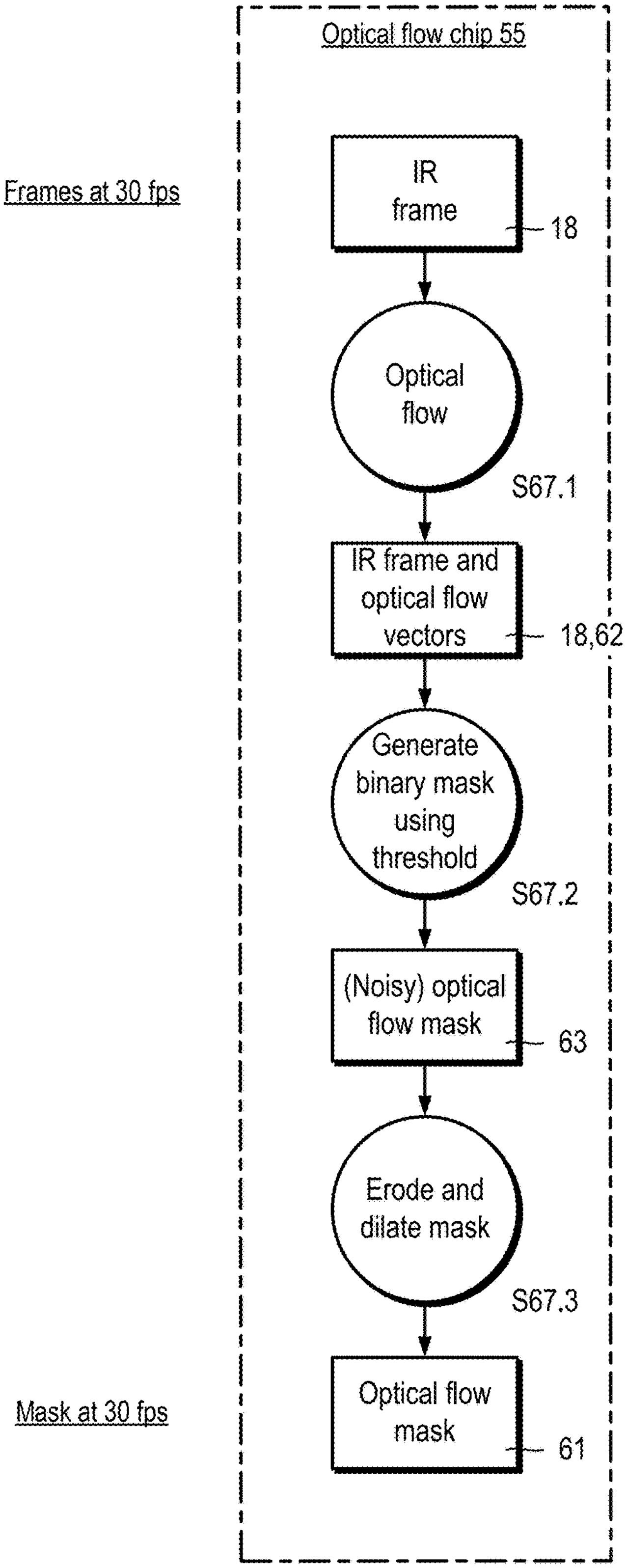
FIG. 67 illustrates a process of generating an optical flow mask.

Referring to FIG. 67, the optical flow mask generation process can be carried out in real-time in hardware using an optical flow chip 55. A GStreamer pipeline (not shown) can be used to access an optical flow chip 55 via low-level libraries (not shown).

Infrared image frames 18 are received at a frame rate of 30 frames per second and an array of optical flow vectors 62 is produced for each infrared image frame 18 (step S67.1). Thresholding is performed on each vector, i.e., for a vector corresponding to particular pixel, its mask value=1 if $|v_i|>0$, else mask value=0 resulting in a noisy optical flow mask 63 (step S67.2). Erosion is performed on the noisy optical flow mask 63 resulting in an optical flow mask 61 for each frame (step S67.3). Erosion removes bridges, branches and small protrusions in the noisy mask 162 and dilation fills in holes and gaps.

Examples of Network Outputs

Figure 68:
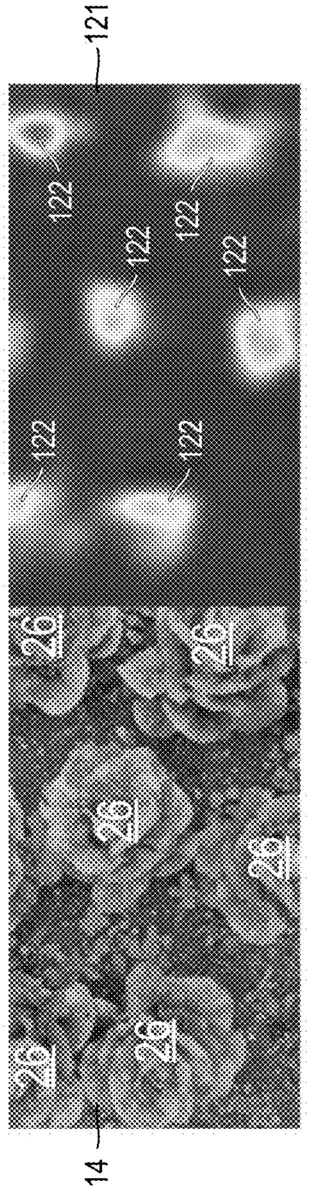
FIG. 68 illustrates a first image and a corresponding heat map showing plant centres.
Figure 69:
FIG. 69 illustrates a second image and a corresponding heat map showing plant centres.
Figure 70:
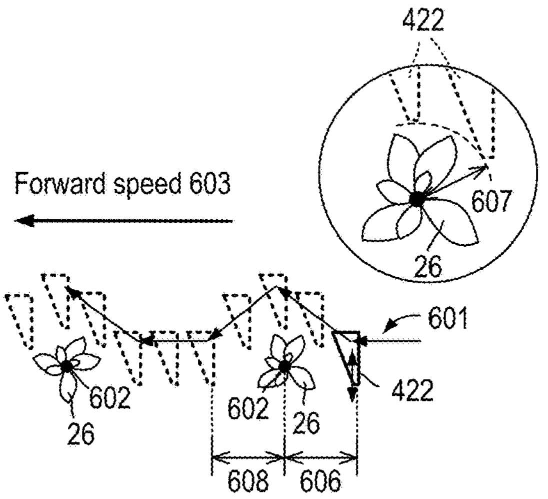
FIG. 70 illustrates movement of a reciprocating hoe blade around a plant stem.
Figure 71:
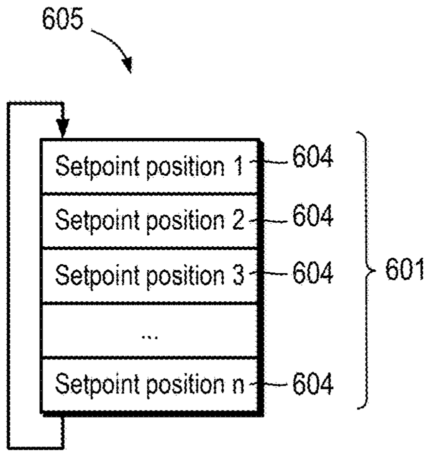
FIG. 71 schematically shows an array storing a hoe trajectory.
Figure 72:
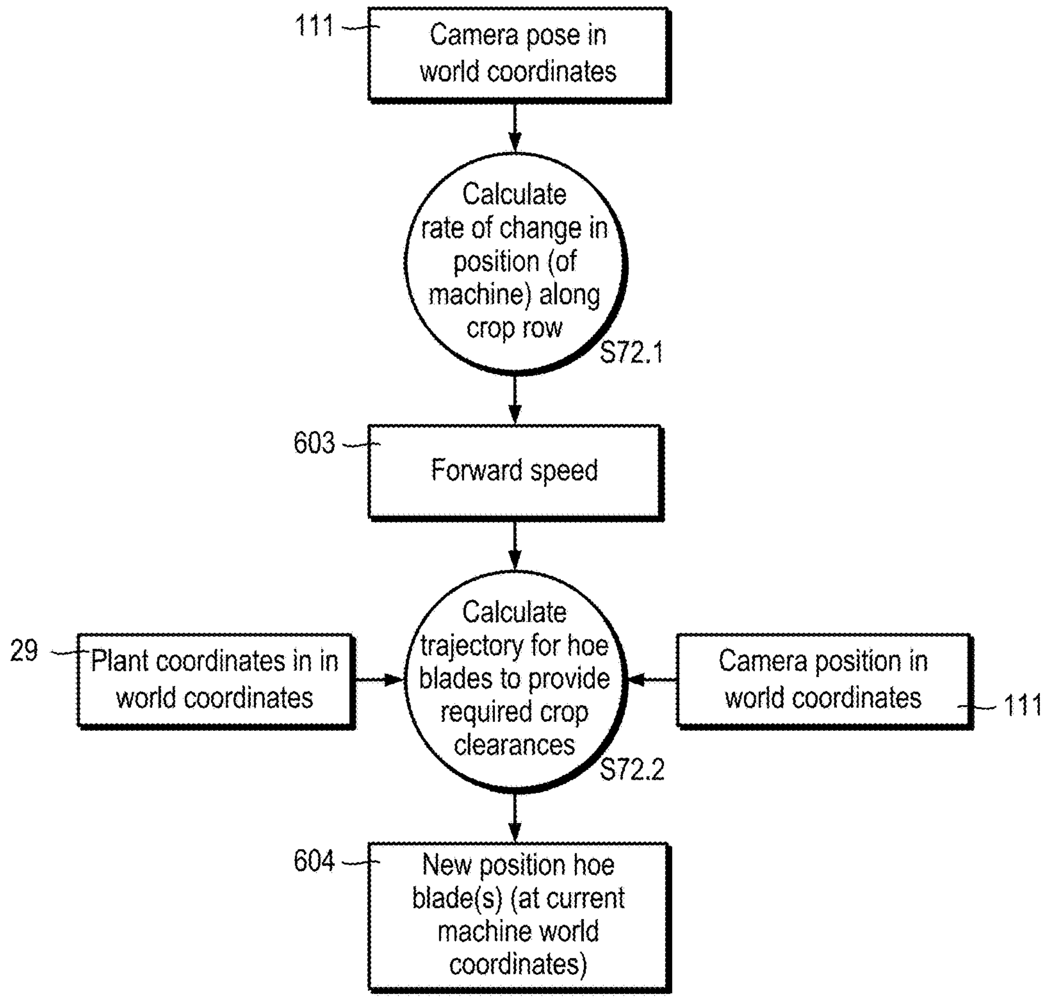
FIG. 72 is a process flow diagram of a method of computing hoe blade positions.

FIGS. 68 and 69 illustrate real colour images 14 of a crop together with corresponding heatmap-like network output 121 images for a lettuce crop and a celery crop respectively. The real colour images 14 include images 26 of the plants and the network output 121 images include peaks 122 corresponding to crop stems. The network output 121 images are, however, noisy and so the shapes of the peaks are irregular.

Calculating New Hoe Blade Positions

Referring to FIGS. 70 to 73, for each crop plant stem coordinate 29 generated by the update block 140, a hoe trajectory 601 is calculated to define the motion of the hoe blade(s) 422 required to weed around that plant 26. The hoe trajectory 601 is specific to the shape of the hoe blade and the clearances required around the plant stem 602 for the type of crop being weeded.

The hoe trajectory 601 takes account of the forward speed 603 of the weeding machine to compensate for limits on acceleration and velocity of the hoe blades 422. The forward speed 603 is calculated from rate of change of frame position which can be obtained from the camera pose 111 or by other forms of odometry (step S72.1).

Because the camera is some distance ahead of the hoe blade 355, the CPU 31 is able to calculate at what distance 606 on the ground (before of the crop plant 26), the hoe blade 422 needs to move so that there is appropriate clearance distance 607 from plant stem 602 before the hoe 422 reaches the position of the crop plant 26. The CPU 31 calculates the clearance distance 607 over which clearance should be maintained so that the blade 422 can cut back in with the hoe blade an appropriate distance 608 behind the crop plant.

The hoe trajectory 601 comprises a series of setpoints 604 stored in an array 605 in memory implemented as a circular buffer. As the weeding machine moves along the crop row setpoint positions 604 from this array are communicated via CANopen to brushless DC electric motor (BLDC) motors (not shown) driving actuators (not shown) that control the position of each hoe blade.

The setpoint positions communicated to the motor drive can either be a sequence of discrete position values that together define a motion profile or, where the drive supports it, a trigger position for the start of a pre-defined motion profile. In the latter case the machine position along the crop row must also be communicated to the motor drive.

Figure 73:
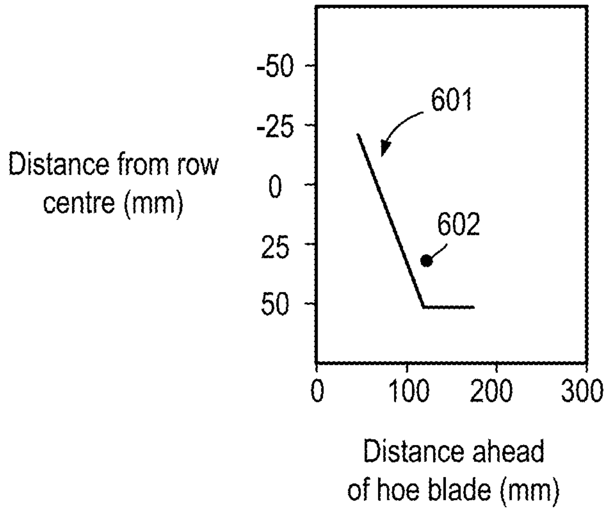
FIG. 73 is a plot of hoe blade trajectory.

Referring to FIG. 73, a specific example of a trajectory is shown. FIG. 73 shows a location of a plant stem 602 as the weeding machine approaches it and an associated hoe trajectory 601 that has been calculated. In this example, the plant stem 602 is shown about 120 mm ahead of the hoe blade 422 and the blade motion start when the crop stem is about 50 mm ahead of the hoe blade 422. The blade position is defined up to a point about 30 mm after the location of the plant stem 602 after which the hoe blade will be returned to its default parked position (not shown).

Features

Referring again to FIG. 4, the imaging system 11 can be used not only to identify the positions of plants stems centres, but also other crop features, which may be part of a plant, such as a tip of a leaf, a flower, or fruit, or which may not be part of a plant, such as a ridge in the soil or in the crop, or furrow in the soil or in the crop.

Figure 74:
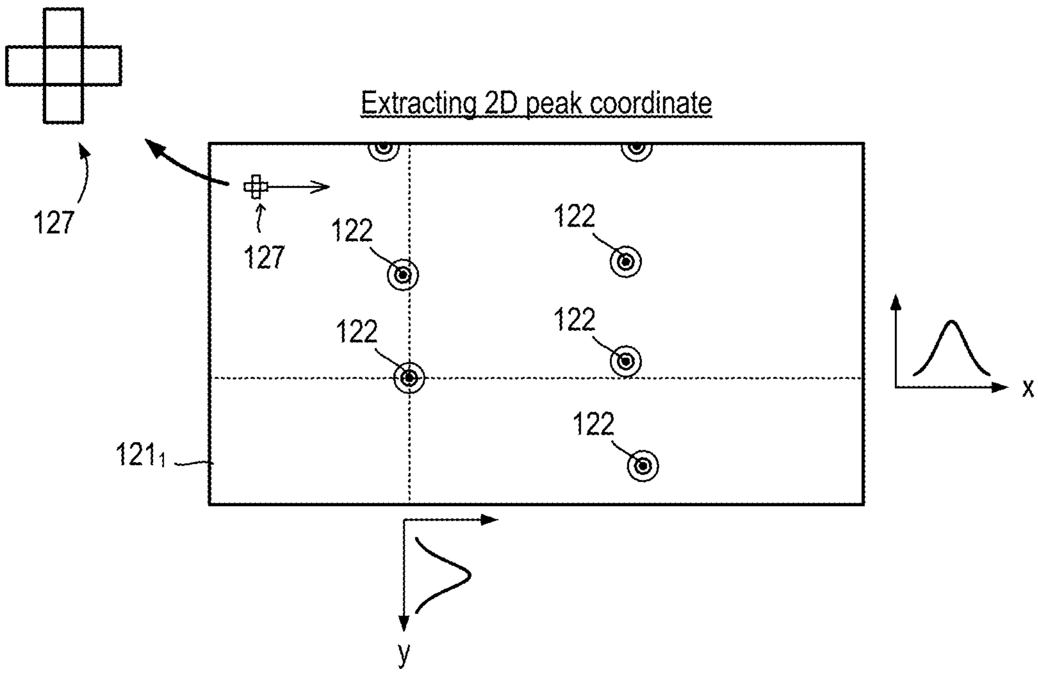
FIG. 74 schematically illustrates extracting plant stem locations using a cross-shaped sample area to find a peak with maxima in both x- and y-directions.

Referring to FIG. 74, a first example of a network output 1211 (or "response map") is shown which takes the form of a feature map having a heatmap-like appearance comprising keypoints 122 (or "points") representing plant stem coordinates. Each keypoint 122 takes the form of a feature map having a Gaussian-filtered appearance comprising peaks.

As explained earlier, plant stem locations can be extracted using a sample area 127 which is scanned across the image 1211. Using a cross-shaped sample area 127, a 2D peak corresponding to a peak with maxima in both x- and y-directions can be found and its position extracted. This approach is suited for extracting plant stem coordinates.

In some cases, a peak in one of the directions may be all that is needed. For example, the lateral position (e.g., along the x-axis) may be all that is of interest, such as the lateral position of a ridge of a ploughed field, the lateral position of a row of a crop or the lateral position of a ridge of a row.

Figure 75:
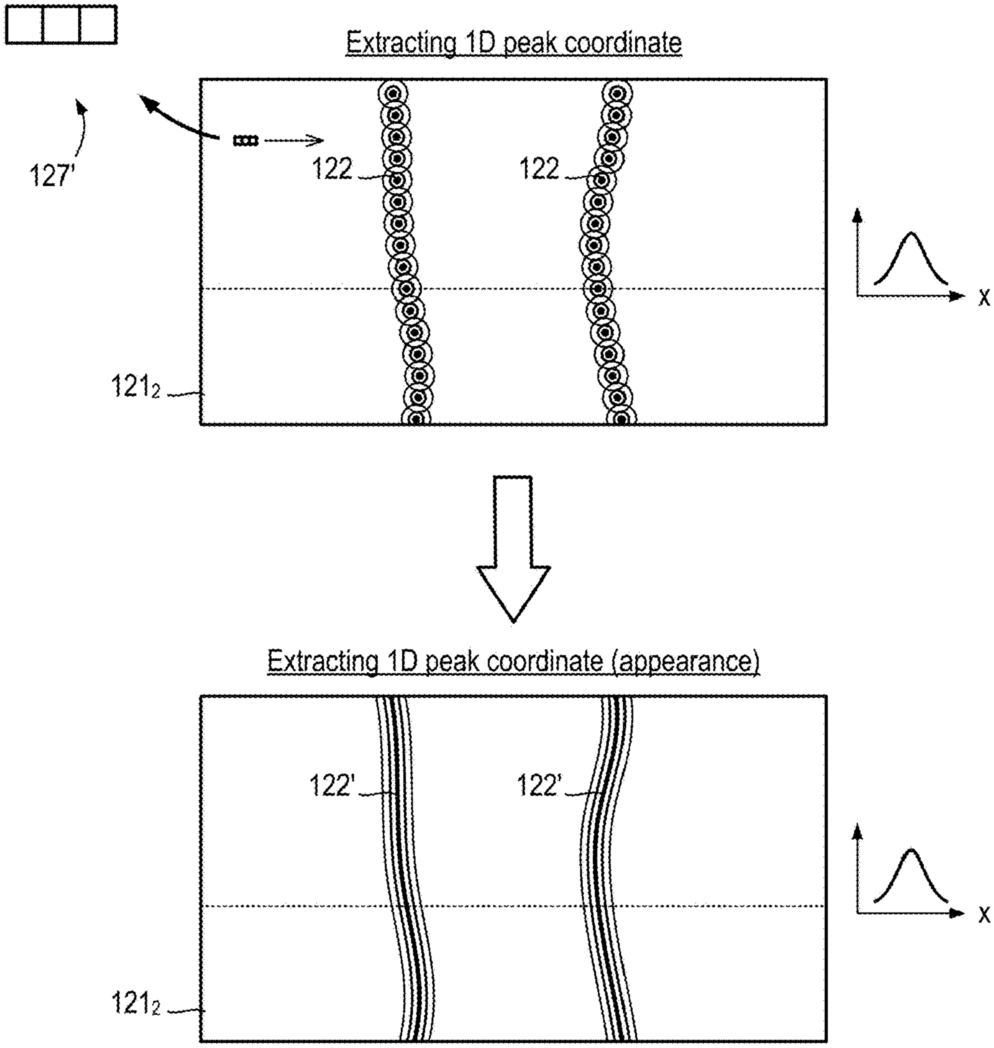
FIG. 75 schematically illustrates extracting plant row location using a bar-shaped sample area to find a peak with a maximum in the x-direction.

Referring to FIG. 75, a second example of a response map 1212 is shown constructed from overlapping closely-spaced keypoints 122 which give the appearance of a line 122'.

As in the first example, a sample area 127' is scanned across the image 1212. In this case, however, a three-section bar-shaped sample area 127' is used. Using the bar-shaped sample area 127', a 1D peak corresponding to a peak with a maximum in the x-direction can be found and its position extracted. This approach is suited for extracting the lateral position of a row of a crop or the lateral position of a ridge of a row.

Figure 76:
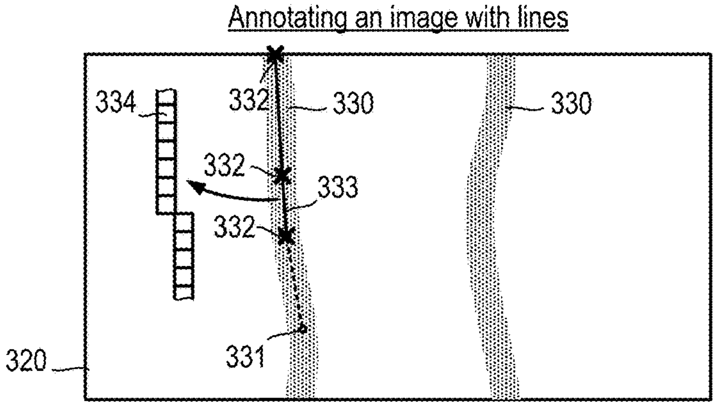
FIG. 76 schematically illustrates annotation of a crop row.

Referring to FIG. 76, a ground truth image 320 which identifies lines can be generated from an image 320. A user annotates the image 320 by identifying a crop row 330, for example, by positioning a cursor 331 and clicking on the image 320 at the location on a row to identify at least a pair of selected points 332. Each pair of points defines a line 333 comprising pixel points 334.

The image 320 is converted into a binary image 322 (FIG. 78) containing annotated coordinates (where a pixel value is equal to 255 at a point, else is equal to 0). The binary image 322 is converted into a Gaussian-filtered image 324 (FIG. 82) containing a Gaussian peak 325' at each point 334 along the row by passing a Gaussian filter (not shown) across the binary image 322. The heat map 324 provides a gradient allowing pixel intensity to be proportional to likelihood of the pixel being a row.

Referring to FIGS. 77 to 82, examples of annotating an image 320, converting annotated points 323 or points 334 along one or more lines 333 defined by two selected points 332 into a binary image 322 and generating Gaussian-filtered images 324 with different sizes of Gauss filter binary for discrete positions (such as a stem) and for a line of positions (such as a row) are shown.

Figure 77:
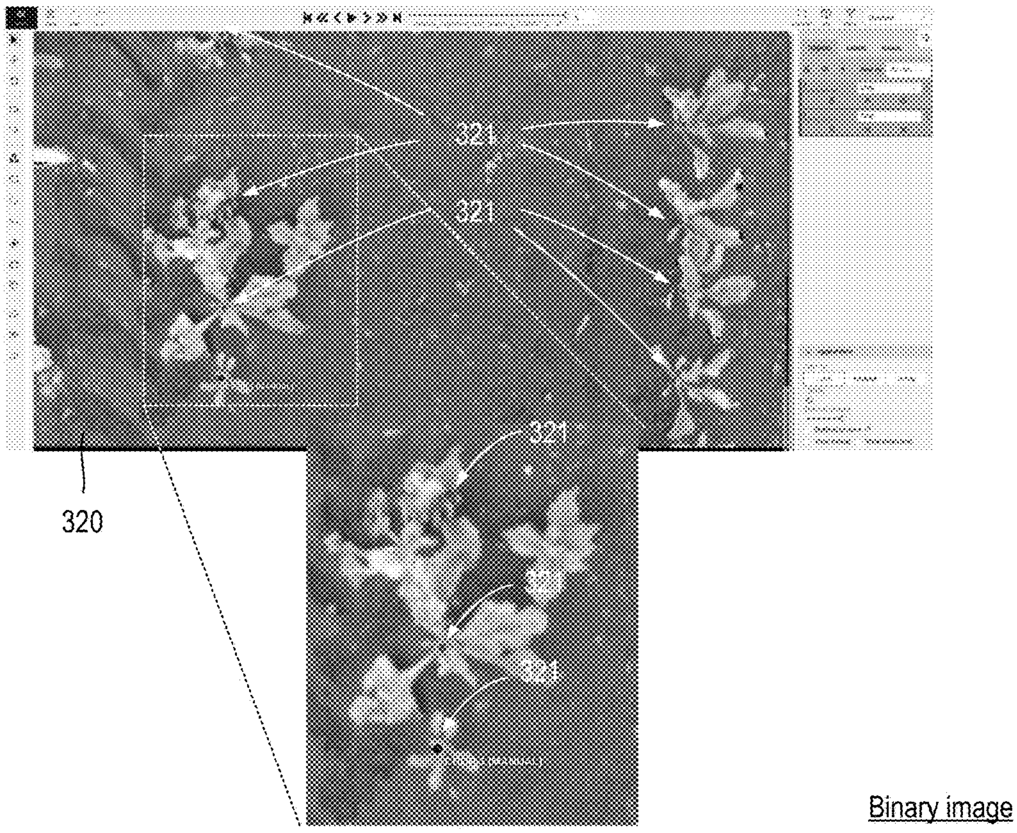
FIG. 77 illustrates annotating an image of a sugar beet crop with points.

Referring to FIG. 77, an image 320 is shown. In this example, the image 320 is an orthographic colour image of a sugar beet crop. As explained hereinbefore, a user annotates the image 320 by identifying stem coordinates 321 by positioning a cursor at the point at which they consider the stem is located and clicking on the image.

Figure 78:
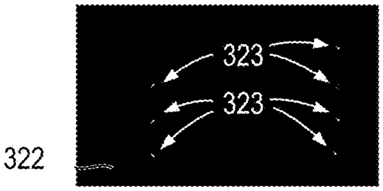
FIG. 78 is a binary image obtained from an annotated image of the sugar beet crop shown in FIG. 77.

Referring to FIG. 78, the image 320 is converted into a binary image 322 containing annotated stem coordinates 323.

Figure 79:
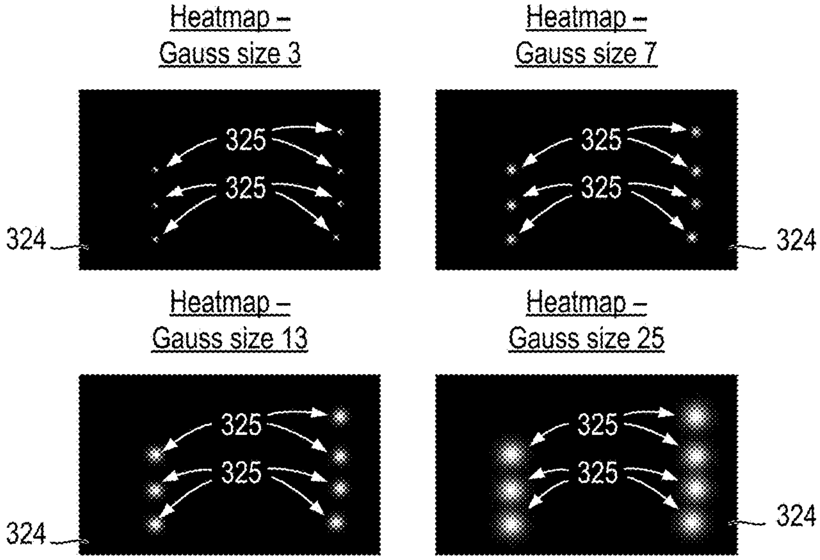
FIG. 79 are heat maps obtained from the binary image shown in FIG. 78 with different sizes of Gaussian filters.

Referring to FIG. 79, the binary image 322 is converted into a Gaussian-filtered image 324 (or "heatmap") containing a Gaussian peak 325 at each stem coordinate 323 by passing a Gaussian filter (not shown) across the binary image 322.

FIG. 79 illustrates heatmaps 324 obtained using four different sizes of Gaussian filter, namely 3 (i.e., 3×3 pixels), 7, 13 and 25. Different Gaussian filters can be used to calculate loss in different parts of the network, e.g., in coarse to fine supervision. As shown in FIG. 79, the larger the filter, the larger the resulting Gaussian peak 325.

Figure 80:
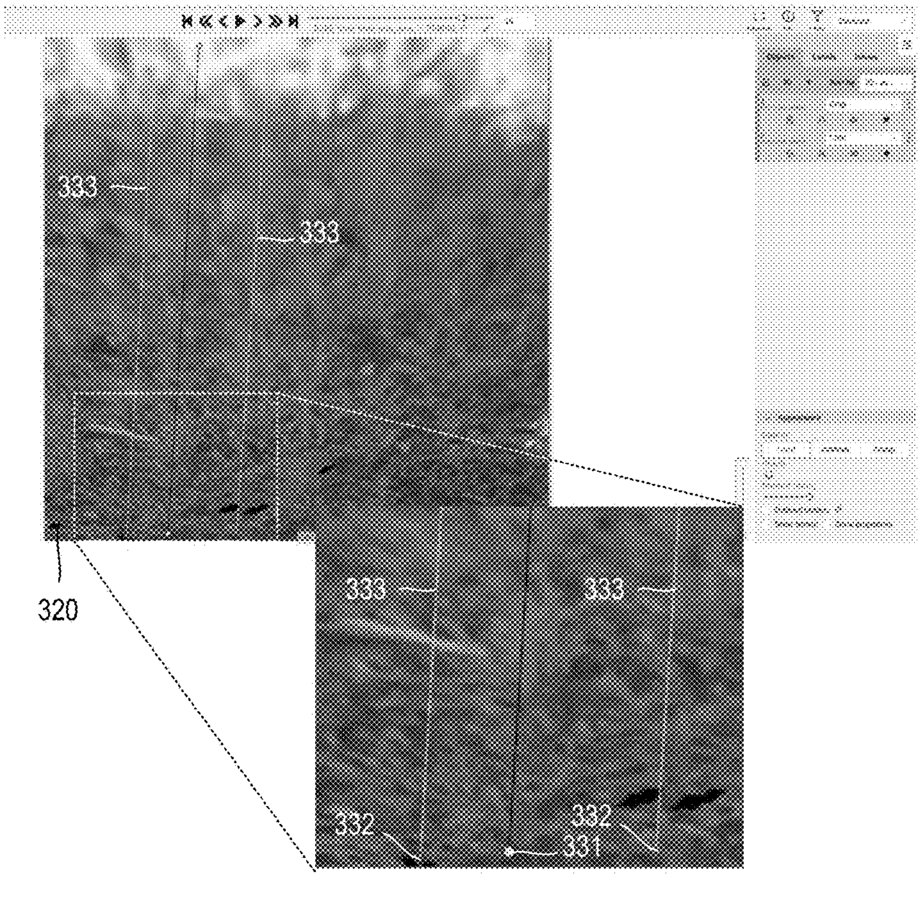
FIG. 80 illustrates annotating an image of a crop with lines.

Referring to FIG. 80, an image 320 is shown. In this example, the image 320 is an orthographic colour image of winter wheat. As explained hereinbefore, a user annotates the image 320 by identifying start and end points 322 by positioning a cursor 331 and clicking on the image.

Figure 81:
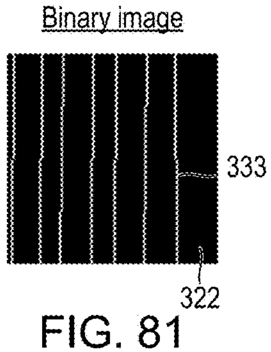
FIG. 81 is a binary image obtained from an annotated image of the crop shown in FIG. 80 and shows a line as a line of pixels.

Referring to FIG. 81, the image 320 is converted into a binary image 322 containing annotated crop rows 333 each row consisting of points 334 (FIG. 76).

Figure 82:
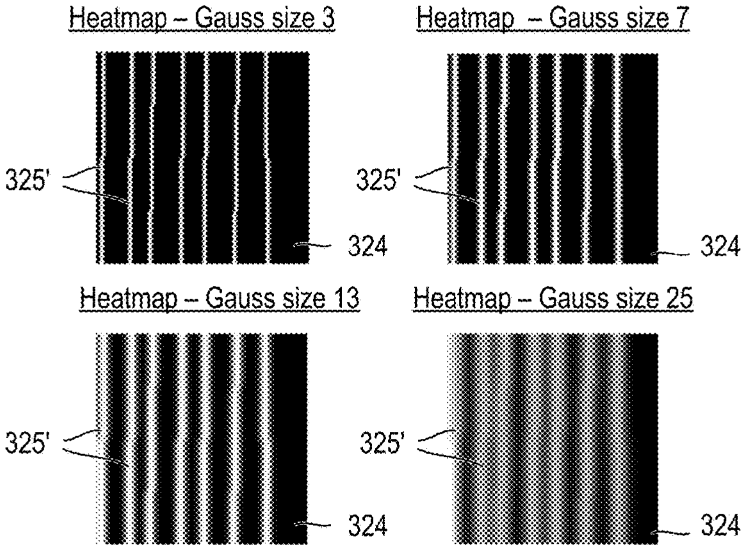
FIG. 82 are heat maps obtained from the binary image shown in FIG. 81 with different sizes of Gaussian filters.

Referring to FIG. 82, the binary image 322 is converted into a Gaussian-filtered image 324 (or "heatmap") containing a Gaussian peak 325' along each row by passing a Gaussian filter (not shown) across the binary image 322.

FIG. 82 illustrates heatmaps 324 obtained using four different sizes of Gaussian filter, namely 3, 7, 13 and 25. As shown in FIG. 79, the larger the filter, the larger the resulting Gaussian peak 325.

Depth Information

Referring again to FIG. 14, an image, such as colour image 14, can be provided with depth information using a depth image 16 obtained using the image sensor system 12 (FIG. 11), in particular using infrared sensors $\mathbf{15}_1$, $\mathbf{15}_2$ (FIG. 11).

The image may, however, be provided with depth information in other ways, in particular, without using a depth image 16.

Figure 83:
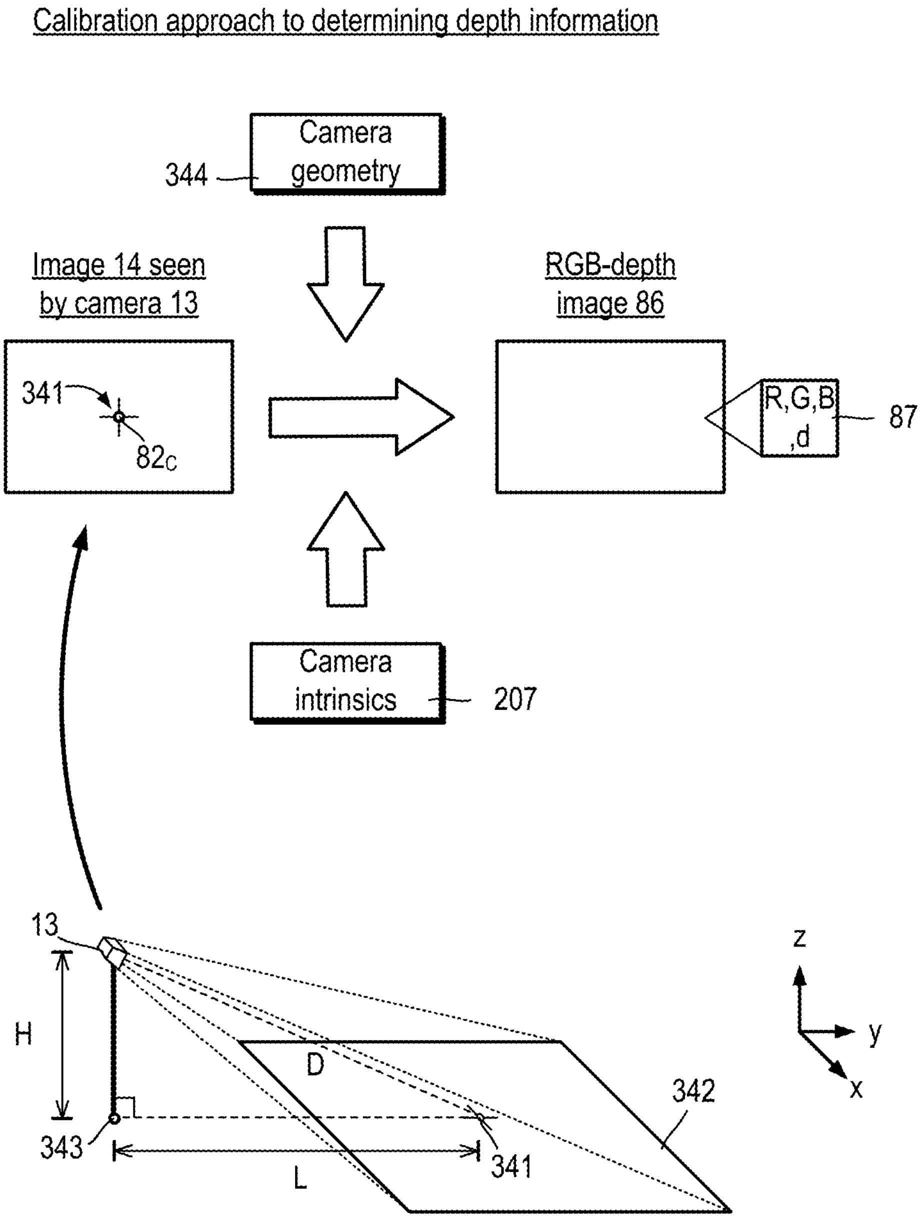
FIG. 83 illustrates an arrangement used for calibrating an image to obtain depth information.

Referring to FIG. 83, per-element depth information can be obtained from calibration of an image 14 and the distance between a camera 13 and a point on an object 341 in the image 14.

A colour camera 13 captures an image 14 which includes the object 341. The object 341 is used as a suitable reference point and may lie, for example, in the centre of the image 14. The image 14 covers an area 342 of ground including the object 341.

A user measures a distance L from the point on the object 341 to a base point 343 lying directly under the camera 13. Thus, the distance L is measured in x-y plane, perpendicular to the z-axis. The height H of the camera 13 above the base point 343 is known or measured. Knowing the distance L and the height H, the distance D between the camera 13 and the point on the object 331 can be calculated. Thus, the depth value for the pixel 82*c* corresponding to the point on the object is known. Using camera geometry 344 and camera intrinsics 207, a crude depth d for all other pixels 82 in the object can calculated.

Re-Rendering

Referring again to FIGS. 25 to 31, an image can be converted into an orthographic view.

Per-element depth information can be used to render an image (herein also referred to as a "rendered image" or "mesh image") in which width and height of the image corresponds to real-world coordinates. This can allow pixel coordinates in the rendered image to be converted directly into real-world coordinates. Moreover, a set of rendered images will generally have the same or similar widths and heights, potentially even if the images are captured using different cameras in the same nominal set up (e.g., nominal height, angle etc), which can help with training and with feature identification. An example of an orthographic image is shown in FIG. 31.

Figure 84:
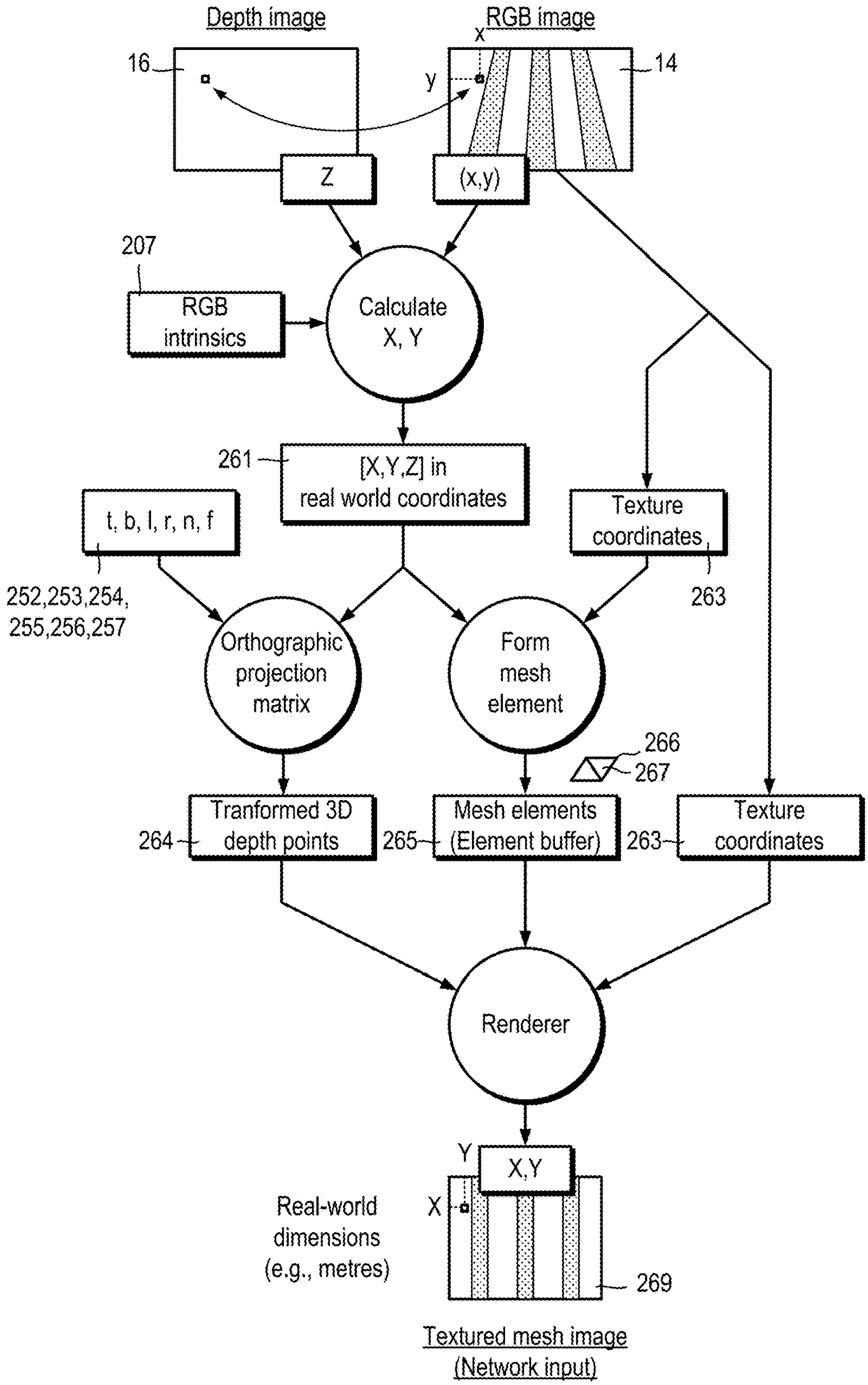
FIG. 84 illustrates a process of re-rendering.

FIG. 84 illustrates a process of obtaining a textured mesh image 269 which includes colour information and which can be used as a network input.

Referring to FIG. 84, colour images 14 and corresponding depth images 16 are loaded into the GPU 32 (FIG. 6). The processor GPU 32 (FIG. 6) calculates (X, Y) in real-world dimensions using (x, y) from the RGB image 14 and the corresponding depth Z, in other word (per-element depth information 165) from the depth image 16 using the RGB camera intrinsics 207. In particular, X and Y can be found using:

$$X = ((x - ppx)/fx) \cdot Z$$

$$Y = ((y - ppy)/fy) \cdot Z$$

where x, y are pixel coordinates, ppx and ppy are x- and y-values of the position of a principal point in pixels, X, Y are in real-world camera coordinates, and fx, fy are focal lengths of the lens in x and y dimensions.

The individual 3D depth points (X, Y, Z) 261 are transformed using an orthographic projection matrix 262 using corresponding mapping array 263 and viewing box parameters 252, 253, 254, 255, 256, 257.

The processor 32 (FIG. 6) uses the individual 3D depth points (X, Y, Z) 261 and texture coordinates 263 to form mesh element 265 which are stored in an element buffer. The texture elements 263, the transformed 3D depth points 264 and mesh elements 265 are provided to a renderer 268 provided in a graphic package, such as OpenGL, to render a textured mesh image 269 with X,Y coordinates in real world coordinates.

Figure 85:
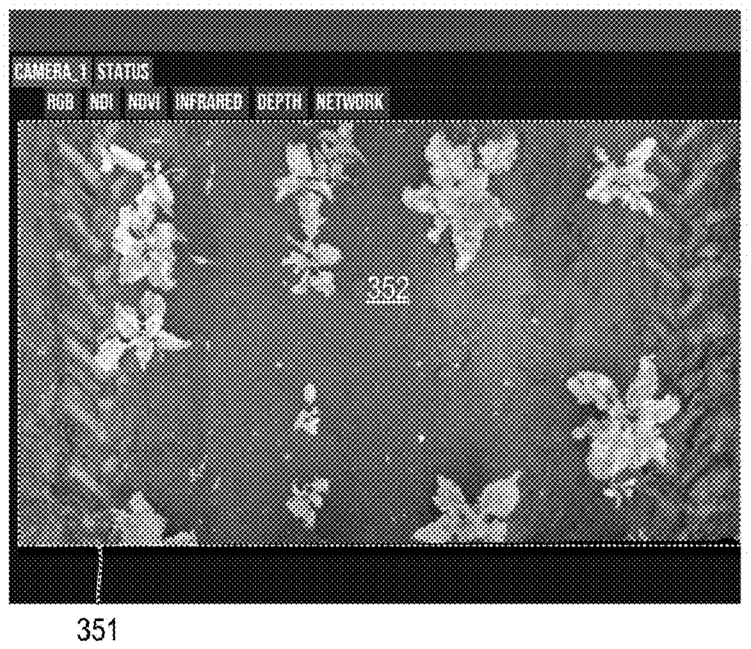
FIG. 85 is screenshot of an interface which includes a colour image before re-rendering.

Referring to FIG. 85, a user interface 350 is shown which includes an image display portion 351 which shows, in a first mode, a colour camera image 352 of rows of sugar beet. This image 352 is similar to the image 25 shown in FIG. 5.

Figure 86:
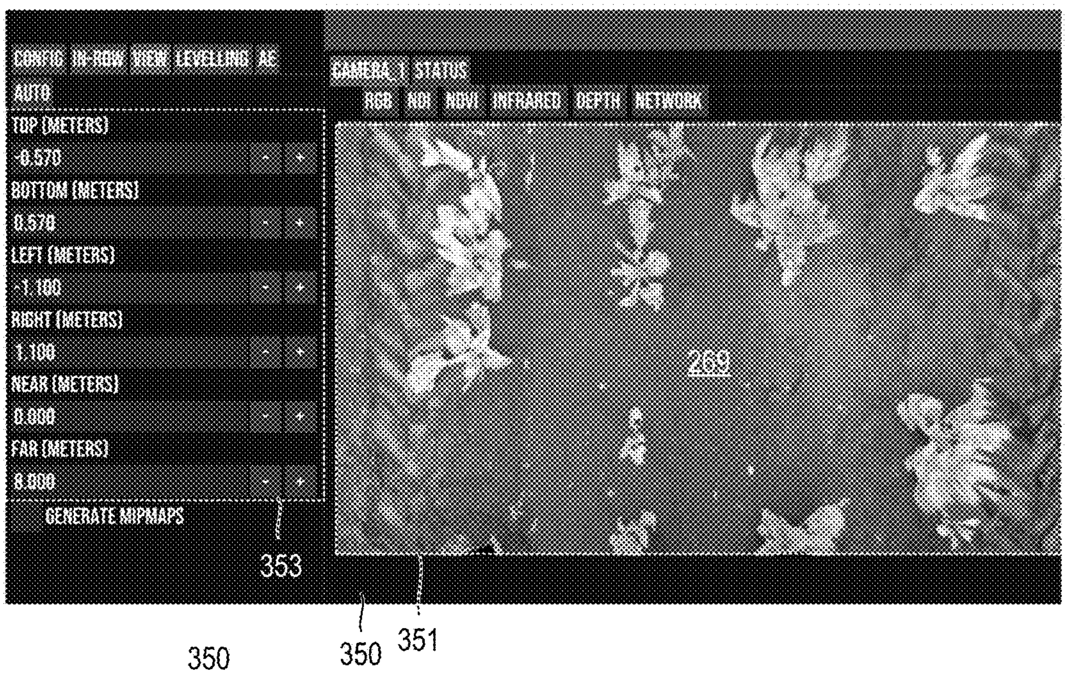
FIG. 86 is screenshot of an interface which includes a textured mesh image after re-rendering.

Referring to FIG. 86, the user interface 350 is again shown in a second mode. The image display portion 351 displays a re-rendered textured mesh image 269 (in the form of an orthographic colour image) of the rows of sugar beet. The user interface 350 also includes a parameter portion 353 which includes input fields for the viewing box parameters 252, 253, 254, 255, 256, 257.

Using Per-Element Information

The processes hereinbefore described use per-element depth information in generally one of two ways.

Figure 87:
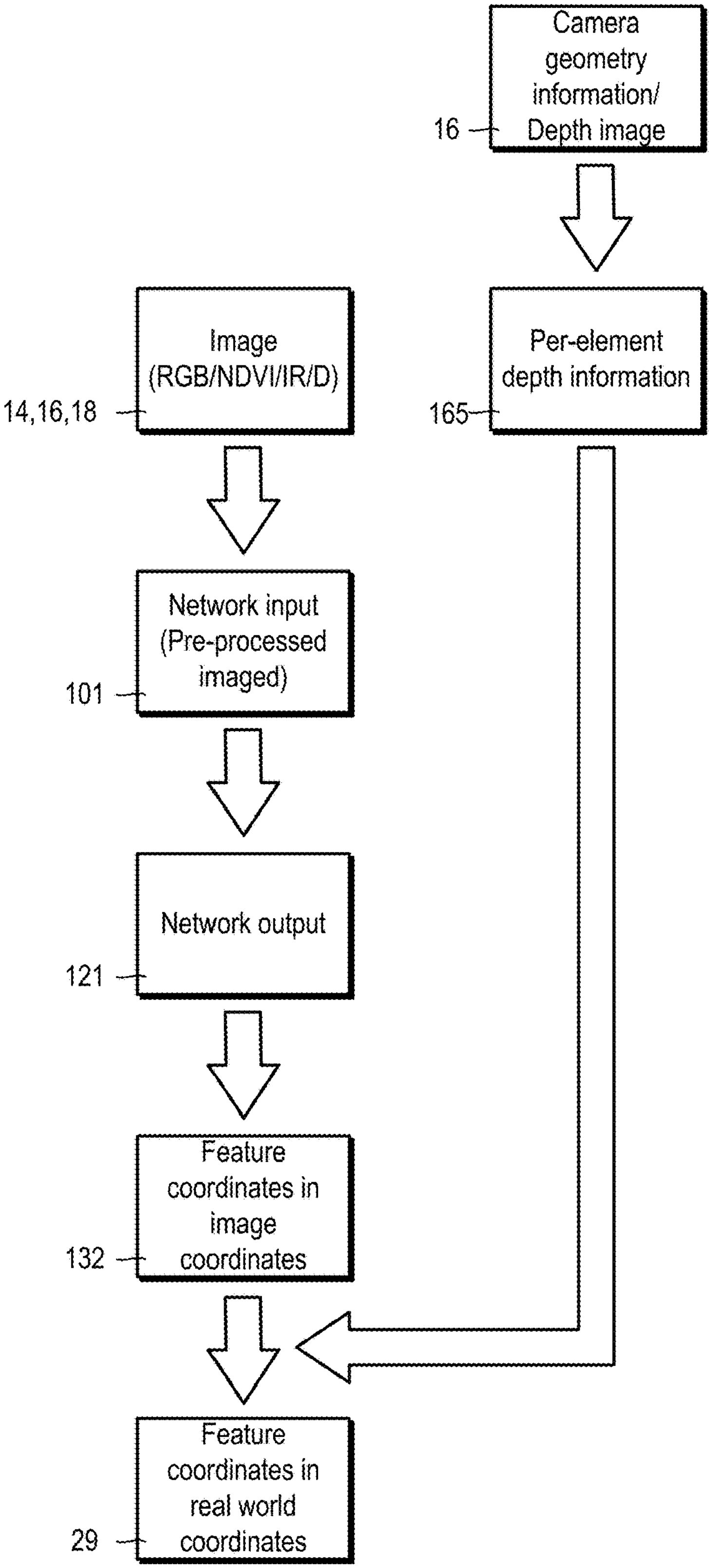
FIG. 87 illustrates a first pipeline in which an image is processed and passed into a network and per-element image depth information to convert extracted stem coordinates in image coordinates to real world dimensions.

Referring to FIG. 87, a first pipeline is shown for an image 14, 16, 18.

In the first pipeline, an un-rendered image 101 is fed into the network 120 (FIG. 8) and per-element depth information 165 from the depth image 16 is used directly to convert extracted stem coordinates 132 in image coordinates 29 to stem coordinates 29 in real world dimensions.

Figure 88:
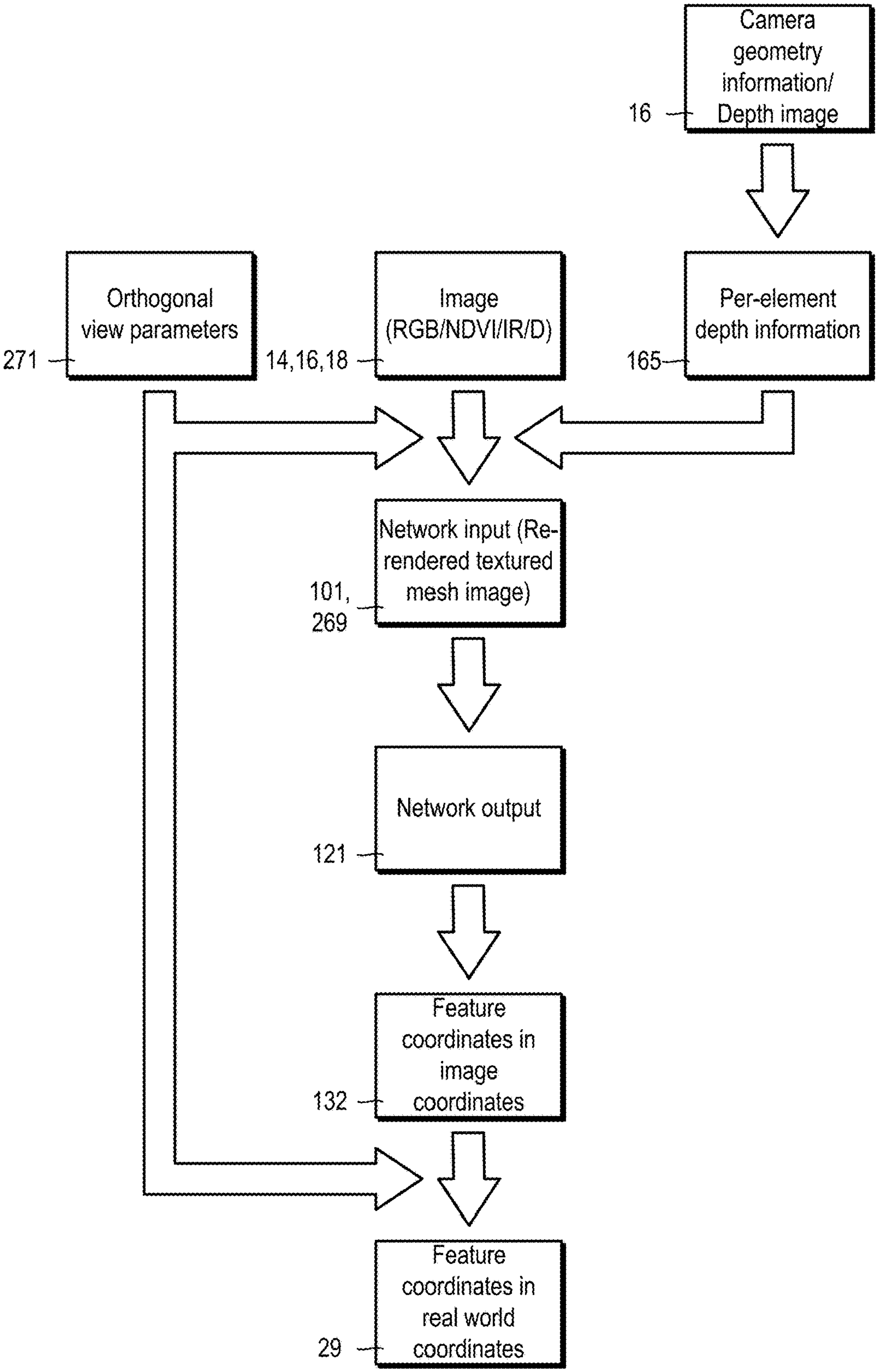
FIG. 88 illustrates a second pipeline in which an image is re-rendered using per-element image depth information and view parameters in real-world dimensions to obtain a textured mesh image which is passed into a network whereby the per-element image depth information is used to construct the textured mesh image having real-world dimensions to match the view parameters in real world dimensions.

Referring to FIG. 88, a second pipeline is shown for an image 14, 16, 18.

In the second pipeline, the image 14, 16, 18 is re-rendered using per-element depth information 165 from the depth image 16 and rendered using view parameters in real-world dimensions to produce the network input 101. The per-element image depth information 165 from the depth image 16 is used to construct the re-rendered (orthogonal) textured mesh image 269 which has real-world dimensions to match the view parameters 271 in real world dimensions. This allows the viewing parameters 271 in real world dimensions to be used to convert plant positions/stem coordinates 132 in image coordinates into stem coordinates 29 in real-world dimensions. Thus, the per-element depth information 165 from the depth image 16 is used indirectly to stem coordinates 29 in real-world dimensions.

Correcting for Ground Plane/Crop Height

Referring again to FIG. 23, the system 20 (FIG. 4) can determine the position 231 of a ground plane 91.

Figure 89:
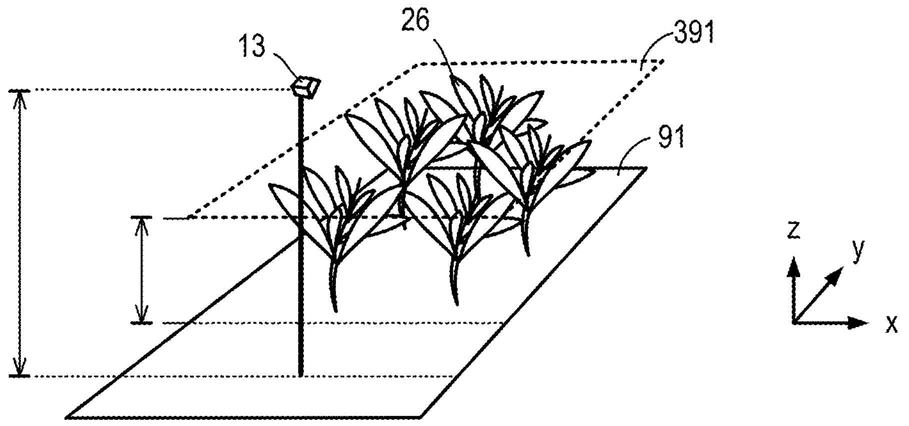
FIG. 89 schematically illustrate a crop having a crop height.

Referring to FIG. 89, the system 20 (FIG. 4) may use the position 231 of the ground plane 91 to provide an offset for the height 391 of the crop 31.

Figure 90:
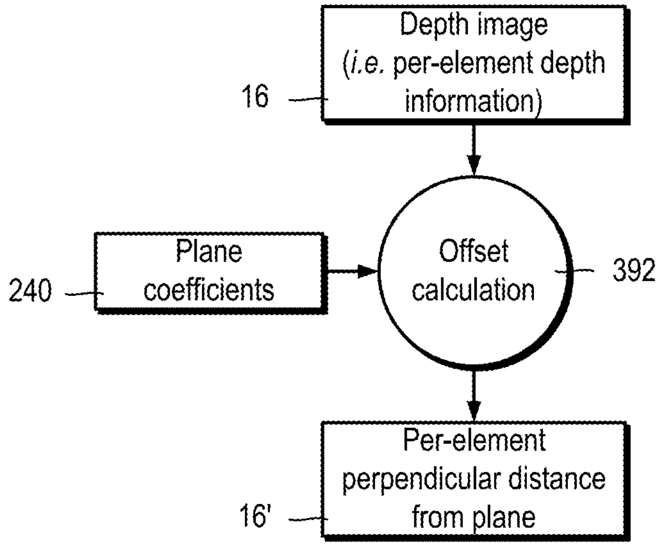
FIG. 90 illustrates a process of calculating the crop height shown in FIG. 89.

Referring also to FIG. 90, the depth image and the position 231 of the ground plane 91, expressed as plane coefficients, is passed to an offset calculator 392 to obtain a corrected depth image 16'.

Figure 91:
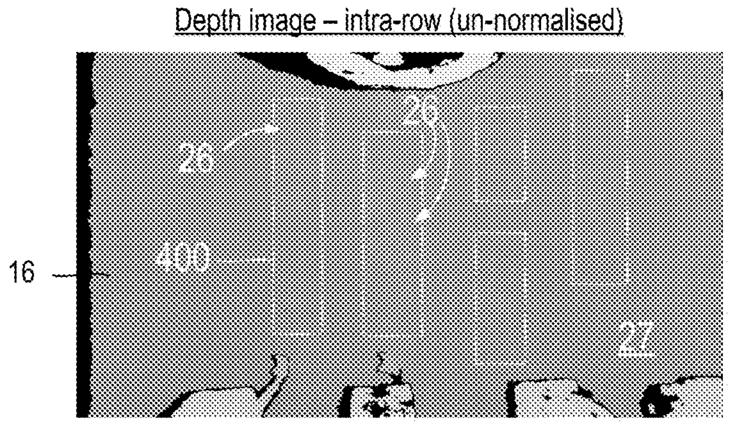
FIG. 91 is a depth image which is uncorrected and un-normalised.

Referring to FIG. 91, a depth image 16 is shown for an intra-row hoeing system. The depth image 16 is un-corrected and un-normalised and so exhibits poor contrast between plants 26 which are found inside boxes 400 (which have been added for clarity) and the ground 27 which is generally found outside the boxes 400.

Figure 92:
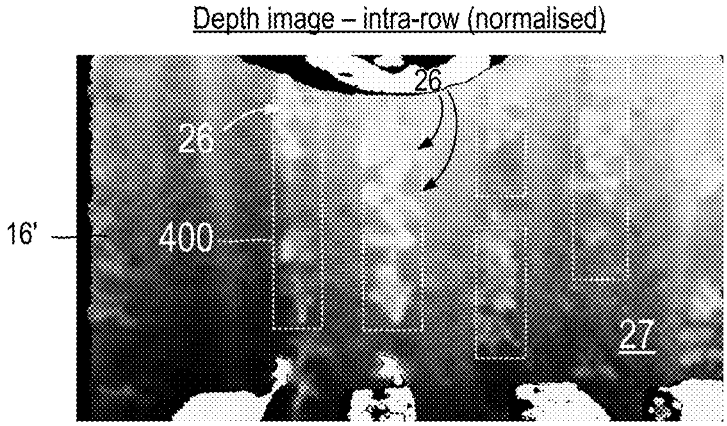
FIG. 92 is a depth image which is uncorrected and normalised.

Referring to FIG. 92, a normalised depth image 16' is shown for the intra-row hoeing system. The camera distance is normalised between image maximum distance and minimum distance, and greyscale histogram hist equalised based on the maximum and minimum distances. The depth image 16' exhibits better contrast between the plants 26 and ground 27.

Although the normalised depth image 16' provides improved contrast, it can be inconsistent from image to image and vary according to camera position. Thus, the image may be processed further to correct for a crop height between −0.2 m and 0.5 m from the ground plane 91. For example, some of the image feature shown in FIG. 92 may exceed 0.5 m and are therefore clipped to a pixel value of 255.

Figure 93:
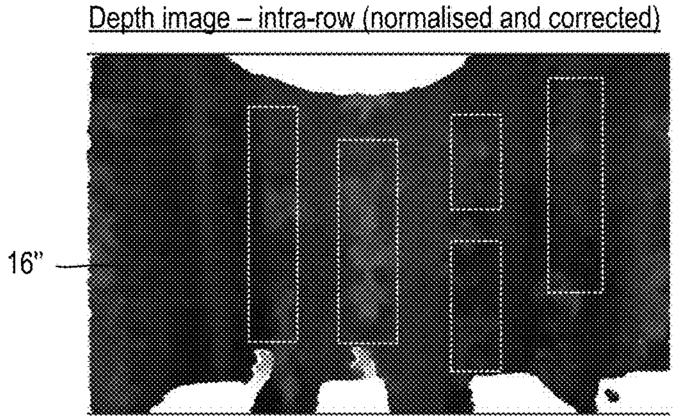
FIG. 93 is a depth image which is corrected.

Referring to FIG. 93, a normalised, corrected depth image 16" is shown for the intra-row hoeing system. The image has been corrected for a crop height between −0.2 m and 0.5 m from the ground plane 91 by scaling the pixel values between 0 and 255 to correspond to heights from the ground plane 92 between −0.2 m and 0.5 m, respectively.

Figure 94:
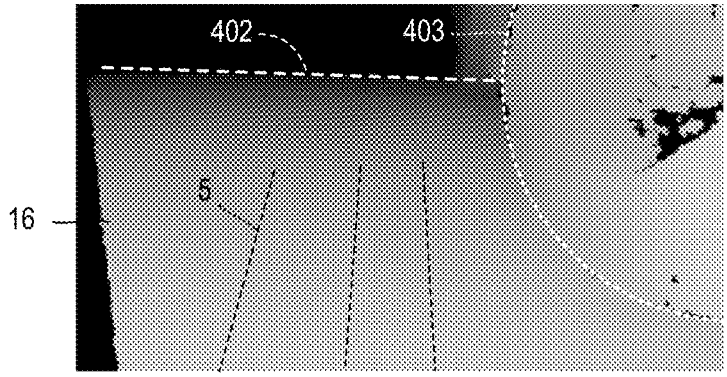
FIG. 94 is a depth image which is uncorrected and un-normalised

Referring to FIG. 94, a depth image 16 is shown for an inter-row hoeing system. The depth image 16 is un-corrected and un-normalised and so exhibits poor contrast between crop rows 5 (dashed lines illustrating the position of the rows 5 have been added for clarity). Lines 402, 403 have been added to show ground horizon and a tractor wheel.

Figure 95:
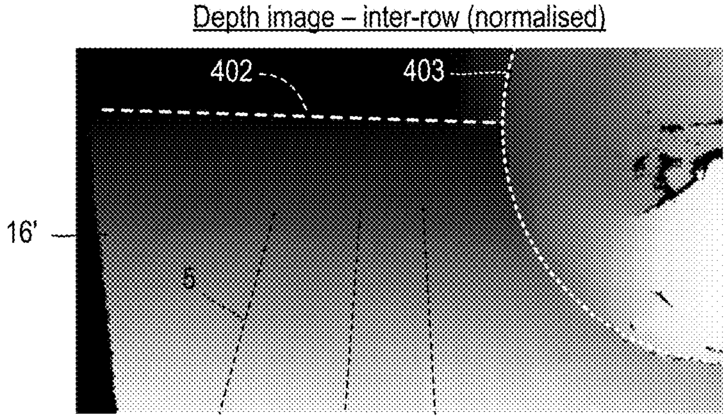
FIG. 95 is a depth image which is uncorrected and normalised.
Figure 96:
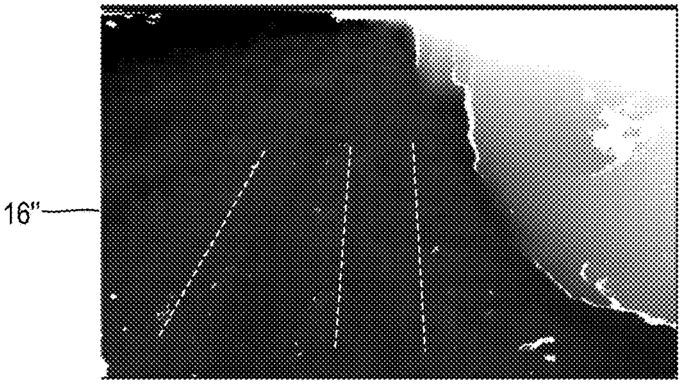
FIG. 96 is a depth image which is corrected.

FIGS. 95 and 96 show corresponding normalised image 18' and normalised, correct depth image 16" respectively.

Network Input Pre-Processing

Referring again to FIG. 32, as explained hereinbefore, images 14, 16, 18, 61 can be pre-processed to standardise and/or normalise values, and to generate derived images such as NDVI, prior to generating the network input 101.

FIG. 32 illustrates a first method of preparing an input 101 for the network 120 (FIG. 8).

Figure 97:
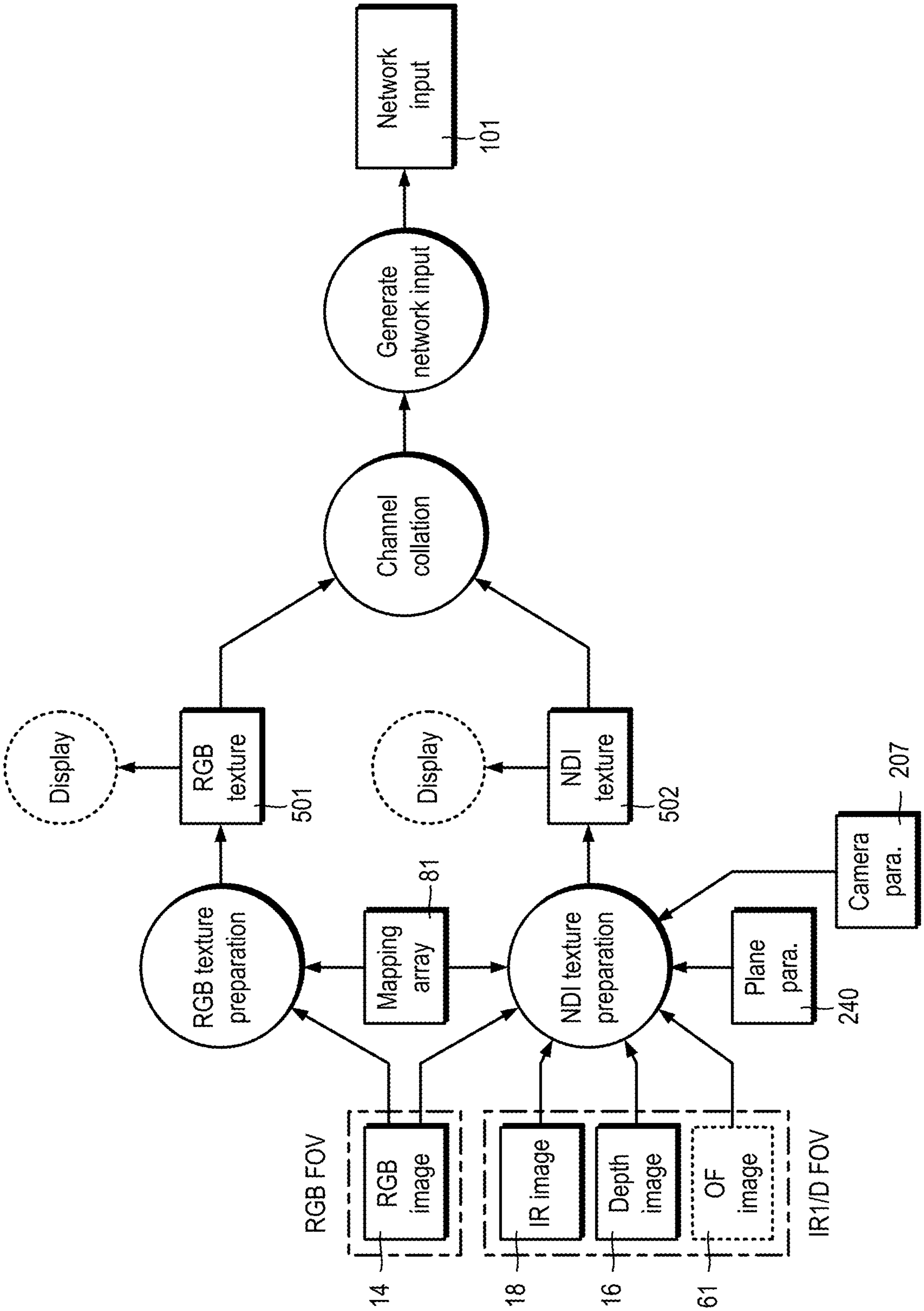
FIG. 97 illustrates another process of pre-processing images and generating a network input.

Referring to FIG. 97, a second method of preparing an input 101 for the network 120 (FIG. 8) is shown. The second method is similar to the first method.

In this case, separate RGB and NDI textures 501, 502 are prepared. Each texture 501, 502 can comprise, for example, 3 channels. One or both textures 501, 502 can be rendered on a screen for display to the user.

The two textures 501, 502 can then be amalgamated into one array comprising, for instance, 6 channels. As hereinbefore described, the array may be processed to standardise and/or normalise values.

Figure 98:
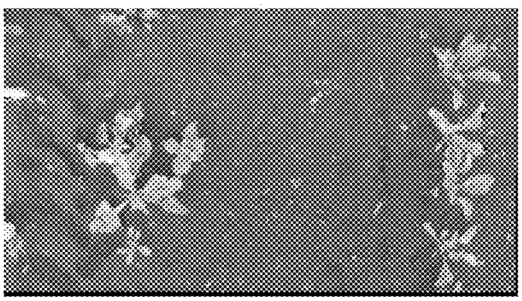
FIG. 98 is an RGB image of a sugar beet crop.
Figure 99:
FIG. 99 is an NDI image of a sugar beet crop corresponding to the RGB image shown in FIG. 98.

Referring to FIGS. 98 and 99, examples of RGB and NDI images 501, 502 are shown for the sugar beet crop.

Figure 100:
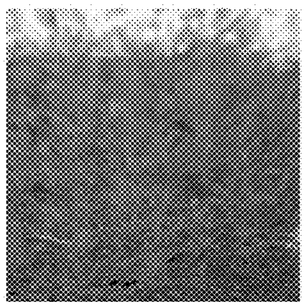
FIG. 100 is an RGB image of a crop.
Figure 101:
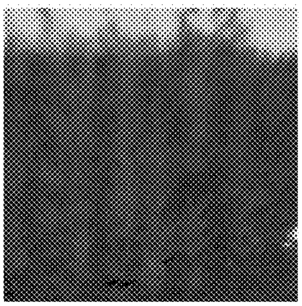
FIG. 101 is an NDI image of a crop corresponding to the RGB image shown in FIG. 100.

Referring to FIGS. 100 and 101, examples of RGB and NDI images 501, 502 are shown for winter wheat.

Image Augmentation

Figure 102:
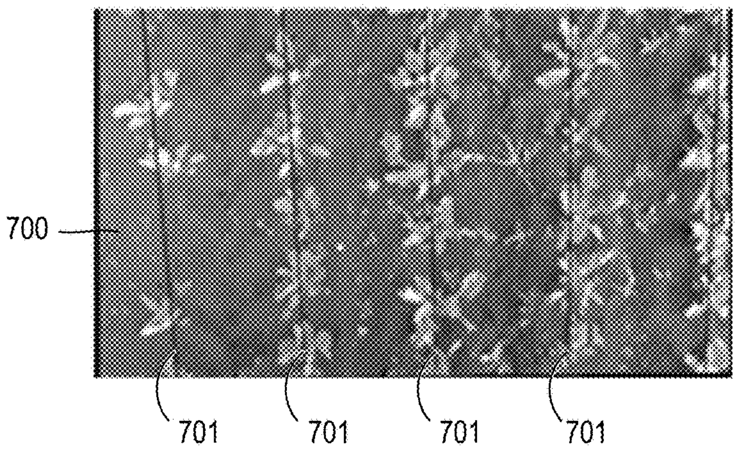
FIG. 102 is an orthographic view image of a crop in which crop rows are projected onto the image.

Images that are displayed to a user during system operation may be augmented to provide the user with information and assistance. For example, images may be augmented by providing a projection (or "overlay") displaying, in different views, the position of crop rows with respect to a ground plane, or a projection displaying, in camara view, an outline of the area which is visible in an orthographic view. The image FIG. 102 illustrates an orthographic view image 700 of a crop with lines 701 projected (or "overlaid") onto the image showing the position of crop rows.

Figure 103:
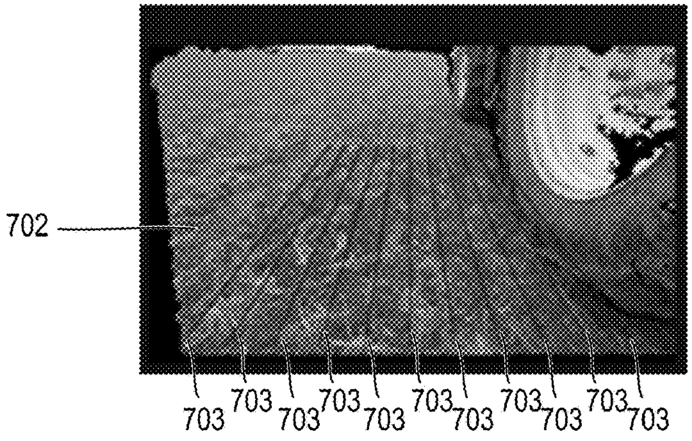
FIG. 103 is a camera view image of a crop in which crop rows are projected onto the image.

FIG. 103 illustrates a camera view image 702 of a crop with lines 703 projected onto the image showing the position of crop rows.

Figure 104:
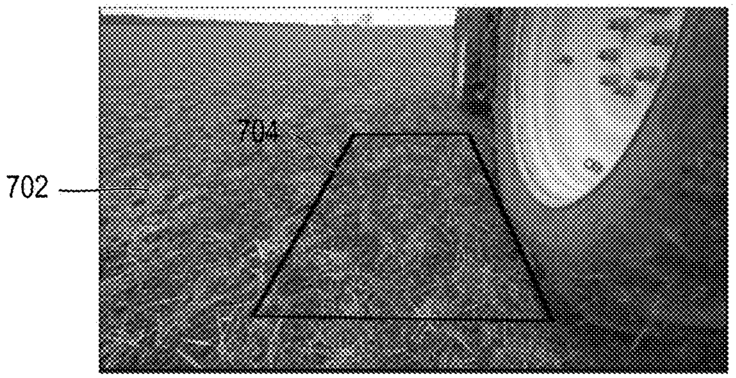
FIG. 104 is a camera view image of the crop illustrating the extent of the orthographic view shown in FIG. 102.

FIG. 104 illustrates the camera view image 702 of the crop which is same as that shown in FIG. 103, but with a polygon 704 (in this case, a trapezoid) projected onto the image showing the outline of the area which is visible in an orthographic view.

Figure 105:
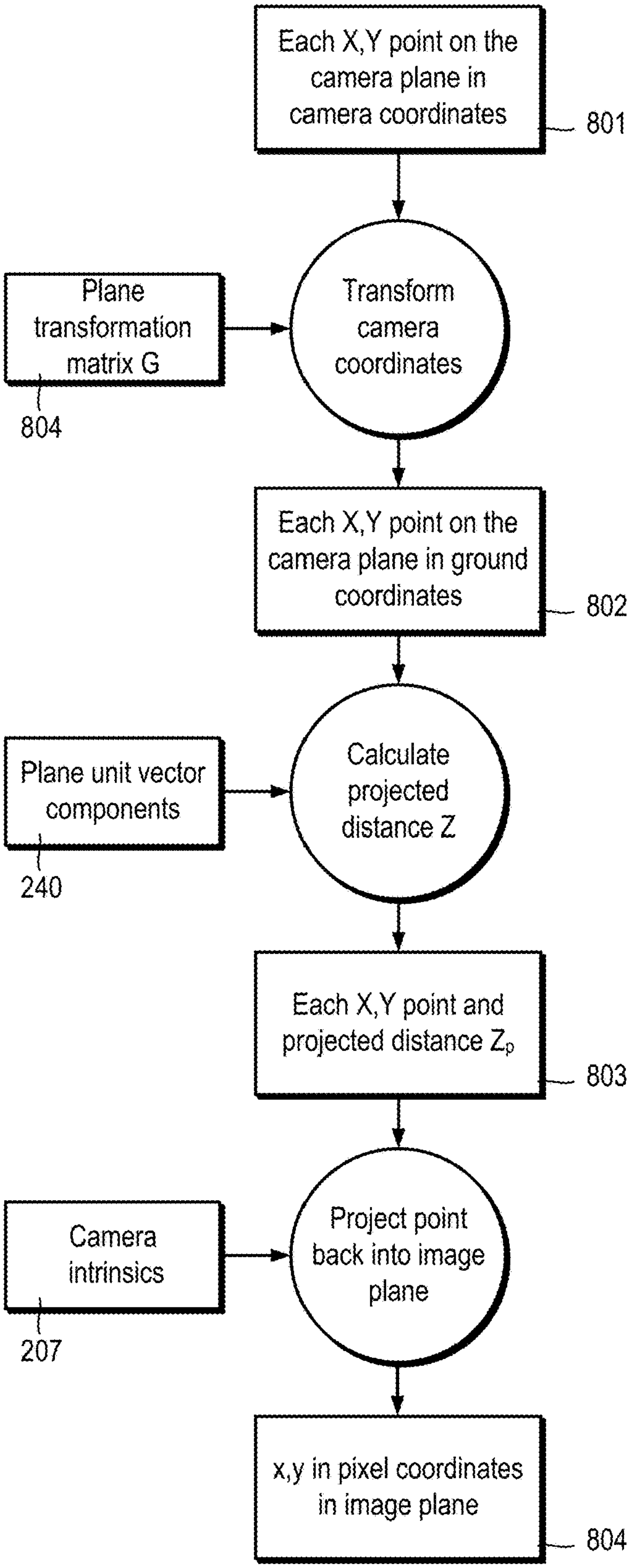
FIG. 105 illustrates of process of obtaining projecting points or lines in camera coordinates onto a plane then reprojecting into camera image.
Figure 106:
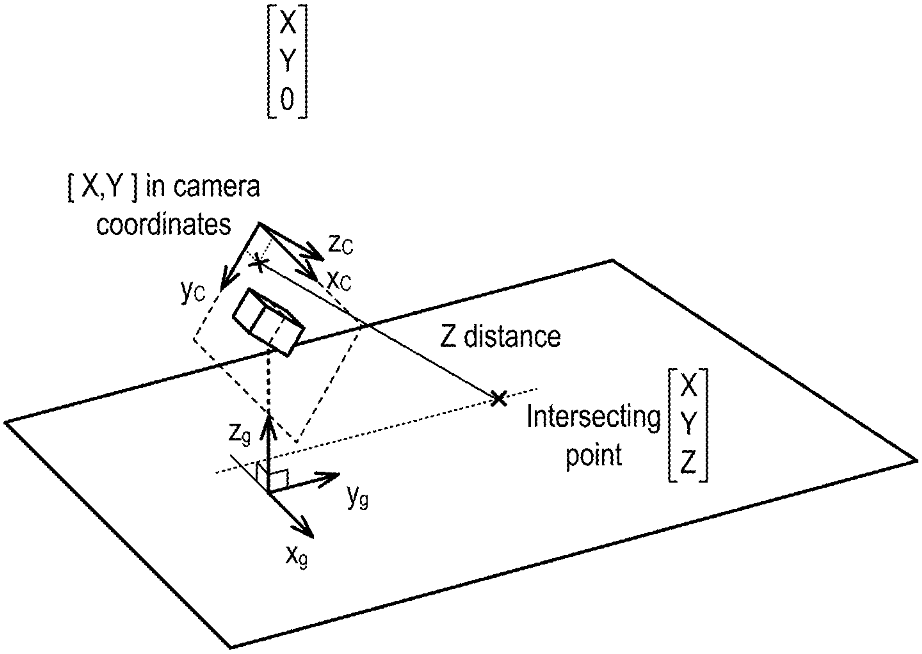
FIG. 106 is a schematic perspective view of a camera and a plane.
Figure 107:
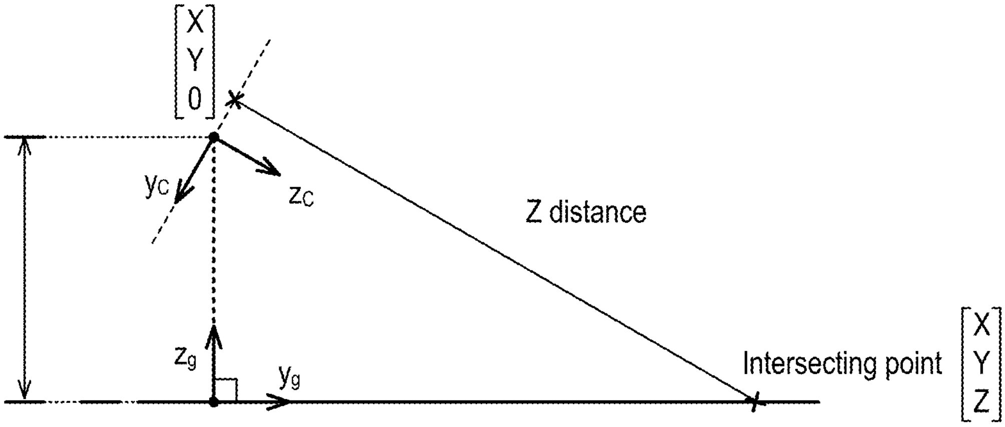
FIG. 107 is a schematic side view of the camera and the plane shown in FIG. 106.

Referring to FIGS. 105 to 107, a method of projecting points or lines in X, Y camera coordinates onto a plane and then reprojecting the points or lines into camera image will now be described.

This can be used for projecting a collection of points forming points of interest, lines 701, and edges of polygons 704, which have been computed as hereinbefore described. Points of interest may be, for example, points on plants, such as stem location.

The GPU 32 (FIG. 6) transforms each point 801 on the camera plane in camera coordinates [X, Y, 0] into a point 802 on the camera plane in ground coordinates [$X_g$ $Y_g$, $Z_g$] using camera transformation matrix G 803.

The GPU 32 (FIG. 6) finds the projected distance Z by dividing $Z_g$ by the z-component of the plane unit vector 240.

The GPU 32 (FIG. 6) forms a 3D coordinate in camera coordinates 804 to project back into the camera image using the camera intrinsic information 207.

Modifications

It will be appreciated that various modifications may be made to the embodiments hereinbefore described. Such modifications may involve equivalent and other features which are already known in the design, manufacture and use of computer image systems and/or farm implements and component parts thereof and which may be used instead of or in addition to features already described herein. Features of one embodiment may be replaced or supplemented by features of another embodiment.

Other frame rates may be used, such as 15, 60 or 90 frames per second.

The system need not be used to control a hoeing implement, but instead, for instance, for targeted application of insecticide or fertilizer, e.g., by spraying herbicides on vegetation that appears in the NDVI image but is beyond a safe radius around the crop stem.

A mechanical hoe need not be used. For example, the system can steer an electrode that is using electric discharge to destroy weeds along the crop row, around the crop plants.

The keypoint need not be a stem, but can be another part of the plant, such as a part of a leaf (such as leaf midrib), a node stem, a meristem, a flower, a fruit or a seed. Action taken as a result of identifying the part of the plant need not be specific to the detected part. For example, having identified a leaf midrib, the system may treat (e.g., spray) the whole leaf.

A gridmap need not be used. For example, only data association and matching can be used (i.e., without any use of a gridmap). Amalgamating the coordinates may comprise data association between different frames. Data association between different frames may include matching coordinates and updating matched coordinates. Matching may comprise using a descriptor or determination of distance between coordinates. Updating may comprise using an extended Kalman filter. Image patches can be used to match the plant stems over multiple frames, such as a KCF tracker or matching keypoint descriptors. A Hungarian algorithm and bipartite graph matching can be used for data association/matching.

A RANSAC algorithm need not be used for plane fitting. Alternatives include using a Hough transform to transform pointcloud coordinates to parametrized Hough space where points can be grouped to find optimal plane coefficients.

An alternative to Bundle adjustment is Iterative Closest Point (ICP). ICP algorithms can be used to iteratively reduce the distance of closest points between matched point positions without using a non-linear optimiser (such as Levenberg Marquardt or Gauss Newton) to optimise an energy function.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method, comprising:

receiving an image of a crop, the image comprising an array of elements which includes depth information, wherein the image is a multiple-channel image comprising at least a colour channel and a depth channel providing per-element depth information;

providing the image of the crop to a trained convolutional neural network to generate a response map comprising an intensity image comprising intensity values having respective peaks corresponding to a stem of a plant in the crop;

obtaining, from the response map, coordinates corresponding to the respective peaks; and converting the coordinates in image coordinates into stem locations in real-world dimensions using the provided depth information of the image of the crop.

2. The method of claim 1, wherein the trained convolutional neural network includes at least one encoder-decoder module.

3. The method of claim 1, further comprising:

receiving a mapping array for mapping the depth information of the image of the crop to a corresponding element.

4. The method of claim 3, comprising sampling the mapping array using normalised coordinates such that the mapping array is handled as a texture.

5. The method of claim 1, further comprising:

receiving the per-element depth information from a depth sensing image sensor.

6. The method of claim 1, wherein the multiple-channel image further includes an infrared channel.

7. The method of claim 1, wherein the multiple-channel image further includes an optical flow image.

8. The method of claim 1, wherein the intensity values have Gaussian distributions in a vicinity of each detected location.

9. The method of claim 1, wherein the trained convolutional neural network comprises a series of at least two encoder-decoder modules.

10. The method of claim 1, wherein the trained convolutional neural network is a multi-stage pyramid network.

11. The method of claim 1 further comprising:

converting the coordinates in image coordinates into coordinates in camera coordinates; and amalgamating the camera coordinates corresponding to a same stem of a same plant from more than one image into an amalgamated stem location.

12. The method of claim 11, wherein amalgamating the camera coordinates comprises projecting the camera coordinates onto a gridmap.

13. The method of claim 1, further comprising:

calculating a trajectory in dependence on the stem locations; and transmitting a control message to a control system in dependence on the trajectory.

14. An image processing system comprising:

at least one processor; and a memory;

the at least one processor configured to perform the method of claim 1.

15. A system comprising:

a multiple-image sensor system for obtaining images; and the image processing system of claim 14;

wherein the multiple-image sensor system is arranged to provide the images to the image processing system and the image processing system is configured to process the images.

16. The system of claim 15, further comprising:

a control system, wherein the system is configured to control the control system.

17. The system of claim 16, wherein the control system is a control system for controlling at least one motor and/or actuator.

18. A vehicle comprising the system of claim 15.

* * * * *